US012759368B2

(12) United States Patent
Kim

(10) Patent No.: US 12,759,368 B2
(45) Date of Patent: Oct. 13, 2026

(54) VEHICULAR THERMAL MANAGEMENT SYSTEM

(71) Applicants: Hyundai Motor Company, Seoul (KR); Kia Corporation, Seoul (KR)

(72) Inventor: Ki Hyun Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 171 days.

(21) Appl. No.: 18/486,346

(22) Filed: Oct. 13, 2023

(65) Prior Publication Data

US 2024/0399817 A1 Dec. 5, 2024

(30) Foreign Application Priority Data

May 31, 2023 (KR) ........................ 10-2023-0070281

(51) Int. Cl.
*B60H 1/00* (2006.01)
*B60H 1/32* (2006.01)

(52) U.S. Cl.
CPC ......... *B60H 1/00278* (2013.01); *B60H 1/323* (2013.01); *B60H 2001/003* (2013.01)

(58) Field of Classification Search
CPC ................ B60H 1/00278; B60H 1/323; B60H 2001/003; F25B 41/20
See application file for complete search history.

(56) References Cited

U.S. PATENT DOCUMENTS

| | | | |
|---|---|---|---|
| 2020/0180391 A1 | 6/2020 | Kim | |
| 2022/0305885 A1 | 9/2022 | Yang et al. | |
| 2022/0349627 A1* | 11/2022 | Lee | F25B 5/04 |
| 2023/0020687 A1 | 1/2023 | Kim | |
| 2023/0052550 A1* | 2/2023 | Gashi | B60H 1/00921 |
| 2024/0399827 A1 | 12/2024 | Dong | |

FOREIGN PATENT DOCUMENTS

| | | |
|---|---|---|
| CN | 217145571 U | 8/2022 |
| EP | 4442477 A1 | 10/2024 |
| WO | 2020242096 A1 | 12/2020 |

* cited by examiner

*Primary Examiner* — Jerry-Daryl Fletcher
*Assistant Examiner* — Keith Stanley Myers
(74) *Attorney, Agent, or Firm* — Slater Matsil, LLP

(57) ABSTRACT

An embodiment vehicular thermal management system includes a heating, ventilation, and air conditioning (HVAC) subsystem and a power electronics cooling subsystem thermally connected to the HVAC subsystem. The HVAC subsystem includes a compressor, a heating-side expansion valve disposed on a downstream side of the compressor, an exterior heat exchanger disposed on a downstream side of the heating-side expansion valve, a cooling-side expansion valve disposed on a downstream side of the exterior heat exchanger, an evaporator disposed on a downstream side of the cooling-side expansion valve, a distribution line configured to allow at least a portion of a refrigerant discharged from the exterior heat exchanger to be directed from an upstream side of the cooling-side expansion valve to the compressor, and a battery disposed on the distribution line.

20 Claims, 25 Drawing Sheets

VEHICULAR THERMAL MANAGEMENT SYSTEM

CROSS-REFERENCE TO RELATED APPLICATIONS

This application claims the benefit of Korean Patent Application No. 10-2023-0070281, filed on May 31, 2023, which application is hereby incorporated herein by reference.

TECHNICAL FIELD

The present disclosure relates to a vehicular thermal management system.

BACKGROUND

With a growing interest in energy efficiency and environmental issues, there is a demand for development of eco-friendly vehicles that can replace internal combustion engine vehicles. Such eco-friendly vehicles are classified into electric vehicles which are driven using fuel cells or electricity as a power source and hybrid vehicles which are driven using an engine and a battery.

Electric vehicles or hybrid vehicles may include a vehicular thermal management system for air conditioning in a passenger compartment and maintaining a battery and/or power electronic components at optimal temperatures. The vehicular thermal management system may include a heating, ventilation, and air conditioning (HVAC) subsystem for air conditioning in the passenger compartment, a power electronics cooling subsystem designed to maintain the power electronic components of a power electronics system at appropriate temperatures, and a battery cooling subsystem designed to maintain the battery at an appropriate temperature.

The battery cooling subsystem may include a battery coolant circulation path through which a battery coolant for cooling the battery circulates, and the battery may have a coolant passage fluidly connected to the battery coolant circulation path. The battery coolant circulating in the battery coolant circulation path may exchange heat with a refrigerant circulating in a refrigerant circulation path through a battery chiller so that the battery coolant may be cooled, and the cooled battery coolant may cool the battery to an appropriate temperature. In addition, a battery heater for increasing the temperature of the battery may be provided. When the heater is turned on, the battery coolant may be heated, and the heated battery coolant may increase the temperature of the battery.

As desired performance of an electric vehicle becomes higher, the density, current, and voltage of battery cells, the level of an autonomous driving controller, and the like may increase. Accordingly, a heat generating amount of the battery and a heat generating amount of the autonomous driving controller may increase, so a cooling load of the battery and a cooling load of the autonomous driving controller may increase.

In a conventional battery cooling subsystem, however, the battery coolant having exchanged heat with the refrigerant is used to cool the battery so that heat loss may occur between the refrigerant and the battery coolant, which relatively reduces the battery cooling performance achieved by the battery coolant.

The above information described in this background section is provided to assist in understanding the background of the inventive concept and may include any technical concept which is not considered as the prior art that is already known to those skilled in the art.

SUMMARY

The present disclosure relates to a vehicular thermal management system. Particular embodiments relate to a vehicular thermal management system designed to improve performance of a heating, ventilation, and air conditioning (HVAC) subsystem and performance of a power electronics cooling subsystem and to maintain a temperature of a battery at an optimal operating temperature.

Embodiments of the present disclosure can solve problems occurring in the prior art while advantages achieved by the prior art are maintained intact.

An embodiment of the present disclosure provides a vehicular thermal management system designed to improve performance of a heating, ventilation, and air conditioning (HVAC) subsystem and performance of a power electronics cooling subsystem and to maintain a temperature of a battery at an optimal operating temperature.

According to an embodiment of the present disclosure, a vehicular thermal management system may include an HVAC subsystem including a compressor, a heating-side expansion valve disposed on the downstream side of the compressor, an exterior heat exchanger disposed on the downstream side of the heating-side expansion valve, a cooling-side expansion valve disposed on the downstream side of the exterior heat exchanger, an evaporator disposed on the downstream side of the cooling-side expansion valve, a distribution line configured to allow at least a portion of a refrigerant discharged from the exterior heat exchanger to be directed from the upstream side of the cooling-side expansion valve to the compressor, and a battery disposed on the distribution line and a power electronics cooling subsystem thermally connected to the HVAC subsystem.

The HVAC subsystem may further include a battery-side expansion valve located on the upstream side of the battery in the distribution line.

The battery-side expansion valve may include an inlet port communicating with the exterior heat exchanger and an outlet port communicating with the battery.

The HVAC subsystem may further include an upstream bypass line configured to allow the refrigerant to be directed from the upstream side of the battery to the downstream side of the battery.

The battery-side expansion valve may further include a bypass port communicating with the upstream bypass line.

The HVAC subsystem may further include a warm-up line configured to allow the refrigerant to be directed from the downstream side of the compressor to the battery.

The HVAC subsystem may further include an interior condenser disposed between the compressor and the heating-side expansion valve.

The HVAC subsystem may further include a first control valve configured to allow the refrigerant discharged from the compressor to be directed toward at least one of the interior condenser and the battery.

The HVAC subsystem may further include a downstream bypass line configured to allow the refrigerant discharged from the battery to be directed to the heating-side expansion valve.

The HVAC subsystem may further include a second control valve configured to allow the refrigerant discharged from the battery to be directed toward at least one of the compressor and the heating-side expansion valve.

The vehicular thermal management system may further include a heat exchanger thermally connecting the HVAC subsystem and the power electronics cooling subsystem. The HVAC subsystem may include a refrigerant circulation path through which the refrigerant circulates, and the power electronics cooling subsystem may include a power electronics coolant circulation path through which a power electronics coolant circulates. The heat exchanger may include a first passage fluidly connected to the refrigerant circulation path and a second passage fluidly connected to the power electronics coolant circulation path.

The first passage of the heat exchanger may be fluidly connected to the refrigerant circulation path between the heating-side expansion valve and the exterior heat exchanger.

The HVAC subsystem may further include a heat exchanger bypass line configured to allow the refrigerant discharged from the heating-side expansion valve to be directed from the upstream side of the first passage of the heat exchanger to the downstream side of the first passage of the heat exchanger.

The HVAC subsystem may further include a dehumidification bypass line configured to allow the refrigerant discharged from the heating-side expansion valve to be directed from the upstream side of the first passage of the heat exchanger to the evaporator.

The HVAC subsystem may further include a third control valve configured to allow the refrigerant discharged from the heating-side expansion valve to be directed toward at least one of the evaporator, the first passage of the heat exchanger, and the downstream side of the first passage of the heat exchanger.

The HVAC subsystem may further include a heating-side bypass line configured to allow the refrigerant discharged from the first passage of the heat exchanger to be directed to the compressor.

The HVAC subsystem may further include a fourth control valve configured to allow the refrigerant discharged from the first passage of the heat exchanger to be directed toward at least one of the exterior heat exchanger and the compressor.

The HVAC subsystem may further include a bypass line configured to allow the refrigerant discharged from the heating-side expansion valve to bypass the exterior heat exchanger.

The HVAC subsystem may further include a second distribution line configured to allow the refrigerant discharged from the exterior heat exchanger to be directed from the upstream side of the cooling-side expansion valve to the compressor.

The HVAC subsystem may further include an autonomous driving controller disposed on the second distribution line.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
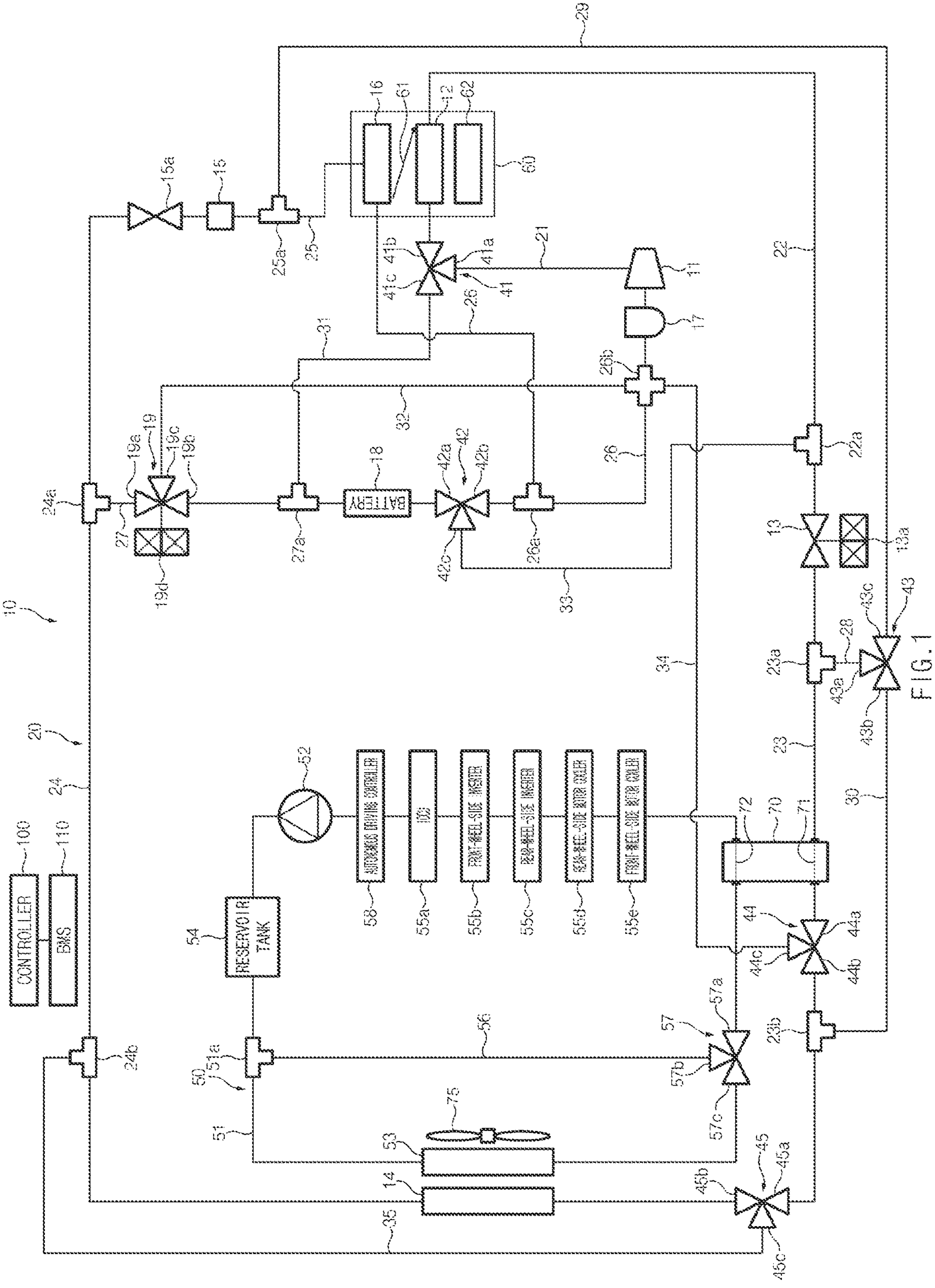
FIG. 1 illustrates a configuration of a vehicular thermal management system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with embodiments of the present disclosure will be omitted to avoid unnecessarily obscuring the gist of embodiments of the present disclosure.

Terms such as first, second, A, B, (a), and (b) may be used to describe the elements in exemplary embodiments of the present disclosure. These terms are only used to distinguish one element from another element, and the intrinsic features, sequence, or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art and are not to be interpreted as having ideal or excessively formal meanings unless clearly defined as having such in the present application.

Referring to FIG. 1, a vehicular thermal management system according to an exemplary embodiment of the present disclosure may include a heating, ventilation, and air conditioning (HVAC) subsystem 10 including a refrigerant circulation path 20 through which a refrigerant circulates and a power electronics cooling subsystem 50 including a power electronics coolant circulation path 51 through which a power electronics coolant for cooling a plurality of power electronic components **55*a*, 55*b*, 55*c*, 55*d*, and 55*e*** circulates.

The HVAC subsystem 10 may be thermally connected to a passenger compartment. In particular, the HVAC subsystem 10 may be configured to heat or cool air in the passenger compartment of the vehicle using the refrigerant.

The refrigerant circulation path 20 may be configured to provide various circulation paths based on various operating modes such as operating modes of the HVAC subsystem 10 and cooling and heating of a battery 18.

The HVAC subsystem 10 may include a compressor 11, an interior condenser 12, a heating-side expansion valve 13, an exterior heat exchanger 14, a cooling-side expansion valve 15, and an evaporator 16 fluidly connected through the refrigerant circulation path 20.

The compressor 11 may be configured to compress the refrigerant and allow the refrigerant to circulate. According to an exemplary embodiment, the compressor 11 may be an electric compressor driven by electric energy.

The interior condenser 12 may be disposed on the downstream side of the compressor 11, and the interior condenser 12 may be configured to condense the refrigerant received from the compressor 11. That is, the refrigerant compressed by the compressor 11 may transfer heat to the air and be condensed in the interior condenser 12. Accordingly, the interior condenser 12 may heat the air using the refrigerant compressed by the compressor 11, and the air heated by the interior condenser 12 may be directed into the passenger compartment.

The heating-side expansion valve 13 may be disposed on the downstream side of the interior condenser 12 in the refrigerant circulation path 20. Specifically, the heating-side expansion valve 13 may be disposed between the interior condenser 12 and the exterior heat exchanger 14. During a heating operation of the HVAC subsystem 10, the heating-side expansion valve 13 may adjust the flow of the refrigerant and/or the flow rate of the refrigerant into the exterior heat exchanger 14. The heating-side expansion valve 13 may be configured to expand the refrigerant received from the interior condenser 12 during the heating operation of the HVAC subsystem 10. The opening degree of the heating-side expansion valve 13 may be varied by a controller 100. As the opening degree of the heating-side expansion valve 13 is varied, the flow rate of the refrigerant into the exterior heat exchanger 14 may be varied. That is, the heating-side expansion valve 13 may be controlled by the controller 100 during the heating operation of the HVAC subsystem 10.

According to an exemplary embodiment, the heating-side expansion valve 13 may be an electronic expansion valve (EXV) having an actuator 13*a*. The actuator 13*a* may have a shaft which is movable to open or close an orifice defined in a valve body of the heating-side expansion valve 13, and the position of the shaft may be varied depending on the rotation direction, rotation degree, and the like of the actuator 13*a*, and accordingly the opening degree of the orifice of the heating-side expansion valve 13 may be varied. The controller 100 may control the operation of the actuator 13*a*. The heating-side expansion valve 13 may be a full open type EXV. When the HVAC subsystem 10 does not operate in a heating mode, the heating-side expansion valve 13 may be fully opened (the opening degree of the heating-side expansion valve 13 is 100%) so that the refrigerant may pass through the heating-side expansion valve 13, and thus the refrigerant may be prevented from being expanded by the heating-side expansion valve 13.

The exterior heat exchanger 14 may be adjacent to a front grille of the vehicle, and the exterior heat exchanger 14 may be configured to transfer heat between the refrigerant passing through an internal passage thereof and the air passing by an exterior surface of the exterior heat exchanger 14. During a cooling operation of the HVAC subsystem 10, the exterior heat exchanger 14 may be configured to condense the refrigerant received from the interior condenser 12. That is, the refrigerant passing through the exterior heat exchanger 14 may serve as an exterior condenser that condenses the refrigerant by transferring heat to the ambient air during the cooling operation of the HVAC subsystem 10. During the heating operation of the HVAC subsystem 10, the exterior heat exchanger 14 may be configured to evaporate the refrigerant expanded by the heating-side expansion valve 13. That is, the refrigerant passing through the exterior heat exchanger 14 may serve as an exterior evaporator that evaporates the refrigerant by absorbing heat from the ambient air during the heating operation of the HVAC subsystem 10. In particular, the exterior heat exchanger 14 may exchange heat with the ambient air forcibly blown by a cooling fan 75 so that a heat transfer rate between the exterior heat exchanger 14 and the ambient air may be further increased.

The cooling-side expansion valve 15 may be disposed on the downstream side of the exterior heat exchanger 14 in the refrigerant circulation path 20, and the cooling-side expansion valve 15 may be disposed between the exterior heat exchanger 14 and the evaporator 16 in the refrigerant circulation path 20. The cooling-side expansion valve 15 may be disposed on the upstream side of the evaporator 16 so that it may adjust the flow of the refrigerant and/or the flow rate of the refrigerant into the evaporator 16. During the cooling operation of the HVAC subsystem 10, the cooling-side expansion valve 15 may be configured to expand the refrigerant received from the exterior heat exchanger 14.

According to an exemplary embodiment, the cooling-side expansion valve 15 may be a thermal expansion valve (TXV) which senses the temperature and/or pressure of the refrigerant and adjusts the opening degree of the cooling-side expansion valve 15. Specifically, the cooling-side expansion valve 15 may be a TXV having a solenoid valve 15*a* selectively blocking or unblocking the flow of the refrigerant into an internal passage of the cooling-side expansion valve 15. The solenoid valve 15*a* may be opened or closed by the controller 100, thereby unblocking or blocking the flow of the refrigerant into the cooling-side expansion valve 15. When the solenoid valve 15*a* is opened, the refrigerant may be allowed to flow into the cooling-side expansion valve 15, and when the solenoid valve 15*a* is closed, the refrigerant may be blocked from flowing into the cooling-side expansion valve 15. According to an exemplary embodiment, the solenoid valve 15*a* may be mounted in a valve body of the cooling-side expansion valve 15, thereby opening or closing the internal passage of the cooling-side expansion valve 15. According to another exemplary embodiment, the solenoid valve 15*a* may be disposed on the upstream side of the cooling-side expansion valve 15, thereby selectively opening or closing an inlet of the cooling-side expansion valve 15. When the solenoid valve 15*a* is closed, the refrigerant may not be directed into the cooling-side expansion valve 15 and the evaporator 16, and accordingly the cooling operation of the HVAC subsystem 10 may not be performed. When the solenoid valve 15*a* is opened, the refrigerant may be directed into the cooling-side expansion valve 15 and the evaporator 16. That is, when the solenoid valve 15*a* of the cooling-side expansion valve 15 is opened to a predetermined degree, the cooling operation of the HVAC subsystem 10 may be performed.

The HVAC subsystem 10 may include an HVAC case 60 including a blower blowing the heated air or the cooled air into the passenger compartment. The HVAC case 60 may have an inlet and an outlet, and the HVAC case 60 may be configured to allow the air to be directed into the passenger compartment of the vehicle. The evaporator 16 and the interior condenser 12 may be located in the HVAC case 60. An air mixing door 61 may be disposed between the evaporator 16 and the interior condenser 12, and an electric heater 62 such as a PTC (positive temperature coefficient) heater may be disposed on the downstream side of the interior condenser 12 in an air flow direction.

The evaporator 16 may be configured to evaporate the refrigerant, thereby cooling the air directed toward a front seat area, and the interior condenser 12 may be configured to condense the refrigerant, thereby heating the air directed toward the front seat area. The electric heater 62 may be configured to heat the air directed toward the front seat area using electric energy.

The air mixing door 61 may be disposed between the evaporator 16 and the interior condenser 12. As the position of the air mixing door 61 changes, the flow rate of the air cooled by the evaporator 16 and the flow rate of the air heated by the interior condenser 12 may be mixed at a predetermined ratio. The air cooled by the evaporator 16, the air heated by the interior condenser 12, and the air mixed by the air mixing door 61 in the HVAC case 60 may be directed toward the front seat area of the passenger compartment through an air distributer unit.

The HVAC subsystem 10 according to an exemplary embodiment of the present disclosure may further include an accumulator 17 disposed on the upstream side of the compressor 11. The accumulator 17 may separate a liquid refrigerant from the refrigerant, thereby preventing the liquid refrigerant from flowing into the compressor 11.

The refrigerant circulation path 20 may include a first line 21 extending from an outlet of the compressor 11 to the interior condenser 12 or a first control valve 41, a second line 22 extending from the interior condenser 12 or the first control valve 41 to the heating-side expansion valve 13, a third line 23 extending from the heating-side expansion valve 13 to the exterior heat exchanger 14, a fourth line 24 extending from the exterior heat exchanger 14 to the cooling-side expansion valve 15, a fifth line 25 extending from the cooling-side expansion valve 15 to the evaporator 16, and a sixth line 26 extending from the evaporator 16 to the compressor 11.

The HVAC subsystem 10 according to an exemplary embodiment of the present disclosure may further include a distribution line 27 configured to allow at least a portion of the refrigerant discharged from the exterior heat exchanger 14 to be directed from the upstream side of the cooling-side expansion valve 15 to the compressor 11. The distribution line 27 may be configured to connect an upstream point 24*a* of the cooling-side expansion valve 15 and an upstream point of the compressor 11. An inlet of the distribution line 27 may be connected to the fourth line 24 of the refrigerant circulation path 20 at the upstream point of the cooling-side expansion valve 15. An outlet of the distribution line 27 may be connected to the refrigerant circulation path 20 at the upstream point of the compressor 11. Specifically, the outlet of the distribution line 27 may be connected to the sixth line 26 of the refrigerant circulation path 20 at an upstream point 26*a* of the accumulator 17 located on the upstream side of the compressor 11. Accordingly, at least a portion of the refrigerant may be directed to the compressor 11 through the distribution line 27.

The distribution line 27 may be configured to allow at least a portion of the refrigerant discharged from the exterior heat exchanger 14 to be directed toward the compressor 11 by bypassing the cooling-side expansion valve 15 and the evaporator 16. Accordingly, the refrigerant may be distributed to the distribution line 27 and the fifth line 25 at a predetermined ratio.

According to an exemplary embodiment of the present disclosure, the HVAC subsystem 10 may include the battery 18 disposed on the distribution line 27. The battery 18 may have a refrigerant passage through which the refrigerant passes, and the refrigerant passage may be provided inside or outside of the battery 18. The refrigerant passage of the battery 18 may be fluidly connected to the distribution line 27. The refrigerant passing through the distribution line 27 may pass through the refrigerant passage of the battery 18.

The HVAC subsystem 10 according to an exemplary embodiment of the present disclosure may further include a warm-up line 31 configured to allow at least a portion of the refrigerant discharged from the compressor 11 to be directed from the downstream side of the compressor 11 to the battery 18. The warm-up line 31 may be configured to connect a downstream point of the compressor 11 and an upstream point of the battery 18. An inlet of the warm-up line 31 may be connected to the first line 21 of the refrigerant circulation path 20 at the downstream point of the compressor 11, and an outlet of the warm-up line 31 may be connected to the distribution line 27 at an upstream point 27*a* of the battery 18. The refrigerant discharged from the compressor 11 may be in a relatively high temperature and high pressure state. The high temperature refrigerant may be directed to an inlet of the refrigerant passage of the battery 18 through the warm-up line 31 so that the high temperature refrigerant may directly increase the temperature of the battery 18. For example, when the ambient temperature is −15° C., the temperature of the refrigerant discharged from the compressor 11 may be 32° C.-43° C., and when the ambient temperature is −5° C., the temperature of the refrigerant discharged from the compressor 11 may be 45° C.-57° C. Meanwhile, as the RPM of the compressor 11 is adjusted, the temperature of the battery 18 may reach a target temperature. When the target temperature of the battery 18 is relatively high, the RPM of the compressor 11 may relatively increase, and when the target temperature of the battery 18 is relatively low, the RPM of the compressor 11 may relatively decrease.

The HVAC subsystem 10 according to an exemplary embodiment of the present disclosure may further include a first control valve 41 disposed at a point to which the inlet of the warm-up line 31 and the first line 21 of the refrigerant circulation path 20 are connected. The first control valve 41 may be configured to control the flow of the refrigerant in a manner that allows the refrigerant discharged from the compressor 11 to selectively be directed toward at least one of the interior condenser 12 and the refrigerant passage of the battery 18.

The first control valve 41 may include an inlet port 41*a* communicating with the outlet of the compressor 11, a first outlet port 41*b* communicating with the interior condenser 12, and a second outlet port 41*c* communicating with the inlet of the warm-up line 31.

In a state in which the first control valve 41 performs a first switching operation to allow the inlet port 41*a* to communicate with the first outlet port 41*b*, the refrigerant discharged from the compressor 11 may be directed to the interior condenser 12.

In a state in which the first control valve 41 performs a second switching operation to allow the inlet port 41*a* to communicate with the first outlet port 41*b* and the second outlet port 41*c* at the same time, the refrigerant discharged from the compressor 11 may be distributed to the interior condenser 12 and the refrigerant passage of the battery 18 at a predetermined ratio. A portion of the refrigerant discharged from the compressor 11 may be directed to the interior condenser 12 through the first outlet port 41*b* of the first control valve 41, and a remaining portion of the refrigerant discharged from the compressor 11 may be directed to the upstream point 27*a* of the battery 18 through the second outlet port 41*c* of the first control valve 41 and the warm-up line 31. The opening degree of the first outlet port 41*b* and the opening degree of the second outlet port 41*c* may be adjusted relative to each other so that the flow rate of the refrigerant into the interior condenser 12 and the flow rate of the refrigerant into the refrigerant passage of the battery 18 may be determined at a predetermined ratio. Meanwhile, when the flow rate of the refrigerant into the interior condenser 12 is relatively reduced and the performance (the condensation of the refrigerant) of the interior condenser 12 is lowered, the RPM of the compressor 11 may be relatively increased or the electric heater 62 may be activated to make up for the condensation performance of the interior condenser 12.

In a state in which the first control valve 41 performs a third switching operation to allow the inlet port 41*a* to communicate with the second outlet port 41*c*, the refrigerant discharged from the compressor 11 may be directed toward the upstream point 27*a* of the battery 18, and accordingly the refrigerant may pass through the refrigerant passage of the battery 18.

The HVAC subsystem 10 according to an exemplary embodiment of the present disclosure may further include an upstream bypass line 32 configured to allow at least a portion of the refrigerant passing through the distribution line 27 to be directed from the upstream side of the battery

18 to the downstream side of the battery 18. The upstream bypass line 32 may be configured to connect an upstream point of the battery 18 and an upstream point 26*b* of the compressor 11. An inlet of the upstream bypass line 32 may be connected to the distribution line 27 at the upstream point of the battery 18, and an outlet of the upstream bypass line 32 may be connected to the sixth line 26 of the refrigerant circulation path 20 at the upstream point 26*b* of the compressor 11. Accordingly, the refrigerant may bypass the battery 18 through the upstream bypass line 32 so that the refrigerant may be directed to the compressor 11.

The HVAC subsystem 10 according to an exemplary embodiment of the present disclosure may further include a battery-side expansion valve 19 located on the upstream side of the battery 18 in the distribution line 27. The battery-side expansion valve 19 may be configured to adjust the flow of the refrigerant and/or the flow rate of the refrigerant into the refrigerant passage of the battery 18 and to expand the refrigerant received from the exterior heat exchanger 14. According to an exemplary embodiment, the battery-side expansion valve 19 may be an EXV having an actuator 19*d*. The controller 100 may control the operation of the actuator 19*d*.

The battery-side expansion valve 19 may include an inlet port 19*a* communicating with the exterior heat exchanger 14 and an outlet port 19*b* communicating with the refrigerant passage of the battery 18. The battery-side expansion valve 19 may include a valve housing (not shown) and a valve member (not shown) moved by the actuator 19*d* in the valve housing.

The valve member may be configured to open or close the inlet port 19*a* by the actuator 19*d*. When the inlet port 19*a* is opened, the inlet port 19*a* may receive the refrigerant discharged from the exterior heat exchanger 14.

The valve member may be configured to adjust the opening degree of the outlet port 19*b* by the actuator 19*d*. When the temperature of the battery exceeds a threshold temperature (that is, waste heat of the battery is relatively high, so cooling of the battery is required), the opening degree of the outlet port 19*b* may be adjusted by the valve member and the actuator 19*d* to correspond to a cooling load of the battery 18 so that the refrigerant may be expanded at the outlet port 19*b*, and the flow rate of the refrigerant into the refrigerant passage of the battery 18 may be adjusted, and accordingly the expanded refrigerant may flow into the refrigerant passage of the battery 18. The refrigerant having flowed into the refrigerant passage of the battery 18 may directly absorb heat from the battery 18 so that the refrigerant may evaporate in the refrigerant passage of the battery 18. Thus, the battery 18 may be directly cooled by the evaporation of the refrigerant. When the cooling of the battery 18 is required, the opening degree of the outlet port 19*b* may be adjusted so that the outlet port 19*b* may serve as an expansion valve that expands the refrigerant flowing into the refrigerant passage of the battery 18.

According to an exemplary embodiment of the present disclosure, the battery-side expansion valve 19 may further include a bypass port 19*c* communicating with the upstream bypass line 32, and the valve member (not shown) may be configured to adjust the opening degree of the bypass port 19*c* by the actuator 19*d*. When the bypass port 19*c* is opened, the refrigerant discharged from the bypass port 19*c* may be directed to the compressor 11 through the upstream bypass line 32.

The bypass port 19*c* may be directly connected to the upstream bypass line 32, and the opening degree of the bypass port 19*c* may be adjusted by the actuator 19*d* so that the flow rate of the refrigerant into the upstream bypass line 32 may be adjusted. The bypass port 19*c* may serve as a flow control valve that adjusts the flow rate of the refrigerant bypassing the refrigerant passage of the battery 18.

The opening degree of the outlet port 19*b* and the opening degree of the bypass port 19*c* may be adjusted depending on the temperature of the battery, and accordingly the flow rate of the refrigerant into the refrigerant passage of the battery 18 and the flow rate of the refrigerant passing through the upstream bypass line 32 may be adjusted at a predetermined ratio. For example, when the temperature of the battery is lower than or equal to a threshold temperature (that is, the waste heat of the battery is relatively reduced), the opening degree of the outlet port 19*b* may be relatively reduced, and the opening degree of the bypass port 19*c* may be relatively increased so that the flow rate of the refrigerant into the refrigerant passage of the battery 18 may be lower than the flow rate of the refrigerant passing through the upstream bypass line 32.

The HVAC subsystem 10 according to an exemplary embodiment of the present disclosure may further include a downstream bypass line 33 configured to allow at least a portion of the refrigerant discharged from the battery 18 to be directed from the upstream side of the compressor 11 (the downstream side of the battery 18) to the heating-side expansion valve 13. The downstream bypass line 33 may be configured to connect an upstream point of the compressor 11 (a downstream point of the battery 18) and an upstream point of the heating-side expansion valve 13. An inlet of the downstream bypass line 33 may be connected to the distribution line 27 at the downstream point of the battery 18, and an outlet of the downstream bypass line 33 may be connected to the second line 22 of the refrigerant circulation path 20 at an upstream point 22*a* of the heating-side expansion valve 13. As the refrigerant discharged from the refrigerant passage of the battery 18 passes through the downstream bypass line 33, the refrigerant may bypass the accumulator 17, the compressor 11, and the interior condenser 12, and the refrigerant may directly flow from the refrigerant passage of the battery 18 to the heating-side expansion valve 13.

The HVAC subsystem 10 according to an exemplary embodiment of the present disclosure may further include a second control valve 42 disposed at a point to which the inlet of the downstream bypass line 33 and the distribution line 27 are connected. The second control valve 42 may be configured to control the flow of the refrigerant (the flow direction of the refrigerant, the flow rate of the refrigerant, and the like) between the refrigerant passage of the battery 18, the compressor 11, and the heating-side expansion valve 13. Specifically, the second control valve 42 may be configured to control the flow of the refrigerant in a manner that allows the refrigerant discharged from the refrigerant passage of the battery 18 to selectively be directed toward at least one of the compressor 11 and the heating-side expansion valve 13.

The second control valve 42 may include an inlet port 42*a* communicating with an outlet of the refrigerant passage of the battery 18, a first outlet port 42*b* communicating with the compressor 11, and a second outlet port 42*c* communicating with the downstream bypass line 33.

In a state in which the second control valve 42 performs a first switching operation to allow the inlet port 42*a* to communicate with the first outlet port 42*b*, the refrigerant discharged from the refrigerant passage of the battery 18 may be directed to the compressor 11.

In a state in which the second control valve 42 performs a second switching operation to allow the inlet port 42*a* to communicate with the second outlet port 42*c*, the refrigerant discharged from the refrigerant passage of the battery 18 may be directed to the heating-side expansion valve 13 through the downstream bypass line 33.

The power electronics cooling subsystem 50 may include the power electronics coolant circulation path 51 through which the power electronics coolant circulates, and the power electronics coolant circulation path 51 may include a power electronic pump 52 allowing the power electronics coolant to circulate. The power electronics cooling subsystem 50 may be configured to cool the power electronic components 55*a*, 55*b*, 55*c*, 55*d*, and 55*e* of a power electronics system using the power electronics coolant. Specifically, the power electronics cooling subsystem 50 may include an autonomous driving controller 58, the plurality of power electronic components 55*a*, 55*b*, 55*c*, 55*d*, and 55*e*, a power electronic radiator 53, a reservoir 54, and the power electronic pump 52 connected to each other through the power electronics coolant circulation path 51.

The autonomous driving controller 58 may be configured to control an autonomous driving system of the vehicle.

According to an exemplary embodiment, the plurality of power electronic components 55*a*, 55*b*, 55*c*, 55*d*, and 55*e* may include an integrated charging control unit (ICCU) 55*a*, a front-wheel-side inverter 55*b*, a rear-wheel-side inverter 55*c*, a rear-wheel-side motor cooler 55*d*, and a front-wheel-side motor cooler 55*e*.

The autonomous driving controller 58 and each of the power electronic components 55*a*, 55*b*, 55*c*, 55*d*, and 55*e* may have a coolant passage provided inside or outside thereof, and the power electronics coolant may pass through the coolant passage.

The power electronic radiator 53 may be adjacent to the front grille of the vehicle, and the power electronic radiator 53 may be configured to transfer heat between the coolant passing through an internal passage thereof and the air passing by an exterior surface of the power electronic radiator 53.

The cooling fan 75 may be located behind the exterior heat exchanger 14 and the power electronic radiator 53, and the exterior heat exchanger 14 and the power electronic radiator 53 may exchange heat with the ambient air forcibly blown by the cooling fan 75. An active air flap may be configured to open or close the front grille of the vehicle. As the active air flap is opened, the ambient air may directly contact the exterior heat exchanger 14 and the power electronic radiator 53 through the front grille of the vehicle so that the refrigerant passing through the internal passage of the exterior heat exchanger 14 and the power electronics coolant passing through the internal passage of the power electronic radiator 53 may exchange heat with the ambient air.

The reservoir 54 may be located between an inlet of the power electronic radiator 53 and an outlet of the power electronic pump 52. The reservoir 54 may be configured to temporarily store and make up the power electronics coolant so that the circulating flow rate of the power electronics coolant may be constantly maintained.

The power electronic pump 52 may be disposed on the downstream side of the power electronic components 55*a*, 55*b*, 55*c*, 55*d*, and 55*e*. The power electronic pump 52 may be configured to allow the power electronics coolant to circulate.

The power electronics cooling subsystem 50 may include a bypass line 56 connecting an upstream point 51*a* of the power electronic radiator 53 and a downstream point of the power electronic radiator 53. One end of the bypass line 56 may be connected to the power electronics coolant circulation path 51 at the upstream point 51*a* of the power electronic radiator 53, and the other end of the bypass line 56 may be connected to the power electronics coolant circulation path 51 at the downstream point of the power electronic radiator 53.

The power electronics cooling subsystem 50 may further include a switching valve 57 disposed at the other end of the bypass line 56. The switching valve 57 may be configured to adjust the flow of the power electronics coolant between the bypass line 56 and the power electronics coolant circulation path 51. The switching valve 57 may perform a switching operation to allow the power electronics coolant to pass through the power electronic radiator 53 or the bypass line 56.

The switching valve 57 may include a first port 57*a* communicating with the power electronic components 55*a*, 55*b*, 55*c*, 55*d*, and 55*e*, a second port 57*b* communicating with the bypass line 56, and a third port 57*c* communicating with the power electronic radiator 53.

In a state in which the switching valve 57 performs a first switching operation to allow the first port 57*a* to communicate with the third port 57*c*, the power electronics coolant discharged from the outlet of the power electronic pump 52 may pass through the power electronic radiator 53.

In a state in which the switching valve 57 performs a second switching operation to allow the first port 57*a* to communicate with the second port 57*b*, the power electronics coolant discharged from the outlet of the power electronic pump 52 may pass through the bypass line 56.

As described above, the power electronics coolant may selectively pass through the power electronic radiator 53 or the bypass line 56 by the switching operation of the switching valve 57. For example, when the cooling of the autonomous driving controller 58 and the cooling of the power electronic components 55*a*, 55*b*, 55*c*, 55*d*, and 55*e* are required, the switching valve 57 may perform the switching operation to allow the power electronics coolant to pass through the power electronic radiator 53. When it is necessary to transfer the waste heat of the power electronic components 55*a*, 55*b*, 55*c*, 55*d*, and 55*e* to the refrigerant, the switching valve 57 may perform the switching operation to allow the power electronics coolant to pass through the bypass line 56.

The vehicular thermal management system according to an exemplary embodiment of the present disclosure may include a heat exchanger 70 thermally connecting the HVAC subsystem 10 and the power electronics cooling subsystem 50. The heat exchanger 70 may be configured to transfer heat between the refrigerant circulating through the HVAC subsystem 10 and the power electronics coolant circulating through the power electronics cooling subsystem 50.

The heat exchanger 70 may include a first passage 71 through which the refrigerant passes and a second passage 72 through which the power electronics coolant passes.

The first passage 71 may be fluidly connected to the third line 23 of the refrigerant circulation path 20 of the HVAC subsystem 10, and accordingly at least a portion of the refrigerant may pass through the first passage 71 of the heat exchanger 70 through the third line 23 of the refrigerant circulation path 20. That is, the first passage 71 may be fluidly connected to the refrigerant circulation path 20 between the heating-side expansion valve 13 and the exterior heat exchanger 14.

The second passage 72 may be fluidly connected to the power electronics coolant circulation path 51 of the power electronics cooling subsystem 50, and accordingly at least a portion of the power electronics coolant may pass through the second passage 72 of the heat exchanger 70 through the power electronics coolant circulation path 51. The second passage 72 may be fluidly connected to the power electronics coolant circulation path 51 at the upstream point of the power electronic components 55*a*, 55*b*, 55*c*, 55*d*, and 55*e*. In addition, the second passage 72 may be fluidly connected to the power electronics coolant circulation path 51 at the downstream point of the power electronic radiator 53.

When the HVAC subsystem 10 performs the heating operation, the refrigerant may be expanded by the heating-side expansion valve 13 and then pass through the first passage 71 of the heat exchanger 70. The refrigerant passing through the first passage 71 of the heat exchanger 70 may absorb heat from the power electronics coolant passing through the second passage 72 of the heat exchanger 70 and be evaporated. That is, the heat exchanger 70 may serve as an evaporator that evaporates the refrigerant during the heating operation of the HVAC subsystem 10.

When the HVAC subsystem 10 performs the cooling operation, the heating-side expansion valve 13 may be fully opened so that the refrigerant may not be expanded in the heating-side expansion valve 13, and the refrigerant passing through the first passage 71 of the heat exchanger 70 may transfer heat to the power electronics coolant passing through the second passage 72 of the heat exchanger 70 so that the refrigerant may be condensed. That is, the heat exchanger 70 may serve as a condenser that condenses the refrigerant during the cooling operation of the HVAC subsystem 10.

The HVAC subsystem 10 according to an exemplary embodiment of the present disclosure may further include a dehumidification bypass line 29 configured to allow at least a portion of the refrigerant discharged from the heating-side expansion valve 13 to be directed from the upstream side of the first passage 71 of the heat exchanger 70 to the evaporator 16. The dehumidification bypass line 29 may be configured to connect a downstream point 23*a* of the heating-side expansion valve 13 (that is, the upstream point 23*a* of the first passage 71 of the heat exchanger 70) and an upstream point 25*a* of the evaporator 16. Specifically, a branch line 28 may branch off from a point between the heating-side expansion valve 13 and the first passage 71 of the heat exchanger 70. An inlet of the dehumidification bypass line 29 may be connected to the branch line 28, and an outlet of the dehumidification bypass line 29 may be connected to the fifth line 25 of the refrigerant circulation path 20 at the upstream point 25*a* of the evaporator 16.

The HVAC subsystem 10 according to an exemplary embodiment of the present disclosure may further include a heat exchanger bypass line 30 configured to allow at least a portion of the refrigerant discharged from the heating-side expansion valve 13 to be directed to the downstream side of the first passage 71 of the heat exchanger 70 by bypassing the first passage 71 of the heat exchanger 70. The heat exchanger bypass line 30 may be configured to connect the upstream point 23*a* of the first passage 71 of the heat exchanger 70 and a downstream point 23*b* of the first passage 71 of the heat exchanger 70. Specifically, an inlet of the heat exchanger bypass line 30 may be connected to the branch line 28 on the downstream side of the heating-side expansion valve 13, and an outlet of the heat exchanger bypass line 30 may be connected to the third line 23 of the refrigerant circulation path 20 at the downstream point 23*b* of the first passage 71 of the heat exchanger 70. The refrigerant discharged from the heating-side expansion valve 13 may be directed from the upstream side of the first passage 71 of the heat exchanger 70 to the downstream side of the first passage 71 of the heat exchanger 70 through the branch line 28 and the heat exchanger bypass line 30 so that the refrigerant discharged from the heating-side expansion valve 13 may bypass the first passage 71 of the heat exchanger 70.

The HVAC subsystem 10 according to an exemplary embodiment of the present disclosure may further include a third control valve 43 disposed at a point to which the branch line 28, the dehumidification bypass line 29, and the heat exchanger bypass line 30 are connected. The third control valve 43 may be configured to control the flow of the refrigerant (the flow direction of the refrigerant, the flow rate of the refrigerant, and the like) between the heating-side expansion valve 13, the evaporator 16, and the exterior heat exchanger 14. The third control valve 43 may be configured to control the flow of the refrigerant in a manner that allows the refrigerant discharged from the heating-side expansion valve 13 to be directed selectively toward at least one of the evaporator 16, the first passage 71 of the heat exchanger 70, and the downstream point 23*b* of the first passage 71 of the heat exchanger 70.

The third control valve 43 may include an inlet port 43*a* communicating with the branch line 28, a first outlet port 43*b* communicating with the heat exchanger bypass line 30, and a second outlet port 43*c* communicating with the dehumidification bypass line 29.

In a state in which the third control valve 43 performs a first switching operation to allow the inlet port 43*a* to be closed, the refrigerant discharged from the heating-side expansion valve 13 may be directed toward the first passage 71 of the heat exchanger 70.

In a state in which the third control valve 43 performs a second switching operation to allow the inlet port 43*a* to communicate with the first outlet port 43*b*, the refrigerant discharged from the heating-side expansion valve 13 may be directed toward the downstream point 23*b* of the first passage 71 of the heat exchanger 70 through the heat exchanger bypass line 30. In addition, the refrigerant may be directed from the downstream point 23*b* of the first passage 71 of the heat exchanger 70 to any one of the exterior heat exchanger 14 and a bypass line 35.

In a state in which the third control valve 43 performs a third switching operation to allow the inlet port 43*a* to communicate with the second outlet port 43*c*, the refrigerant discharged from the heating-side expansion valve 13 may be directed toward the evaporator 16 through the dehumidification bypass line 29. When dehumidification is required in the passenger compartment during the heating operation of the HVAC subsystem 10, the third control valve 43 may perform the third switching operation to allow at least a portion of the refrigerant discharged from the heating-side expansion valve 13 to be directed into the evaporator 16 through the dehumidification bypass line 29, and accordingly the refrigerant having flowed into the evaporator 16 may cool the air passing by an exterior surface of the evaporator 16, thereby dehumidifying the air flowing into the passenger compartment.

The HVAC subsystem 10 according to an exemplary embodiment of the present disclosure may further include a heating-side bypass line 34 configured to allow the refrigerant discharged from the first passage 71 of the heat exchanger 70 to be directed to the compressor 11. The heating-side bypass line 34 may be configured to connect a downstream point of the first passage 71 of the heat exchanger 70 and the upstream point 26*b* of the compressor 11. Specifically, an inlet of the heating-side bypass line 34 may be connected to the third line 23 of the refrigerant circulation path 20 at the downstream point of the first passage 71 of the heat exchanger 70, and an outlet of the heating-side bypass line 34 may be connected to the sixth line 26 of the refrigerant circulation path 20 at the upstream point 26*b* of the compressor 11. Accordingly, the refrigerant discharged from the first passage 71 of the heat exchanger 70 may bypass the exterior heat exchanger 14, the battery-side expansion valve 19, and the refrigerant passage of the battery 18 through the heating-side bypass line 34 so that the refrigerant may directly flow from the first passage 71 of the heat exchanger 70 to the compressor 11.

The HVAC subsystem 10 according to an exemplary embodiment of the present disclosure may further include a fourth control valve 44 disposed at a point to which the heating-side bypass line 34 and the third line 23 of the refrigerant circulation path 20 are connected. The fourth control valve 44 may be configured to control the flow of the refrigerant (the flow direction of the refrigerant, the flow rate of the refrigerant, and the like) between the first passage 71 of the heat exchanger 70, the exterior heat exchanger 14, and the compressor 11. The fourth control valve 44 may be configured to control the flow of the refrigerant in a manner that allows the refrigerant discharged from the first passage 71 of the heat exchanger 70 to selectively be directed toward the exterior heat exchanger 14 and/or the compressor 11.

The fourth control valve 44 may include an inlet port 44*a* communicating with the first passage 71 of the heat exchanger 70, a first outlet port 44*b* communicating with the exterior heat exchanger 14, and a second outlet port 44*c* communicating with the heating-side bypass line 34.

In a state in which the fourth control valve 44 performs a first switching operation to allow the inlet port 44*a* to communicate with the first outlet port 44*b*, the refrigerant discharged from the first passage 71 of the heat exchanger 70 may be directed to the exterior heat exchanger 14.

In a state in which the fourth control valve 44 performs a second switching operation to allow the inlet port 44*a* to communicate with the second outlet port 44*c*, the refrigerant discharged from the first passage 71 of the heat exchanger 70 may be directed to the compressor 11 through the heating-side bypass line 34.

The HVAC subsystem 10 according to an exemplary embodiment of the present disclosure may further include the bypass line 35 configured to allow the refrigerant discharged from the heating-side expansion valve 13 and/or the first passage 71 of the heat exchanger 70 to bypass the exterior heat exchanger 14. An inlet of the bypass line 35 may be connected to the third line 23 of the refrigerant circulation path 20 at an upstream point of the exterior heat exchanger 14, and an outlet of the bypass line 35 may be connected to the fourth line 24 of the refrigerant circulation path 20 at a downstream point 24*b* of the exterior heat exchanger 14.

The HVAC subsystem 10 according to an exemplary embodiment of the present disclosure may further include a switching valve 45 disposed at a point to which the inlet of the bypass line 35 and the third line 23 of the refrigerant circulation path 20 are connected. The switching valve 45 may be configured to allow the refrigerant discharged from the heating-side expansion valve 13 and/or the first passage 71 of the heat exchanger 70 to selectively bypass the exterior heat exchanger 14.

The switching valve 45 may include an inlet port 45*a* communicating with the first passage 71 of the heat exchanger 70, a first outlet port 45*b* communicating with the exterior heat exchanger 14, and a second outlet port 45*c* communicating with the bypass line 35.

In a state in which the switching valve 45 performs a first switching operation to allow the inlet port 45*a* to communicate with the first outlet port 45*b*, the refrigerant discharged from the heating-side expansion valve 13 and/or the first passage 71 of the heat exchanger 70 may be directed to the exterior heat exchanger 14.

In a state in which the switching valve 45 performs a second switching operation to allow the inlet port 45*a* to communicate with the second outlet port 45*c*, the refrigerant discharged from the heating-side expansion valve 13 and/or the first passage 71 of the heat exchanger 70 may pass through the bypass line 35 so that the refrigerant may bypass the exterior heat exchanger 14.

As described above, the refrigerant may selectively pass through the exterior heat exchanger 14 or the bypass line 35 by the switching operation of the switching valve 45. For example, in a condition in which icing occurs on the exterior surface (heat exchange surface) of the exterior heat exchanger 14, the switching valve 45 may perform the second switching operation to allow the refrigerant to pass through the bypass line 35. In a condition in which icing does not occur on the exterior surface (heat exchange surface) of the exterior heat exchanger 14, the switching valve 45 may perform the first switching operation to allow the refrigerant to pass through the exterior heat exchanger 14.

The controller 100 may be configured to control respective operations of the compressor 11, the actuator 13*a* of the heating-side expansion valve 13, the solenoid valve 15*a* of the cooling-side expansion valve 15, the actuator 19*d* of the battery-side expansion valve 19, the air mixing door 61, an actuator of the first control valve 41, an actuator of the second control valve 42, an actuator of the third control valve 43, an actuator of the fourth control valve 44, an actuator of the switching valve 45, an actuator of the air mixing door 61, an actuator of the switching valve 57, and an actuator of the power electronic pump 52. Thus, the overall operation of the HVAC subsystem 10 and the power electronics cooling subsystem 50 may be controlled by the controller 100. According to an exemplary embodiment, the controller 100 may be a full automatic temperature control (FATC) system.

The controller 100 may include a processor and a memory. The processor may be programmed to receive instructions stored in the memory and to transmit instructions to various actuators. The memory may be a data store such as a hard disk drive, a solid state drive, a server, a volatile storage medium, and a non-volatile storage medium.

A battery management system 110 may transmit instructions for the cooling of the battery 18 and the heating of the battery 18 to the controller 100, and accordingly the controller 100 may control the operation of the compressor 11 and the operation of the actuator 19*d* of the battery-side expansion valve 19.

Figure 2:
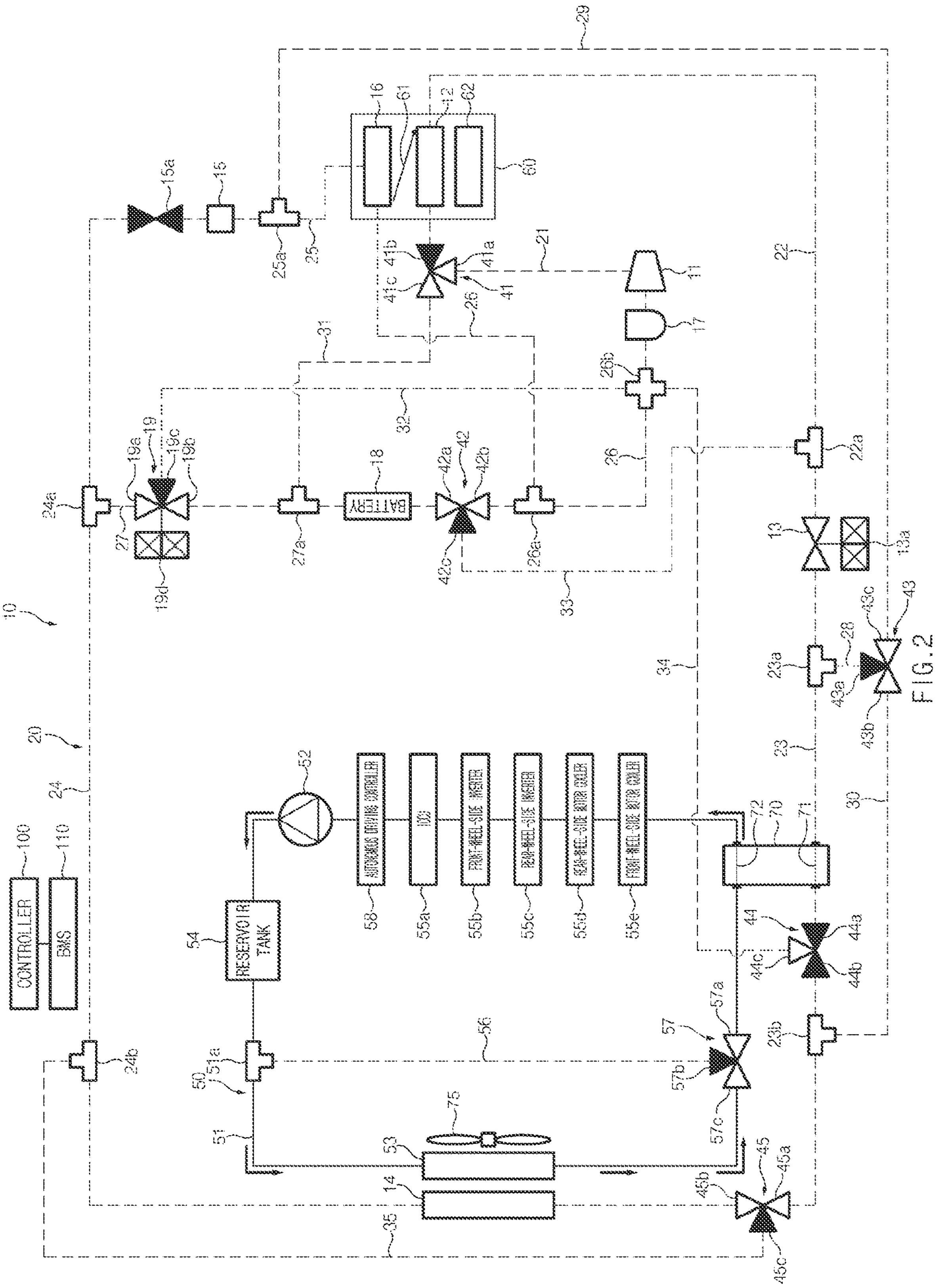
FIG. 2 illustrates the flow of a power electronics coolant when a heating, ventilation, and air conditioning (HVAC) subsystem does not operate and power electronic components and an autonomous driving controller are cooled by a power electronic radiator in a vehicular thermal management system according to an exemplary embodiment of the present disclosure.

FIG. 2 illustrates the flow of the power electronics coolant when the HVAC subsystem 10 does not operate and the power electronic components 55*a*, 55*b*, 55*c*, 55*d*, and 55*e* and the autonomous driving controller 58 are cooled by the power electronic radiator 53.

In a state in which the compressor 11 of the HVAC subsystem 10 is stopped and the switching valve 57 performs the first switching operation to allow the first port 57*a* to communicate with the third port 57*c*, the power electronics coolant discharged from the outlet of the power electronic pump 52 may pass through the power electronic radiator 53 so that the power electronics coolant may release heat to the ambient air through the power electronic radiator 53, and the power electronics coolant cooled by the ambient air may cool the power electronic components 55*a*, 55*b*, 55*c*, 55*d*, and 55*e* and the autonomous driving controller 58.

Figure 3:
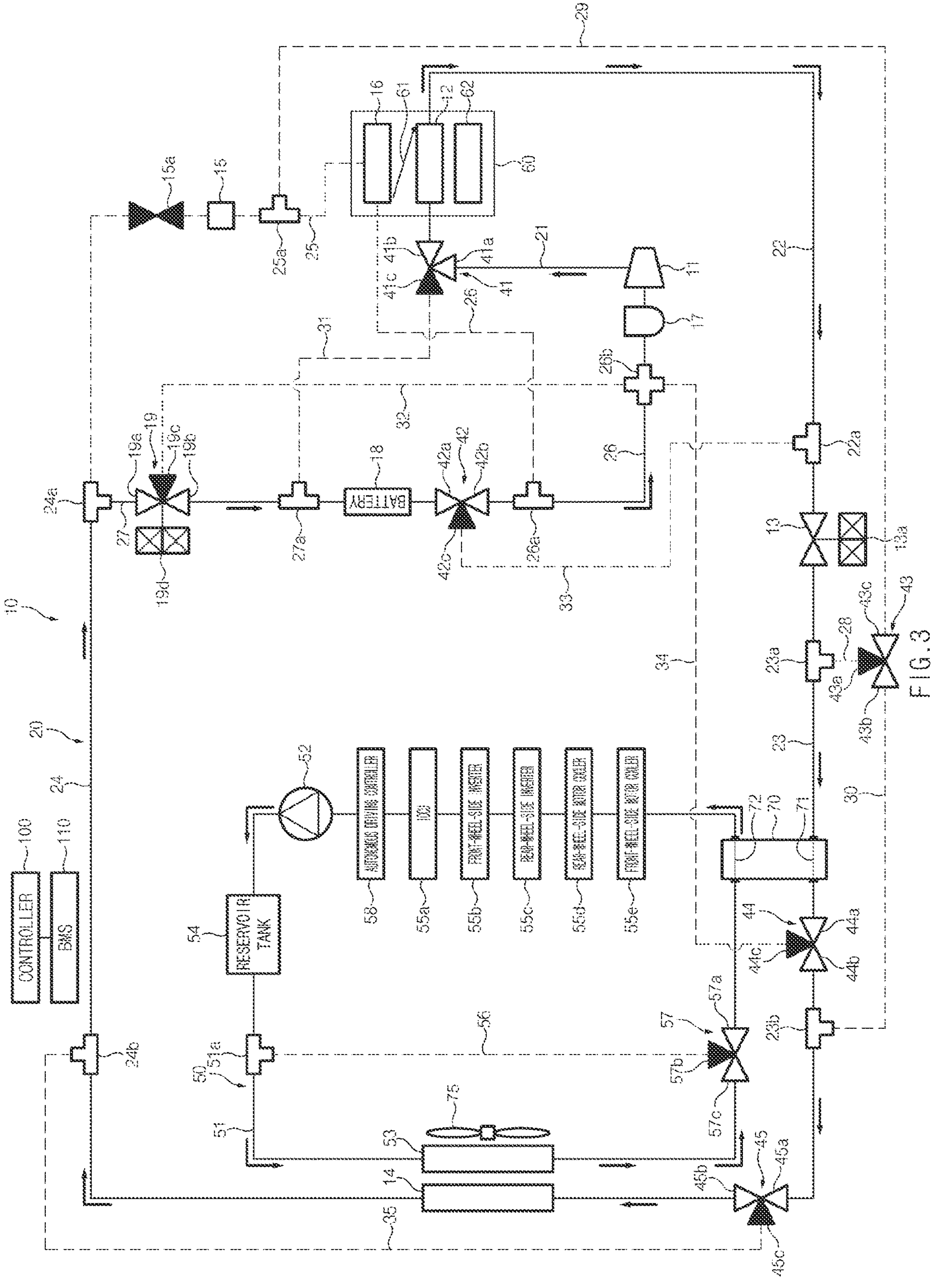
FIG. 3 illustrates the flow of a refrigerant and the flow of a power electronics coolant when a battery is directly cooled by the refrigerant and power electronic components and an autonomous driving controller are cooled by a power electronic radiator in a vehicular thermal management system according to an exemplary embodiment of the present disclosure.

FIG. 3 illustrates the flow of the refrigerant and the flow of the power electronics coolant when the battery 18 is directly cooled by the refrigerant and the power electronic components 55*a*, 55*b*, 55*c*, 55*d*, and 55*e* and the autonomous driving controller 58 are cooled by the power electronic radiator 53.

In a state in which the solenoid valve 15*a* of the cooling-side expansion valve 15 is closed, the inlet port 19*a* of the battery-side expansion valve 19 is opened, the outlet port 19*b* of the battery-side expansion valve 19 is opened to a predetermined degree, the bypass port 19*c* of the battery-side expansion valve 19 is closed, the first control valve 41 performs the first switching operation to allow the inlet port 41*a* to communicate with the first outlet port 41*b*, the second control valve 42 performs the first switching operation to allow the inlet port 42*a* to communicate with the first outlet port 42*b*, the third control valve 43 performs the first switching operation to allow the inlet port 43*a* to be closed, the fourth control valve 44 performs the first switching operation to allow the inlet port 44*a* to communicate with the first outlet port 44*b*, and the switching valve 45 performs the first switching operation to allow the inlet port 45*a* to communicate with the first outlet port 45*b*, the refrigerant may sequentially pass through the compressor 11, the interior condenser 12, the heating-side expansion valve 13, the first passage 71 of the heat exchanger 70, the exterior heat exchanger 14, the battery-side expansion valve 19, the battery 18, and the accumulator 17.

The heating-side expansion valve 13 may be opened to a predetermined degree so that the refrigerant discharged from the interior condenser 12 may be primarily expanded, and the primarily expanded refrigerant may be primarily evaporated by the heat exchanger 70 and the exterior heat exchanger 14. In the heat exchanger 70, the refrigerant passing through the first passage 71 may absorb heat from the power electronics coolant passing through the second passage 72 so that the refrigerant may be evaporated, and the power electronics coolant may be cooled.

The opening degree of the outlet port 19*b* of the battery-side expansion valve 19 may be adjusted by the actuator 19*d* to correspond to the cooling load of the battery 18, and accordingly the refrigerant may be secondarily expanded at the outlet port 19*b*, and the secondarily expanded refrigerant may be directed into the refrigerant passage of the battery 18. The refrigerant directed into the refrigerant passage of the battery 18 may directly absorb heat from the battery 18 so that the refrigerant may be secondarily evaporated in the refrigerant passage of the battery 18, and accordingly the battery 18 may be directly cooled by the evaporation of the refrigerant.

In a state in which the switching valve 57 performs the first switching operation to allow the first port 57*a* to communicate with the third port 57*c*, the power electronics coolant discharged from the outlet of the power electronic pump 52 may pass through the power electronic radiator 53 so that the power electronics coolant may release heat to the ambient air through the power electronic radiator 53 and be cooled. The power electronics coolant cooled by the ambient air may be cooled by the heat exchanger 70, and the power electronics coolant cooled by the heat exchanger 70 may cool the power electronic components 55*a*, 55*b*, 55*c*, 55*d*, and 55*e* and the autonomous driving controller 58.

Figure 4:
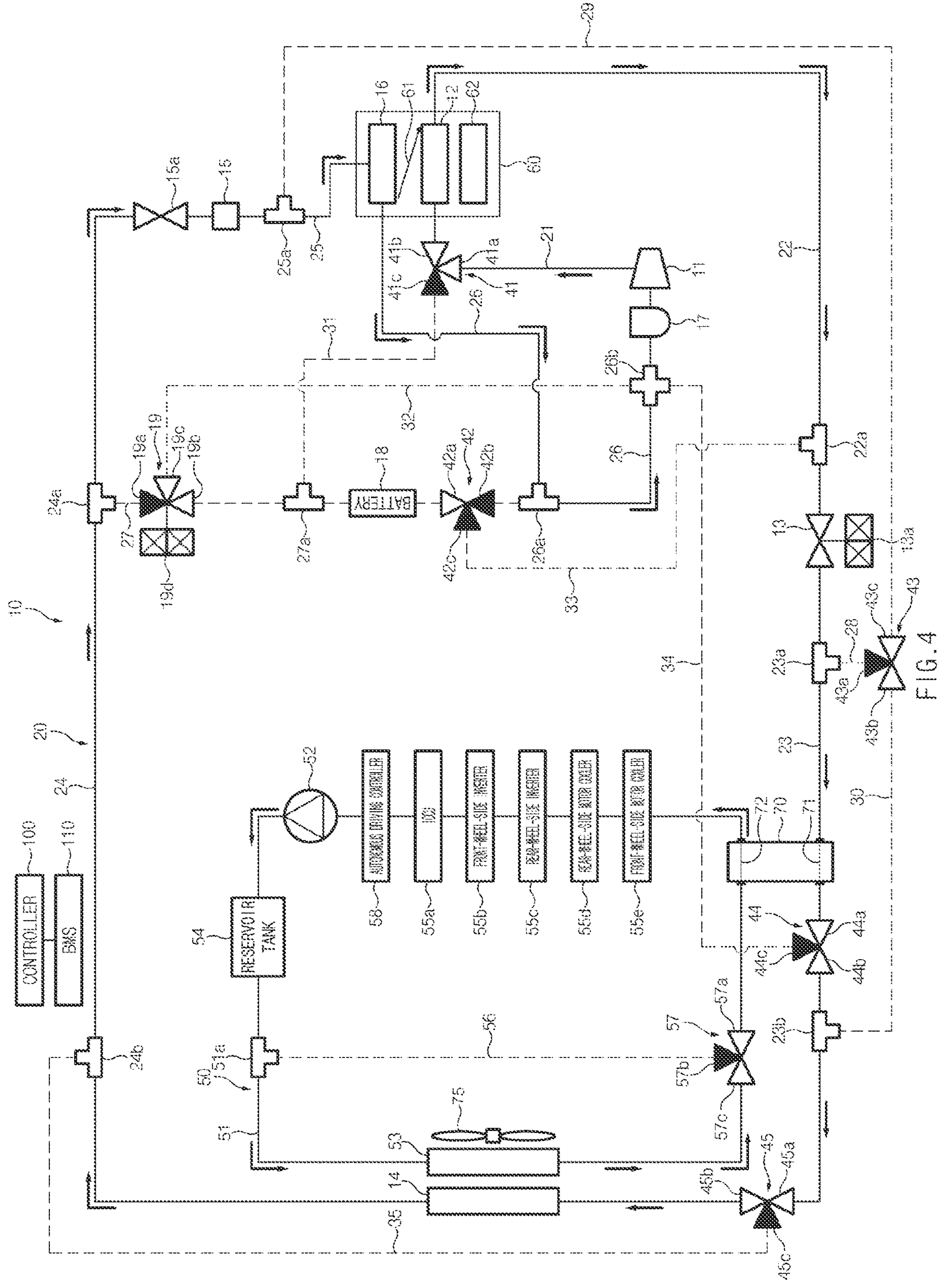
FIG. 4 illustrates the flow of a refrigerant and the flow of a power electronics coolant when an HVAC subsystem operates in a cooling mode and power electronic components and an autonomous driving controller are cooled by a power electronic radiator in a vehicular thermal management system according to an exemplary embodiment of the present disclosure.

FIG. 4 illustrates the flow of the refrigerant and the flow of the power electronics coolant when the HVAC subsystem 10 operates in the cooling mode and the power electronic components 55*a*, 55*b*, 55*c*, 55*d*, and 55*e* and the autonomous driving controller 58 are cooled by the power electronic radiator 53.

In a state in which the inlet port 19*a* of the battery-side expansion valve 19 is closed, the solenoid valve 15*a* of the cooling-side expansion valve 15 is opened, the first control valve 41 performs the first switching operation to allow the inlet port 41*a* to communicate with the first outlet port 41*b*, the third control valve 43 performs the first switching operation to allow the inlet port 43*a* to be closed, the fourth control valve 44 performs the first switching operation to allow the inlet port 44*a* to communicate with the first outlet port 44*b*, and the switching valve 45 performs the first switching operation to allow the inlet port 45*a* to communicate with the first outlet port 45*b*, the refrigerant may sequentially pass through the compressor 11, the interior condenser 12, the heating-side expansion valve 13, the first passage 71 of the heat exchanger 70, the exterior heat exchanger 14, the cooling-side expansion valve 15, the evaporator 16, and the accumulator 17. Here, the heating-side expansion valve 13 may be fully opened (the opening degree of the heating-side expansion valve 13 is 100%) so that the refrigerant may pass through the heating-side expansion valve 13, and thus the refrigerant may be prevented from being expanded by the heating-side expansion valve 13. The opening degree of the cooling-side expansion valve 15 may be adjusted so that the refrigerant may be appropriately expanded by the cooling-side expansion valve 15 and then be directed into the evaporator 16.

In a state in which the switching valve 57 performs the first switching operation to allow the first port 57*a* to communicate with the third port 57*c*, the power electronics coolant discharged from the outlet of the power electronic pump 52 may pass through the power electronic radiator 53 so that the power electronics coolant may release heat to the ambient air through the power electronic radiator 53 and be cooled. The power electronics coolant cooled by the ambient air may be cooled by the heat exchanger 70, and the power electronics coolant cooled by the heat exchanger 70 may cool the power electronic components 55*a*, 55*b*, 55*c*, 55*d*, and 55*e* and the autonomous driving controller 58.

Figure 5:
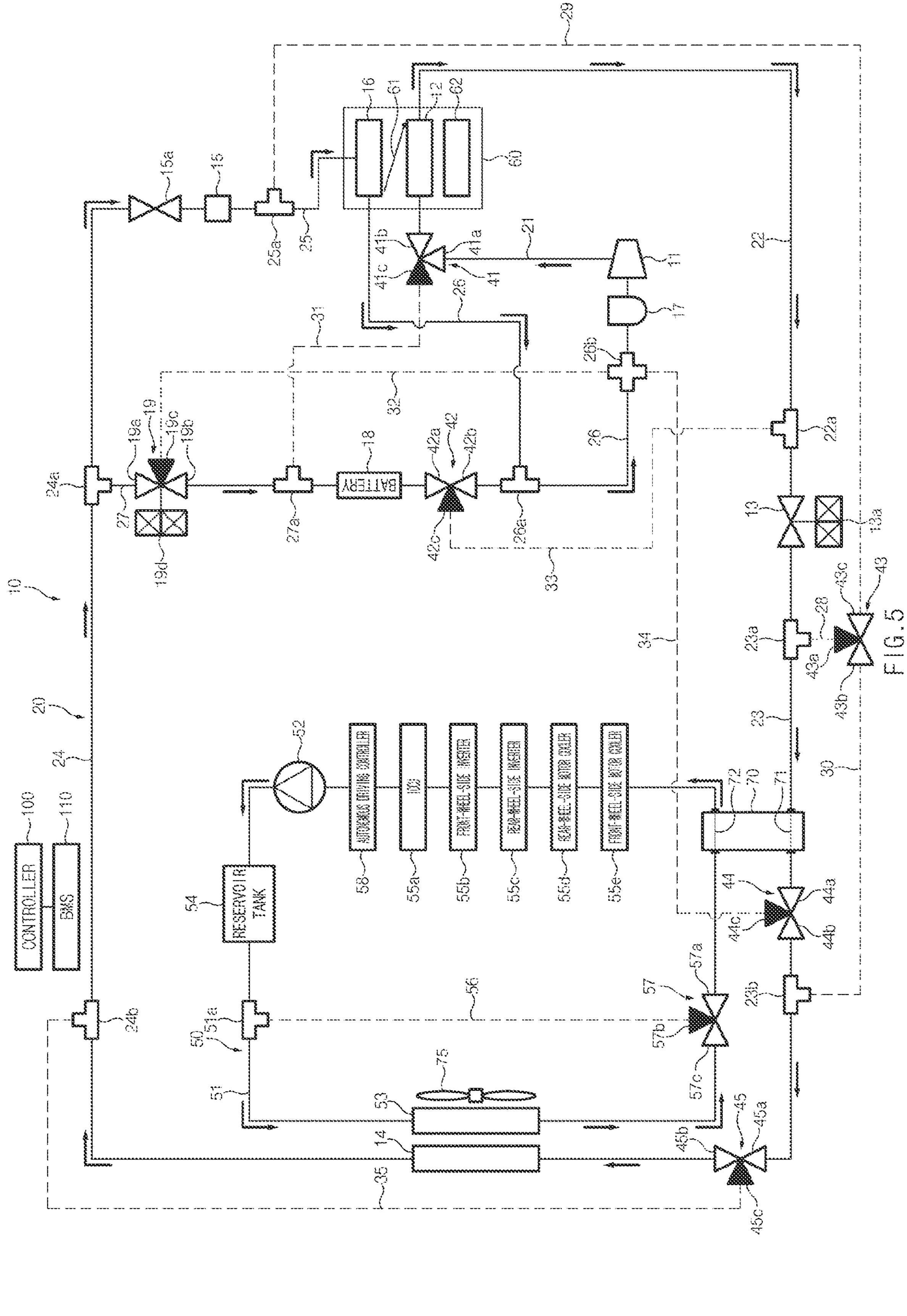
FIG. 5 illustrates the flow of a refrigerant and the flow of a power electronics coolant when an HVAC subsystem operates in a cooling mode, a battery is directly cooled by the refrigerant, and power electronic components and an autonomous driving controller are cooled by a power electronic radiator in a vehicular thermal management system according to an exemplary embodiment of the present disclosure.

FIG. 5 illustrates the flow of the refrigerant and the flow of the power electronics coolant when the HVAC subsystem 10 operates in the cooling mode, the battery 18 is directly cooled by the refrigerant, and the power electronic components 55*a*, 55*b*, 55*c*, 55*d*, and 55*e* and the autonomous driving controller 58 are cooled by the power electronic radiator 53.

In a state in which the inlet port 19*a* of the battery-side expansion valve 19 is opened, the outlet port 19*b* of the battery-side expansion valve 19 is opened to a predetermined degree, the bypass port 19*c* of the battery-side expansion valve 19 is closed, the solenoid valve 15*a* of the cooling-side expansion valve 15 is opened, the first control valve 41 performs the first switching operation to allow the inlet port 41*a* to communicate with the first outlet port 41*b*, the second control valve 42 performs the first switching operation to allow the inlet port 42*a* to communicate with the first outlet port 42*b*, the third control valve 43 performs the first switching operation to allow the inlet port 43*a* to be closed, the fourth control valve 44 performs the first switching operation to allow the inlet port 44*a* to communicate with the first outlet port 44*b*, and the switching valve 45 performs the first switching operation to allow the inlet port

45*a* to communicate with the first outlet port 45*b*, the refrigerant sequentially passing through the compressor 11, the interior condenser 12, the heating-side expansion valve 13, the first passage 71 of the heat exchanger 70, and the exterior heat exchanger 14 may be distributed to the cooling-side expansion valve 15 and the battery-side expansion valve 19 at a predetermined ratio at the upstream point 24*a* of the cooling-side expansion valve 15 and then be joined in the accumulator 17. A portion of the refrigerant discharged from the cooling-side expansion valve 15 may sequentially pass through the evaporator 16 and the accumulator 17, and a remaining portion of the refrigerant discharged from the battery-side expansion valve 19 may sequentially pass through the refrigerant passage of the battery 18 and the accumulator 17.

In a state in which the switching valve 57 performs the first switching operation to allow the first port 57*a* to communicate with the third port 57*c*, the power electronics coolant discharged from the outlet of the power electronic pump 52 may pass through the power electronic radiator 53 so that the power electronics coolant may release heat to the ambient air through the power electronic radiator 53 and be cooled. The power electronics coolant cooled by the ambient air may be cooled by the heat exchanger 70, and the power electronics coolant cooled by the heat exchanger 70 may cool the power electronic components 55*a*, 55*b*, 55*c*, 55*d*, and 55*e* and the autonomous driving controller 58.

Figure 6:
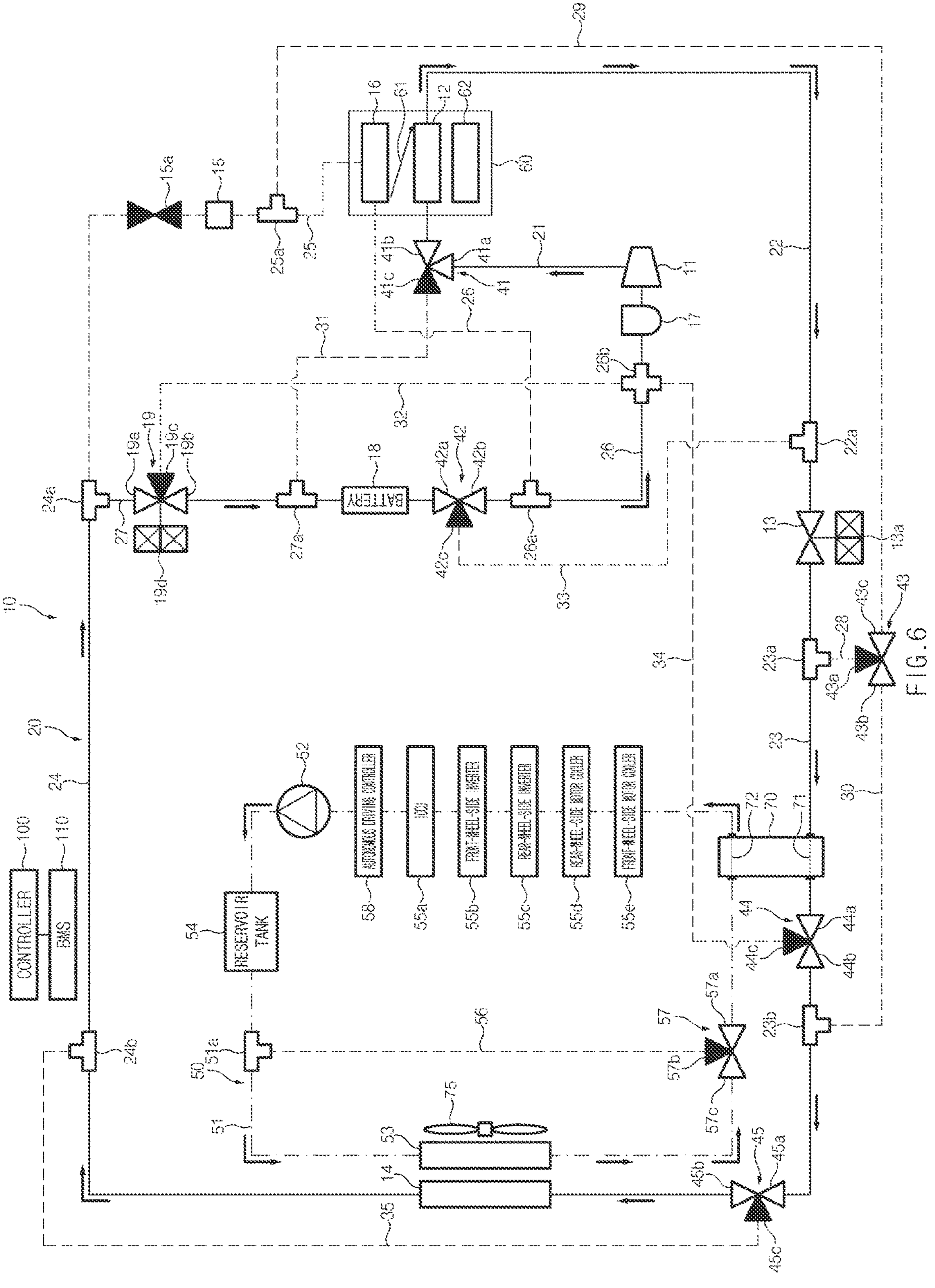
FIG. 6 illustrates the flow of a refrigerant when a battery is directly cooled by the refrigerant in a vehicular thermal management system according to an exemplary embodiment of the present disclosure.

FIG. 6 illustrates the flow of the refrigerant when the battery 18 is directly cooled by the refrigerant.

In a state in which the solenoid valve 15*a* of the cooling-side expansion valve 15 is closed, the inlet port 19*a* of the battery-side expansion valve 19 is opened, the outlet port 19*b* of the battery-side expansion valve 19 is opened to a predetermined degree, the bypass port 19*c* of the battery-side expansion valve 19 is closed, the first control valve 41 performs the first switching operation to allow the inlet port 41*a* to communicate with the first outlet port 41*b*, the second control valve 42 performs the first switching operation to allow the inlet port 42*a* to communicate with the first outlet port 42*b*, the third control valve 43 performs the first switching operation to allow the inlet port 43*a* to be closed, the fourth control valve 44 performs the first switching operation to allow the inlet port 44*a* to communicate with the first outlet port 44*b*, and the switching valve 45 performs the first switching operation to allow the inlet port 45*a* to communicate with the first outlet port 45*b*, the refrigerant may sequentially pass through the compressor 11, the interior condenser 12, the heating-side expansion valve 13, the first passage 71 of the heat exchanger 70, the exterior heat exchanger 14, the battery-side expansion valve 19, the battery 18, and the accumulator 17.

The heating-side expansion valve 13 may be opened to a predetermined degree so that the refrigerant discharged from the interior condenser 12 may be primarily expanded, and the primarily expanded refrigerant may be primarily evaporated by the heat exchanger 70 and the exterior heat exchanger 14. In the heat exchanger 70, the refrigerant passing through the first passage 71 may absorb heat from the power electronics coolant passing through the second passage 72 so that the refrigerant may be evaporated, and the power electronics coolant may be cooled.

The opening degree of the outlet port 19*b* of the battery-side expansion valve 19 may be adjusted by the actuator 19*d* to correspond to the cooling load of the battery 18, and accordingly the refrigerant may be secondarily expanded at the outlet port 19*b*, and the secondarily expanded refrigerant may be directed into the refrigerant passage of the battery 18. The refrigerant directed into the refrigerant passage of the battery 18 may directly absorb heat from the battery 18 so that the refrigerant may be secondarily evaporated in the refrigerant passage of the battery 18, and accordingly the battery 18 may be directly cooled by the evaporation of the refrigerant.

When the cooling load of the battery 18 is higher than or equal to a threshold load, the power electronic pump 52 may operate so that the power electronics coolant may circulate through the power electronics coolant circulation path 51 by the power electronic pump 52. In a state in which the switching valve 57 performs the first switching operation to allow the first port 57*a* to communicate with the third port 57*c*, the power electronics coolant discharged from the outlet of the power electronic pump 52 may pass through the power electronic radiator 53 so that the power electronics coolant may release heat to the ambient air through the power electronic radiator 53 and be cooled. The power electronics coolant cooled by the ambient air may be cooled by the heat exchanger 70, and the power electronics coolant cooled by the heat exchanger 70 may cool the power electronic components 55*a*, 55*b*, 55*c*, 55*d*, and 55*e* and the autonomous driving controller 58.

When the cooling load of the battery 18 is lower than the threshold load, the power electronic pump 52 may be stopped, and accordingly the power electronics coolant may not circulate.

Figure 7:
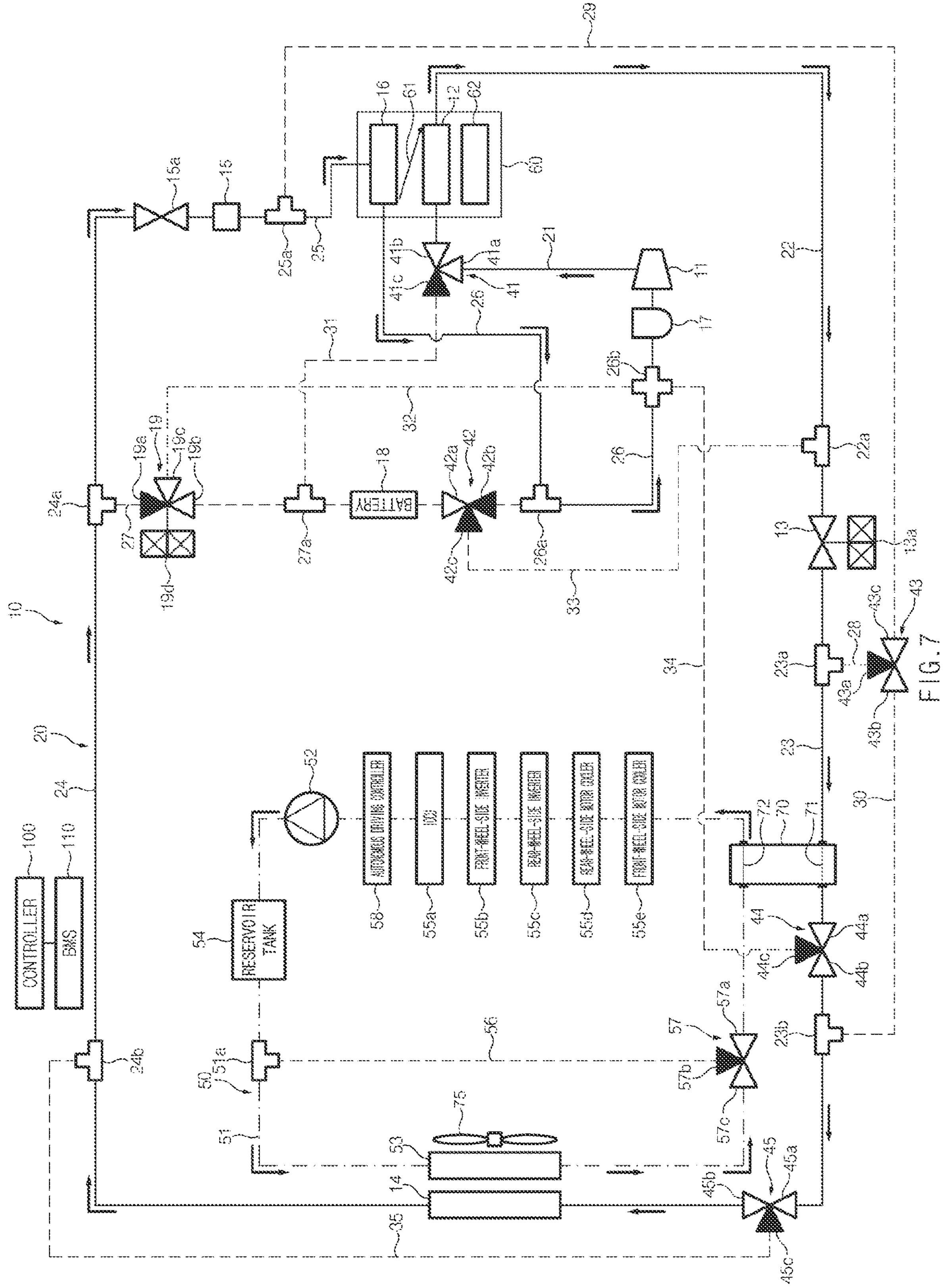
FIG. 7 illustrates the flow of a refrigerant when an HVAC subsystem operates in a cooling mode in a vehicular thermal management system according to an exemplary embodiment of the present disclosure.

FIG. 7 illustrates the flow of the refrigerant when the HVAC subsystem 10 operates in the cooling mode.

In a state in which the inlet port 19*a* of the battery-side expansion valve 19 is closed, the solenoid valve 15*a* of the cooling-side expansion valve 15 is opened, the first control valve 41 performs the first switching operation to allow the inlet port 41*a* to communicate with the first outlet port 41*b*, the third control valve 43 performs the first switching operation to allow the inlet port 43*a* to be closed, the fourth control valve 44 performs the first switching operation to allow the inlet port 44*a* to communicate with the first outlet port 44*b*, and the switching valve 45 performs the first switching operation to allow the inlet port 45*a* to communicate with the first outlet port 45*b*, the refrigerant may sequentially pass through the compressor 11, the interior condenser 12, the heating-side expansion valve 13, the first passage 71 of the heat exchanger 70, the exterior heat exchanger 14, the cooling-side expansion valve 15, the evaporator 16, and the accumulator 17.

The heating-side expansion valve 13 may be fully opened (the opening degree of the heating-side expansion valve 13 is 100%) so that the refrigerant may pass through the heating-side expansion valve 13, and thus the refrigerant may be prevented from being expanded by the heating-side expansion valve 13. The opening degree of the cooling-side expansion valve 15 may be adjusted so that the refrigerant may be appropriately expanded by the cooling-side expansion valve 15 and then be directed into the evaporator 16.

The opening degree of the outlet port 19*b* of the battery-side expansion valve 19 may be adjusted by the actuator 19*d* to correspond to the cooling load of the battery 18, and accordingly the refrigerant may be expanded at the outlet port 19*b*, and the expanded refrigerant may be directed into the refrigerant passage of the battery 18. The refrigerant directed into the refrigerant passage of the battery 18 may directly absorb heat from the battery 18 so that the refrigerant may be evaporated in the refrigerant passage of the battery 18, and accordingly the battery 18 may be directly cooled by the evaporation of the refrigerant.

When the cooling load of the battery 18 is higher than or equal to a threshold load, the power electronic pump 52 may operate so that the power electronics coolant may circulate through the power electronics coolant circulation path 51 by the power electronic pump 52. In a state in which the switching valve 57 performs the first switching operation to allow the first port 57*a* to communicate with the third port 57*c*, the power electronics coolant discharged from the outlet of the power electronic pump 52 may pass through the power electronic radiator 53 so that the power electronics coolant may release heat to the ambient air through the power electronic radiator 53 and be cooled. The power electronics coolant cooled by the ambient air may be cooled by the heat exchanger 70, and the power electronics coolant cooled by the heat exchanger 70 may cool the power electronic components 55*a*, 55*b*, 55*c*, 55*d*, and 55*e* and the autonomous driving controller 58.

When the cooling load of the battery 18 is lower than the threshold load, the power electronic pump 52 may be stopped, and accordingly the power electronics coolant may not circulate.

Figure 8:
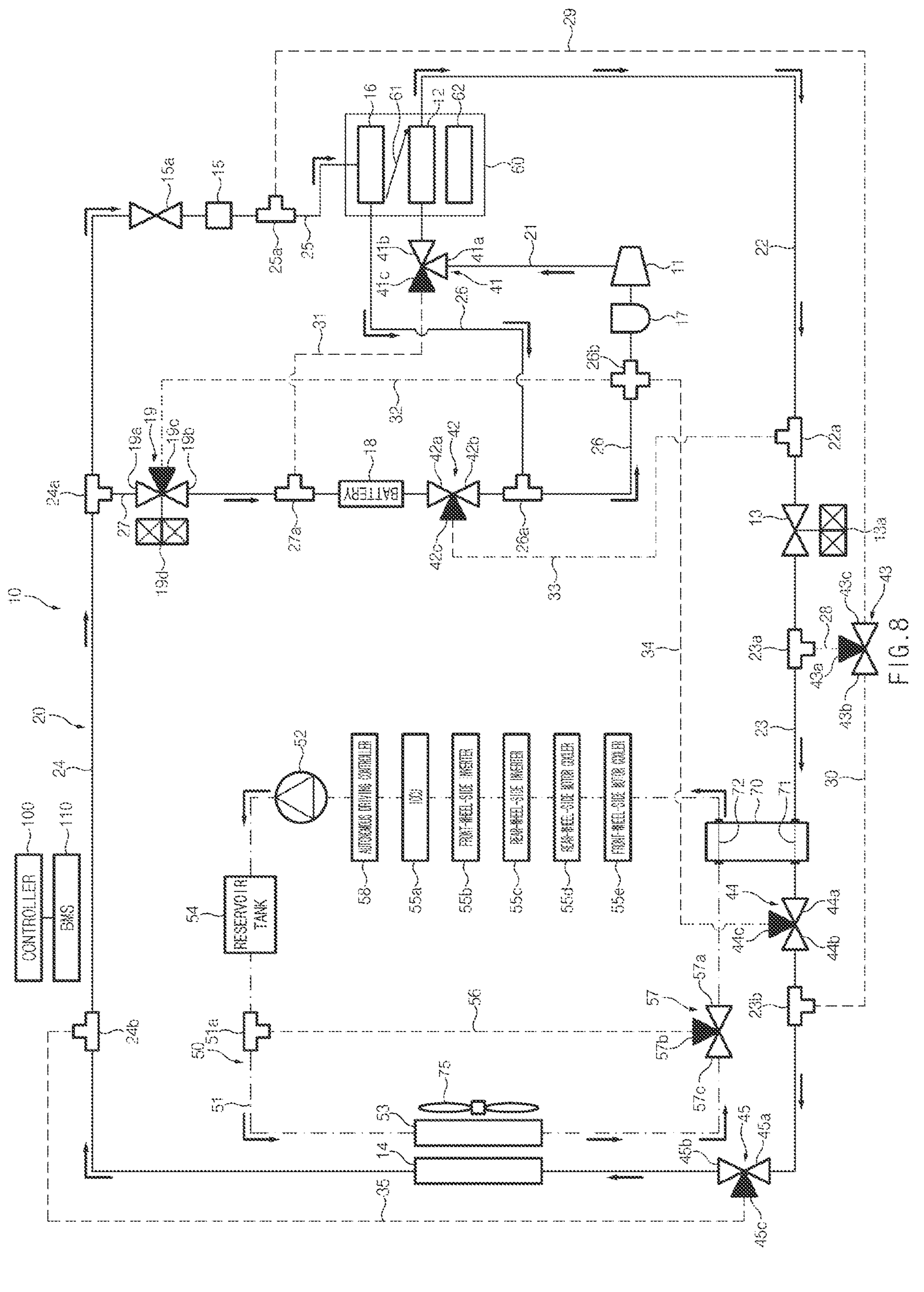
FIG. 8 illustrates the flow of a refrigerant when an HVAC subsystem operates in a cooling mode and a battery is directly cooled by the refrigerant in a vehicular thermal management system according to an exemplary embodiment of the present disclosure.

FIG. 8 illustrates the flow of the refrigerant when the HVAC subsystem 10 operates in the cooling mode and the battery 18 is directly cooled by the refrigerant.

In a state in which the inlet port 19*a* of the battery-side expansion valve 19 is opened, the outlet port 19*b* of the battery-side expansion valve 19 is opened to a predetermined degree, the bypass port 19*c* of the battery-side expansion valve 19 is closed, the solenoid valve 15*a* of the cooling-side expansion valve 15 is opened, the first control valve 41 performs the first switching operation to allow the inlet port 41*a* to communicate with the first outlet port 41*b*, the second control valve 42 performs the first switching operation to allow the inlet port 42*a* to communicate with the first outlet port 42*b*, the third control valve 43 performs the first switching operation to allow the inlet port 43*a* to be closed, the fourth control valve 44 performs the first switching operation to allow the inlet port 44*a* to communicate with the first outlet port 44*b*, and the switching valve 45 performs the first switching operation to allow the inlet port 45*a* to communicate with the first outlet port 45*b*, the refrigerant sequentially passing through the compressor 11, the interior condenser 12, the heating-side expansion valve 13, the first passage 71 of the heat exchanger 70, and the exterior heat exchanger 14 may be distributed to the cooling-side expansion valve 15 and the battery-side expansion valve 19 at a predetermined ratio at the upstream point 24*a* of the cooling-side expansion valve 15 and then be joined in the accumulator 17. A portion of the refrigerant discharged from the cooling-side expansion valve 15 may sequentially pass through the evaporator 16 and the accumulator 17, and a remaining portion of the refrigerant discharged from the battery-side expansion valve 19 may sequentially pass through the refrigerant passage of the battery 18 and the accumulator 17.

The heating-side expansion valve 13 may be fully opened (the opening degree of the heating-side expansion valve 13 is 100%) so that the refrigerant may pass through the heating-side expansion valve 13, and thus the refrigerant may be prevented from being expanded by the heating-side expansion valve 13. The opening degree of the cooling-side expansion valve 15 may be adjusted so that a portion of the refrigerant may be appropriately expanded by the cooling-side expansion valve 15 and then be directed into the evaporator 16.

The opening degree of the outlet port 19*b* of the battery-side expansion valve 19 may be adjusted by the actuator 19*d* to correspond to the cooling load of the battery 18, and accordingly the refrigerant may be expanded at the outlet port 19*b*, and the expanded refrigerant may be directed into the refrigerant passage of the battery 18. The refrigerant directed into the refrigerant passage of the battery 18 may directly absorb heat from the battery 18 so that the refrigerant may be evaporated in the refrigerant passage of the battery 18, and accordingly the battery 18 may be directly cooled by the evaporation of the refrigerant.

When the cooling load of the battery 18 is higher than or equal to a threshold load, the power electronic pump 52 may operate so that the power electronics coolant may circulate through the power electronics coolant circulation path 51 by the power electronic pump 52. In a state in which the switching valve 57 performs the first switching operation to allow the first port 57*a* to communicate with the third port 57*c*, the power electronics coolant discharged from the outlet of the power electronic pump 52 may pass through the power electronic radiator 53 so that the power electronics coolant may release heat to the ambient air through the power electronic radiator 53 and be cooled. The power electronics coolant cooled by the ambient air may be cooled by the heat exchanger 70, and the power electronics coolant cooled by the heat exchanger 70 may cool the power electronic components 55*a*, 55*b*, 55*c*, 55*d*, and 55*e* and the autonomous driving controller 58.

When the cooling load of the battery 18 is lower than the threshold load, the power electronic pump 52 may be stopped, and accordingly the power electronics coolant may not circulate.

Figure 9:
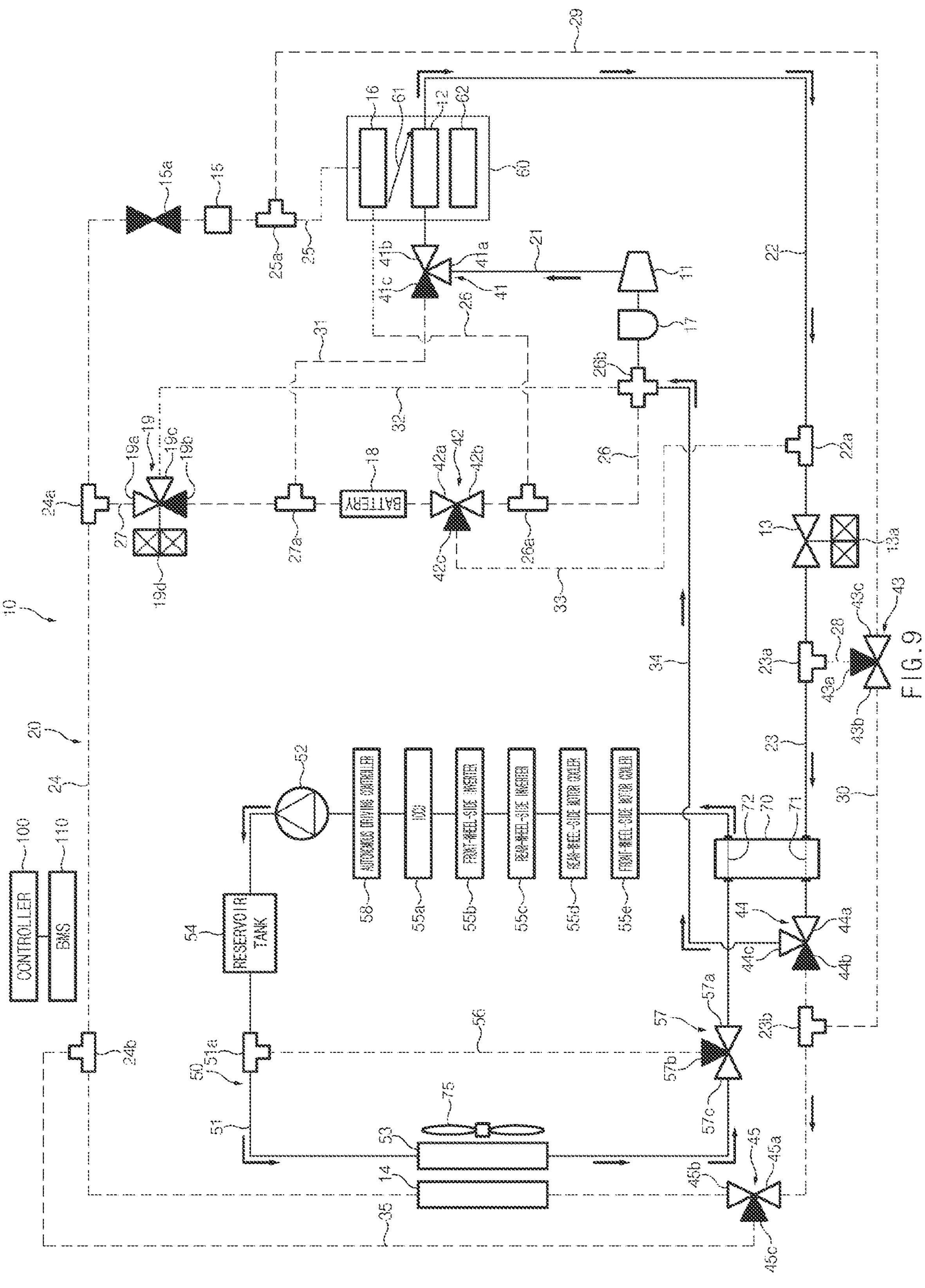
FIG. 9 illustrates the flow of a refrigerant and the flow of a power electronics coolant when an HVAC subsystem operates in a heating mode using a power electronic radiator and a heat exchanger and power electronic components and an autonomous driving controller are cooled by the power electronic radiator in a vehicular thermal management system according to an exemplary embodiment of the present disclosure.

FIG. 9 illustrates the flow of the refrigerant and the flow of the power electronics coolant when the HVAC subsystem 10 operates in the heating mode using the power electronic radiator 53 and the heat exchanger 70 and the power electronic components 55*a*, 55*b*, 55*c*, 55*d*, and 55*e* and the autonomous driving controller 58 are cooled by the power electronic radiator 53.

In a state in which the heating-side expansion valve 13 is opened to a predetermined degree, the first control valve 41 performs the first switching operation to allow the inlet port 41*a* to communicate with the first outlet port 41*b*, the third control valve 43 performs the first switching operation to allow the inlet port 43*a* to be closed, the fourth control valve 44 performs the second switching operation to allow the inlet port 44*a* to communicate with the second outlet port 44*c*, and the switching valve 45 performs the first switching operation to allow the inlet port 45*a* to communicate with the first outlet port 45*b*, the refrigerant may sequentially pass through the compressor 11, the interior condenser 12, the heating-side expansion valve 13, the first passage 71 of the heat exchanger 70, the heating-side bypass line 34, and the accumulator 17.

The heating-side expansion valve 13 may be opened to a predetermined degree so that the refrigerant discharged from the interior condenser 12 may be expanded, and the expanded refrigerant may be evaporated by the heat exchanger 70. In the heat exchanger 70, the refrigerant passing through the first passage 71 may absorb heat from the power electronics coolant passing through the second passage 72 so that the refrigerant may be evaporated, and the power electronics coolant may be cooled. That is, the refrigerant may indirectly receive heat from the ambient air through the power electronic radiator 53 and the heat exchanger 70.

In a state in which the switching valve 57 performs the first switching operation to allow the first port 57*a* to communicate with the third port 57*c*, the power electronics coolant discharged from the outlet of the power electronic pump 52 may pass through the power electronic radiator 53 so that the power electronics coolant may release heat to the ambient air through the power electronic radiator 53 and be cooled. The power electronics coolant cooled by the ambient air may be cooled by the heat exchanger 70, and the power electronics coolant cooled by the heat exchanger 70 may cool the power electronic components 55*a*, 55*b*, 55*c*, 55*d*, and 55*e* and the autonomous driving controller 58.

Figure 10:
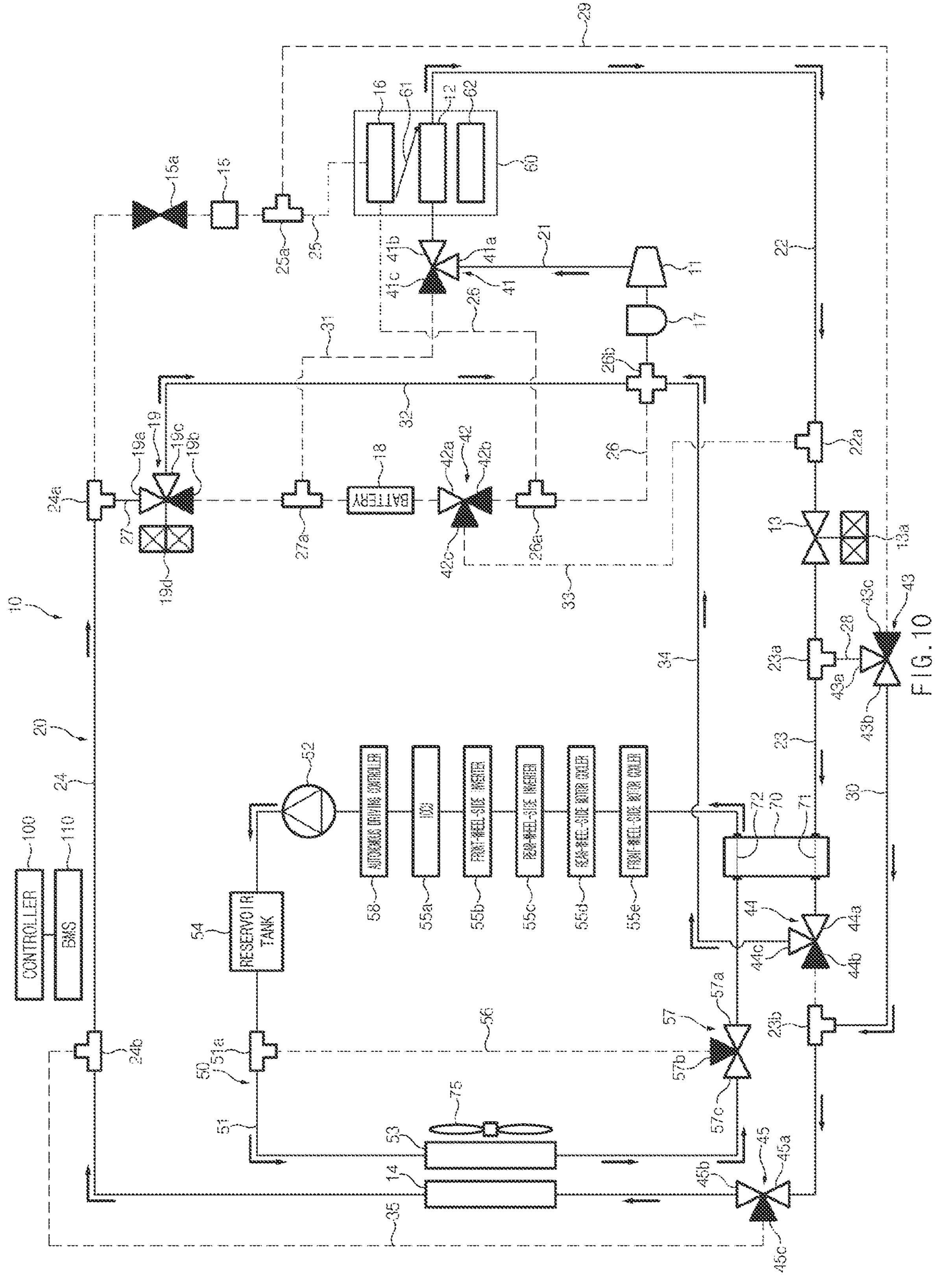
FIG. 10 illustrates the flow of a refrigerant and the flow of a power electronics coolant when an HVAC subsystem operates in a heating mode using an exterior heat exchanger, a power electronic radiator, and a heat exchanger and power electronic components and an autonomous driving controller are cooled by the power electronic radiator in a vehicular thermal management system according to an exemplary embodiment of the present disclosure.

FIG. 10 illustrates the flow of the refrigerant and the flow of the power electronics coolant when the HVAC subsystem 10 operates in the heating mode using the exterior heat exchanger 14, the power electronic radiator 53, and the heat exchanger 70 and the power electronic components 55*a*, 55*b*, 55*c*, 55*d*, and 55*e* and the autonomous driving controller 58 are cooled by the power electronic radiator 53.

In a state in which the solenoid valve 15*a* of the cooling-side expansion valve 15 is closed, the inlet port 19*a* of the battery-side expansion valve 19 is opened, the outlet port 19*b* of the battery-side expansion valve 19 is closed, the bypass port 19*c* of the battery-side expansion valve 19 is opened, the first control valve 41 performs the first switching operation to allow the inlet port 41*a* to communicate with the first outlet port 41*b*, the third control valve 43 performs the second switching operation to allow the inlet port 43*a* to communicate with the first outlet port 43*b*, the fourth control valve 44 performs the second switching operation to allow the inlet port 44*a* to communicate with the second outlet port 44*c*, and the switching valve 45 performs the first switching operation to allow the inlet port 45*a* to communicate with the first outlet port 45*b*, the refrigerant may pass through the compressor 11, the interior condenser 12, and the heating-side expansion valve 13, and the refrigerant discharged from the heating-side expansion valve 13 may be distributed to the first passage 71 of the heat exchanger 70 and the exterior heat exchanger 14 at a predetermined ratio at the downstream point 23*a* of the heating-side expansion valve 13. The heating-side expansion valve 13 may be opened to a predetermined degree so that the refrigerant discharged from the interior condenser 12 may be expanded.

A portion of the refrigerant discharged from the heating-side expansion valve 13 may sequentially pass through the first passage 71 of the heat exchanger 70, the heating-side bypass line 34, and the accumulator 17. The portion of the refrigerant expanded by the heating-side expansion valve 13 may be evaporated by the heat exchanger 70. In the heat exchanger 70, the refrigerant passing through the first passage 71 may absorb heat from the power electronics coolant passing through the second passage 72 so that the refrigerant may be evaporated, and the power electronics coolant may be cooled. That is, the portion of the refrigerant may indirectly receive heat from the ambient air through the power electronic radiator 53 and the heat exchanger 70.

A remaining portion of the refrigerant discharged from the heating-side expansion valve 13 may sequentially pass through the heat exchanger bypass line 30, the exterior heat exchanger 14, the battery-side expansion valve 19, the upstream bypass line 32, and the accumulator 17. The remaining portion of the refrigerant expanded by the heating-side expansion valve 13 may absorb heat from the ambient air through the exterior heat exchanger 14 and be evaporated.

In a state in which the switching valve 57 performs the first switching operation to allow the first port 57*a* to communicate with the third port 57*c*, the power electronics coolant discharged from the outlet of the power electronic pump 52 may pass through the power electronic radiator 53 so that the power electronics coolant may release heat to the ambient air through the power electronic radiator 53 and be cooled. The power electronics coolant cooled by the ambient air may be cooled by the heat exchanger 70, and the power electronics coolant cooled by the heat exchanger 70 may cool the power electronic components 55*a*, 55*b*, 55*c*, 55*d*, and 55*e* and the autonomous driving controller 58.

Figure 11:
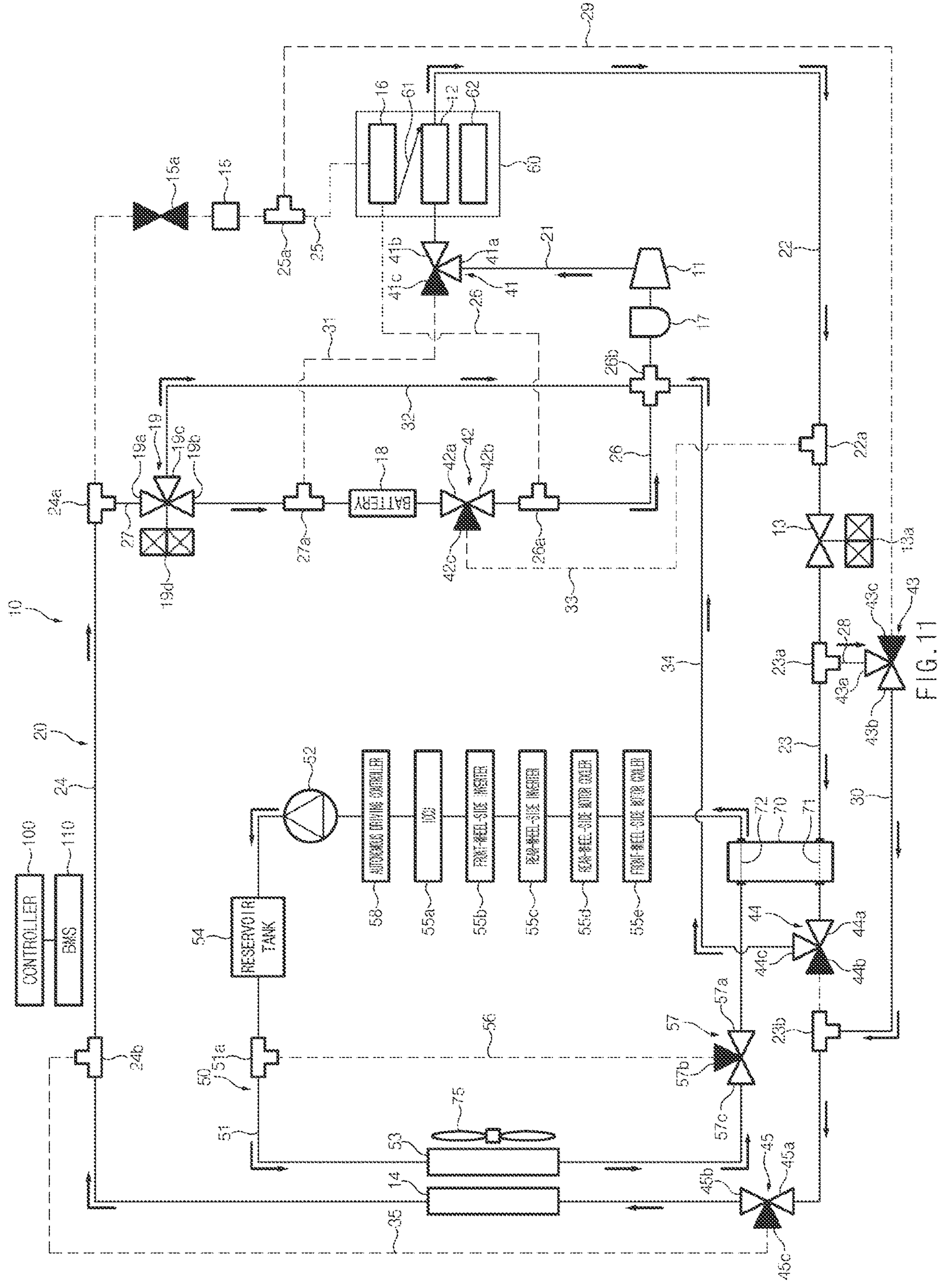
FIG. 11 illustrates the flow of a refrigerant and the flow of a power electronics coolant when an HVAC subsystem operates in a heating mode using an exterior heat exchanger, a power electronic radiator, a heat exchanger, and waste heat of a battery and power electronic components and an autonomous driving controller are cooled by the power electronic radiator in a vehicular thermal management system according to an exemplary embodiment of the present disclosure.

FIG. 11 illustrates the flow of the refrigerant and the flow of the power electronics coolant when the HVAC subsystem 10 operates in the heating mode using the exterior heat exchanger 14, the power electronic radiator 53, the heat exchanger 70, and the waste heat of the battery 18 and the power electronic components 55*a*, 55*b*, 55*c*, 55*d*, and 55*e* and the autonomous driving controller 58 are cooled by the power electronic radiator 53.

In a state in which the solenoid valve 15*a* of the cooling-side expansion valve 15 is closed, the inlet port 19*a* of the battery-side expansion valve 19 is opened, the outlet port 19*b* of the battery-side expansion valve 19 is opened to a predetermined degree, the bypass port 19*c* of the battery-side expansion valve 19 is opened, the first control valve 41 performs the first switching operation to allow the inlet port 41*a* to communicate with the first outlet port 41*b*, the second control valve 42 performs the first switching operation to allow the inlet port 42*a* to communicate with the first outlet port 42*b*, the third control valve 43 performs the second switching operation to allow the inlet port 43*a* to communicate with the first outlet port 43*b*, the fourth control valve 44 performs the second switching operation to allow the inlet port 44*a* to communicate with the second outlet port 44*c*, and the switching valve 45 performs the first switching operation to allow the inlet port 45*a* to communicate with the first outlet port 45*b*, the refrigerant may pass through the compressor 11, the interior condenser 12, and the heating-side expansion valve 13, and the refrigerant discharged from the heating-side expansion valve 13 may be distributed to the first passage 71 of the heat exchanger 70 and the exterior heat exchanger 14 at a predetermined ratio at the downstream point 23*a* of the heating-side expansion valve 13. The heating-side expansion valve 13 may be opened to a predetermined degree so that the refrigerant discharged from the interior condenser 12 may be expanded.

A portion of the refrigerant discharged from the heating-side expansion valve 13 may sequentially pass through the first passage 71 of the heat exchanger 70, the heating-side bypass line 34, and the accumulator 17. The portion of the refrigerant expanded by the heating-side expansion valve 13 may be evaporated by the heat exchanger 70. In the heat exchanger 70, the refrigerant passing through the first passage 71 may absorb heat from the power electronics coolant passing through the second passage 72 so that the refrigerant may be evaporated, and the power electronics coolant may be cooled. That is, the portion of the refrigerant may receive heat from the ambient air through the power electronic radiator 53 and the heat exchanger 70.

A remaining portion of the refrigerant discharged from the heating-side expansion valve 13 may pass through the heat exchanger bypass line 30 and the exterior heat exchanger 14. The remaining portion of the refrigerant expanded by the heating-side expansion valve 13 may be evaporated by the exterior heat exchanger 14. That is, the remaining portion of the refrigerant may receive heat from the ambient air through the exterior heat exchanger 14.

The refrigerant discharged from the exterior heat exchanger 14 may be distributed to the refrigerant passage of the battery 18 and the upstream bypass line 32 at a predetermined ratio through the battery-side expansion valve 19. The refrigerant discharged from the outlet port 19*b* of the battery-side expansion valve 19 may be evaporated in the refrigerant passage of the battery 18. That is, the refrigerant may absorb the waste heat of the battery 18. The refrigerant discharged from the bypass port 19*c* of the battery-side expansion valve 19 may be directed to the accumulator 17 through the upstream bypass line 32. The ratio of the refrigerant distributed to the refrigerant passage of the battery 18 and the upstream bypass line 32 may be determined depending on the temperature of the battery 18.

In a state in which the switching valve 57 performs the first switching operation to allow the first port 57*a* to communicate with the third port 57*c*, the power electronics coolant discharged from the outlet of the power electronic pump 52 may pass through the power electronic radiator 53 so that the power electronics coolant may release heat to the ambient air through the power electronic radiator 53 and be cooled. The power electronics coolant cooled by the ambient air may be cooled by the heat exchanger 70, and the power electronics coolant cooled by the heat exchanger 70 may cool the power electronic components 55*a*, 55*b*, 55*c*, 55*d*, and 55*e* and the autonomous driving controller 58.

Figure 12:
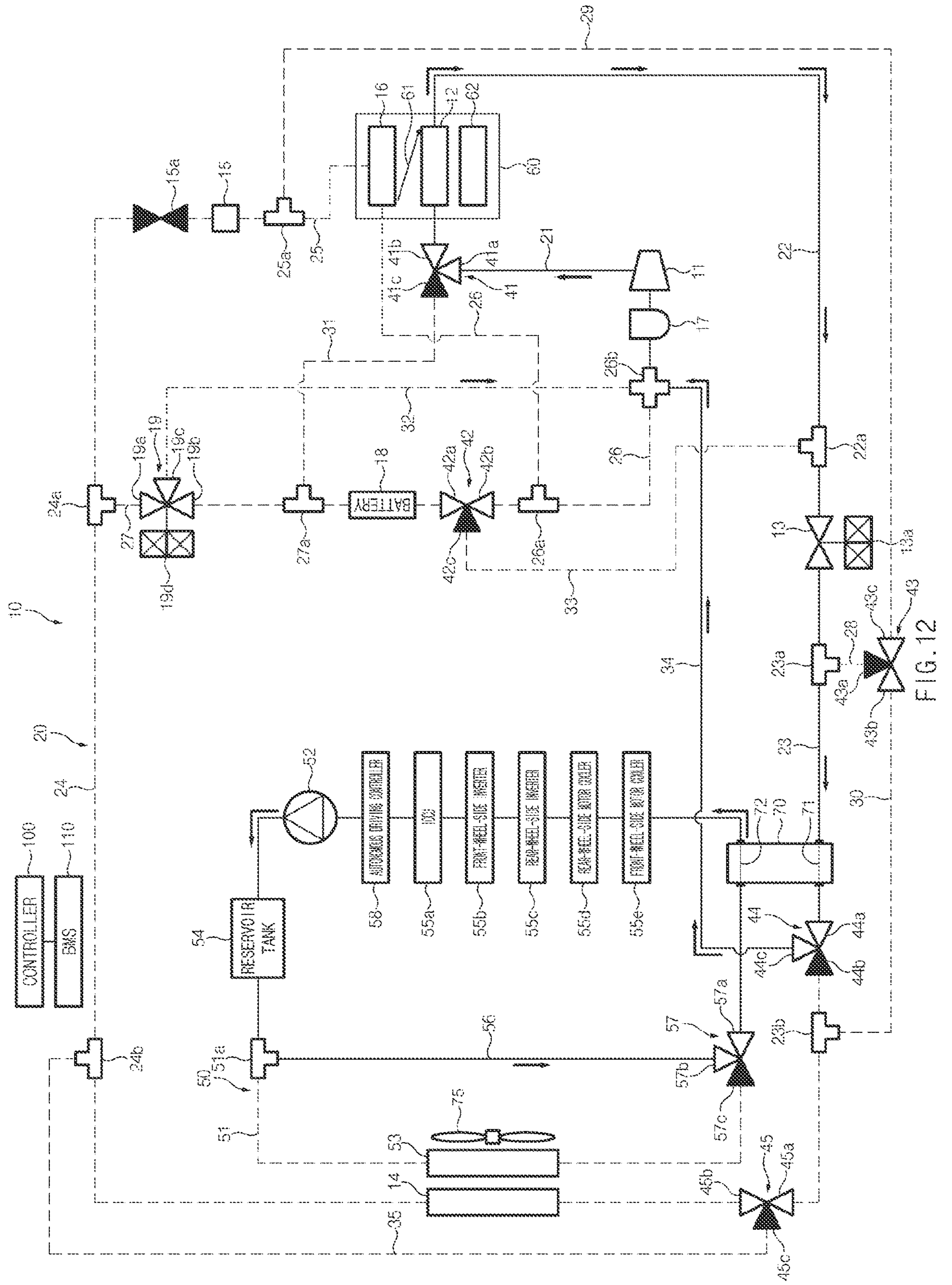
FIG. 12 illustrates the flow of a refrigerant and the flow of a power electronics coolant when an HVAC subsystem operates in a heating mode using waste heat of power electronic components and waste heat of an autonomous driving controller in a vehicular thermal management system according to an exemplary embodiment of the present disclosure.

FIG. 12 illustrates the flow of the refrigerant and the flow of the power electronics coolant when the HVAC subsystem 10 operates in the heating mode using the waste heat of the power electronic components 55*a*, 55*b*, 55*c*, 55*d*, and 55*e* and the waste heat of the autonomous driving controller 58.

In a state in which the heating-side expansion valve 13 is opened to a predetermined degree, the first control valve 41 performs the first switching operation to allow the inlet port 41*a* to communicate with the first outlet port 41*b*, the third control valve 43 performs the first switching operation to allow the inlet port 43*a* to be closed, and the fourth control valve 44 performs the second switching operation to allow the inlet port 44*a* to communicate with the second outlet port 44*c*, the refrigerant may sequentially pass through the compressor 11, the interior condenser 12, the heating-side expansion valve 13, the first passage 71 of the heat exchanger 70, the heating-side bypass line 34, and the accumulator 17.

In a state in which the switching valve 57 performs the second switching operation to allow the first port 57*a* to communicate with the second port 57*b*, the temperature of the power electronics coolant may be increased by the waste heat of the power electronic components 55*a*, 55*b*, 55*c*, 55*d*, and 55*e* and the waste heat of the autonomous driving controller 58, and the power electronics coolant discharged from the outlet of the power electronic pump 52 may pass through the bypass line 56 so that the power electronics coolant may bypass the power electronic radiator 53, and then the power electronics coolant may pass through the second passage 72 of the heat exchanger 70.

The heating-side expansion valve 13 may be opened to a predetermined degree so that the refrigerant discharged from the interior condenser 12 may be expanded, and the expanded refrigerant may be evaporated by the heat exchanger 70. In the heat exchanger 70, the refrigerant passing through the first passage 71 may absorb heat from the power electronics coolant passing through the second passage 72 so that the refrigerant may absorb the waste heat of the power electronic components 55*a*, 55*b*, 55*c*, 55*d*, and 55*e* and the waste heat of the autonomous driving controller 58.

Figure 13:
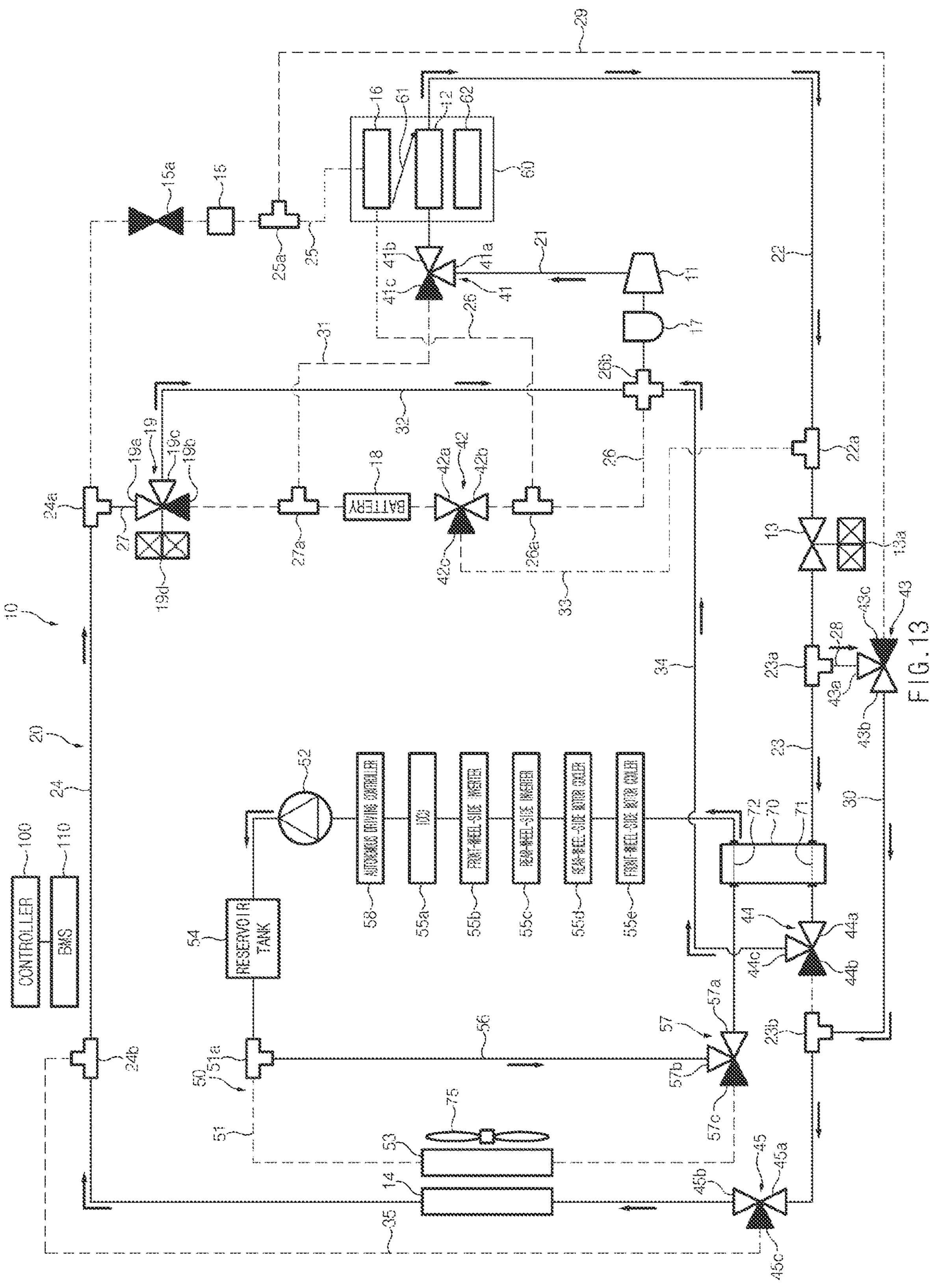
FIG. 13 illustrates the flow of a refrigerant and the flow of a power electronics coolant when an HVAC subsystem operates in a heating mode using waste heat of power electronic components, waste heat of an autonomous driving controller, and an exterior heat exchanger in a vehicular thermal management system according to an exemplary embodiment of the present disclosure.

FIG. 13 illustrates the flow of the refrigerant and the flow of the power electronics coolant when the HVAC subsystem 10 operates in the heating mode using the waste heat of the power electronic components 55*a*, 55*b*, 55*c*, 55*d*, and 55*e*, the waste heat of the autonomous driving controller 58, and the exterior heat exchanger 14.

In a state in which the heating-side expansion valve 13 is opened to a predetermined degree, the inlet port 19*a* of the battery-side expansion valve 19 is opened, the outlet port 19*b* of the battery-side expansion valve 19 is closed, the bypass port 19*c* of the battery-side expansion valve 19 is opened, the first control valve 41 performs the first switching operation to allow the inlet port 41*a* to communicate with the first outlet port 41*b*, the third control valve 43 performs the second switching operation to allow the inlet port 43*a* to communicate with the first outlet port 43*b*, the fourth control valve 44 performs the second switching operation to allow the inlet port 44*a* to communicate with the second outlet port 44*c*, and the switching valve 45 performs the first switching operation to allow the inlet port 45*a* to communicate with the first outlet port 45*b*, the refrigerant may pass through the compressor 11, the interior condenser 12, and the heating-side expansion valve 13, and the refrigerant discharged from the heating-side expansion valve 13 may be distributed to the first passage 71 of the heat exchanger 70 and the exterior heat exchanger 14 at a predetermined ratio at the downstream point 23*a* of the heating-side expansion valve 13. The heating-side expansion valve 13 may be opened to a predetermined degree so that the refrigerant discharged from the interior condenser 12 may be expanded.

A portion of the refrigerant discharged from the heating-side expansion valve 13 may sequentially pass through the first passage 71 of the heat exchanger 70, the heating-side bypass line 34, and the accumulator 17. The portion of the refrigerant expanded by the heating-side expansion valve 13 may be evaporated by the heat exchanger 70. In the heat exchanger 70, the refrigerant passing through the first passage 71 may absorb heat from the power electronics coolant passing through the second passage 72 so that the refrigerant may be evaporated, and the power electronics coolant may be cooled.

A remaining portion of the refrigerant discharged from the heating-side expansion valve 13 may sequentially pass through the heat exchanger bypass line 30, the exterior heat exchanger 14, the battery-side expansion valve 19, the upstream bypass line 32, and the accumulator 17. The remaining portion of the refrigerant expanded by the heating-side expansion valve 13 may be evaporated by the exterior heat exchanger 14. That is, the remaining portion of the refrigerant may directly receive heat from the ambient air through the exterior heat exchanger 14.

In a state in which the switching valve 57 performs the second switching operation to allow the first port 57*a* to communicate with the second port 57*b*, the temperature of the power electronics coolant may be increased by the waste heat of the power electronic components 55*a*, 55*b*, 55*c*, 55*d*, and 55*e* and the waste heat of the autonomous driving controller 58, and the power electronics coolant discharged from the outlet of the power electronic pump 52 may pass through the bypass line 56 so that the power electronics coolant may bypass the power electronic radiator 53, and then the power electronics coolant may pass through the second passage 72 of the heat exchanger 70. The refrigerant passing through the first passage 71 of the heat exchanger 70 may absorb heat from the power electronics coolant passing through the second passage 72 of the heat exchanger 70 so that the refrigerant may be evaporated, and the power electronics coolant may be cooled. That is, the refrigerant may indirectly absorb the waste heat of the power electronic components 55*a*, 55*b*, 55*c*, 55*d*, and 55*e* and the waste heat of the autonomous driving controller 58 in the heat exchanger 70. The power electronics coolant cooled by the heat exchanger 70 may cool the power electronic components 55*a*, 55*b*, 55*c*, 55*d*, and 55*e* and the autonomous driving controller 58.

Figure 14:
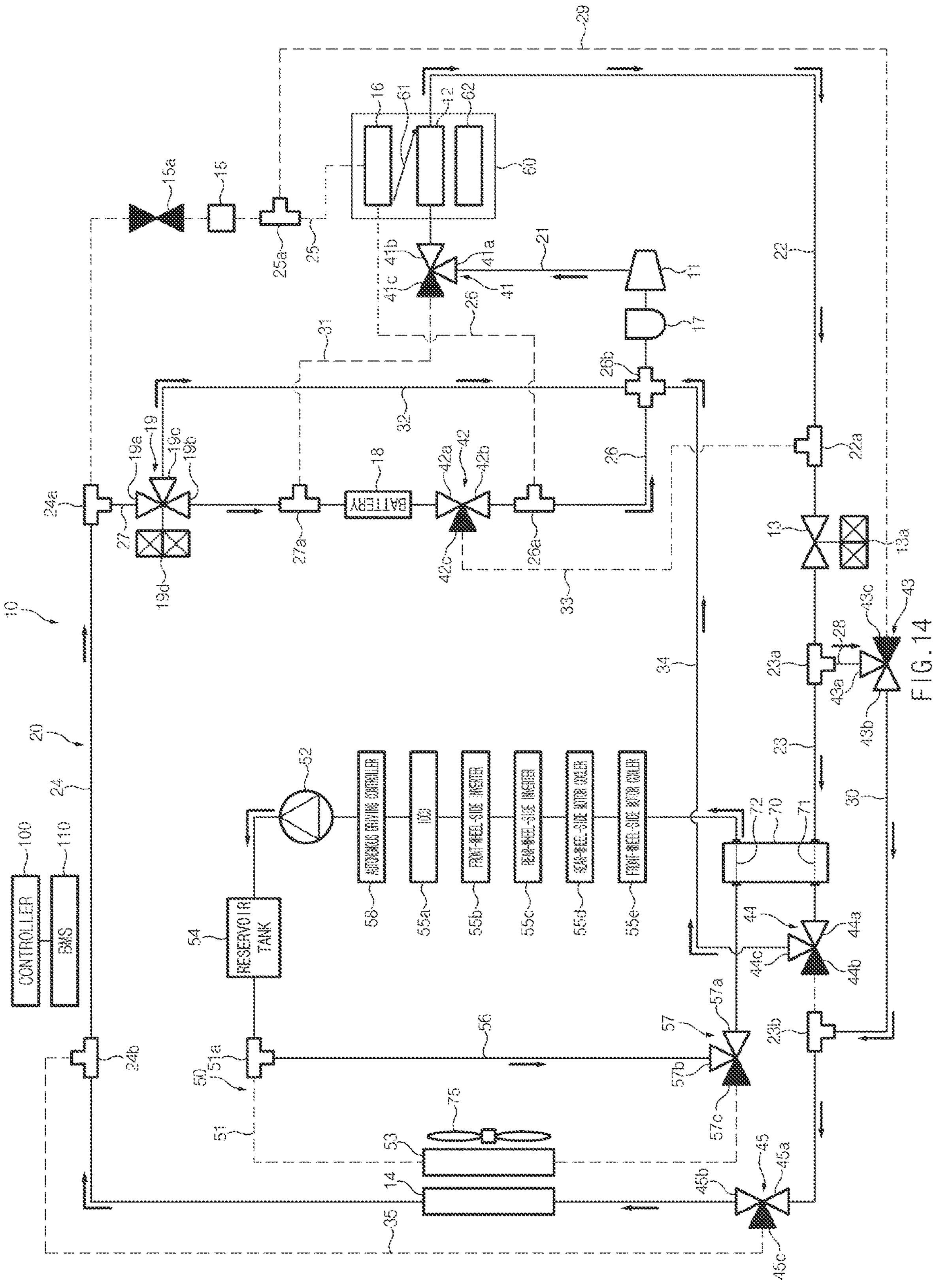
FIG. 14 illustrates the flow of a refrigerant and the flow of a power electronics coolant when an HVAC subsystem operates in a heating mode using waste heat of power electronic components, waste heat of an autonomous driving controller, an exterior heat exchanger, and waste heat of a battery in a vehicular thermal management system according to an exemplary embodiment of the present disclosure.

FIG. 14 illustrates the flow of the refrigerant and the flow of the power electronics coolant when the HVAC subsystem 10 operates in the heating mode using the waste heat of the power electronic components 55*a*, 55*b*, 55*c*, 55*d*, and 55*e*, the waste heat of the autonomous driving controller 58, the exterior heat exchanger 14, and the waste heat of the battery 18.

In a state in which the solenoid valve 15*a* of the cooling-side expansion valve 15 is closed, the inlet port 19*a* of the battery-side expansion valve 19 is opened, the outlet port 19*b* of the battery-side expansion valve 19 is opened to a predetermined degree, the bypass port 19*c* of the battery-side expansion valve 19 is opened to a predetermined degree, the first control valve 41 performs the first switching operation to allow the inlet port 41*a* to communicate with the first outlet port 41*b*, the second control valve 42 performs the first switching operation to allow the inlet port 42*a* to communicate with the first outlet port 42*b*, the third control valve 43 performs the second switching operation to allow the inlet port 43*a* to communicate with the first outlet port 43*b*, the fourth control valve 44 performs the second switching operation to allow the inlet port 44*a* to communicate with the second outlet port 44*c*, and the switching valve 45 performs the first switching operation to allow the inlet port 45*a* to communicate with the first outlet port 45*b*, the refrigerant may pass through the compressor 11, the interior condenser 12, and the heating-side expansion valve 13, and the refrigerant discharged from the heating-side expansion valve 13 may be distributed to the first passage 71 of the heat exchanger 70 and the exterior heat exchanger 14 at a predetermined ratio at the downstream point 23*a* of the heating-side expansion valve 13. The heating-side expansion valve 13 may be opened to a predetermined degree so that the refrigerant discharged from the interior condenser 12 may be expanded.

A portion of the refrigerant discharged from the heating-side expansion valve 13 may sequentially pass through the first passage 71 of the heat exchanger 70, the heating-side bypass line 34, and the accumulator 17. The portion of the refrigerant expanded by the heating-side expansion valve 13 may be evaporated by the heat exchanger 70. In the heat exchanger 70, the refrigerant passing through the first passage 71 may absorb heat from the power electronics coolant passing through the second passage 72 so that the refrigerant may be evaporated, and the power electronics coolant may be cooled.

A remaining portion of the refrigerant discharged from the heating-side expansion valve 13 may pass through the heat exchanger bypass line 30 and the exterior heat exchanger 14. The remaining portion of the refrigerant expanded by the heating-side expansion valve 13 may be evaporated by the exterior heat exchanger 14. That is, the remaining portion of the refrigerant may directly receive heat from the ambient air through the exterior heat exchanger 14.

In a state in which the switching valve 57 performs the second switching operation to allow the first port 57*a* to communicate with the second port 57*b*, the temperature of the power electronics coolant may be increased by the waste heat of the power electronic components 55*a*, 55*b*, 55*c*, 55*d*, and 55*e* and the waste heat of the autonomous driving controller 58, and the power electronics coolant discharged from the outlet of the power electronic pump 52 may pass through the bypass line 56 so that the power electronics coolant may bypass the power electronic radiator 53, and then the power electronics coolant may pass through the second passage 72 of the heat exchanger 70. The refrigerant passing through the first passage 71 of the heat exchanger 70 may absorb heat from the power electronics coolant passing through the second passage 72 of the heat exchanger 70 so that the refrigerant may be evaporated, and the power electronics coolant may be cooled. That is, the refrigerant may indirectly absorb the waste heat of the power electronic components 55*a*, 55*b*, 55*c*, 55*d*, and 55*e* and the waste heat of the autonomous driving controller 58 in the heat exchanger 70. The power electronics coolant cooled by the heat exchanger 70 may cool the power electronic components 55*a*, 55*b*, 55*c*, 55*d*, and 55*e* and the autonomous driving controller 58.

The refrigerant discharged from the exterior heat exchanger 14 may be distributed to the refrigerant passage of the battery 18 and the upstream bypass line 32 at a predetermined ratio through the battery-side expansion valve 19. The refrigerant discharged from the outlet port 19*b* of the battery-side expansion valve 19 may be evaporated in the refrigerant passage of the battery 18. That is, the refrigerant may absorb the waste heat of the battery 18. The refrigerant discharged from the bypass port 19*c* of the battery-side expansion valve 19 may be directed to the accumulator 17 and the compressor 11 through the upstream bypass line 32. The ratio of the refrigerant distributed to the refrigerant passage of the battery 18 and the upstream bypass line 32 may be determined depending on the temperature of the battery 18.

Figure 15:
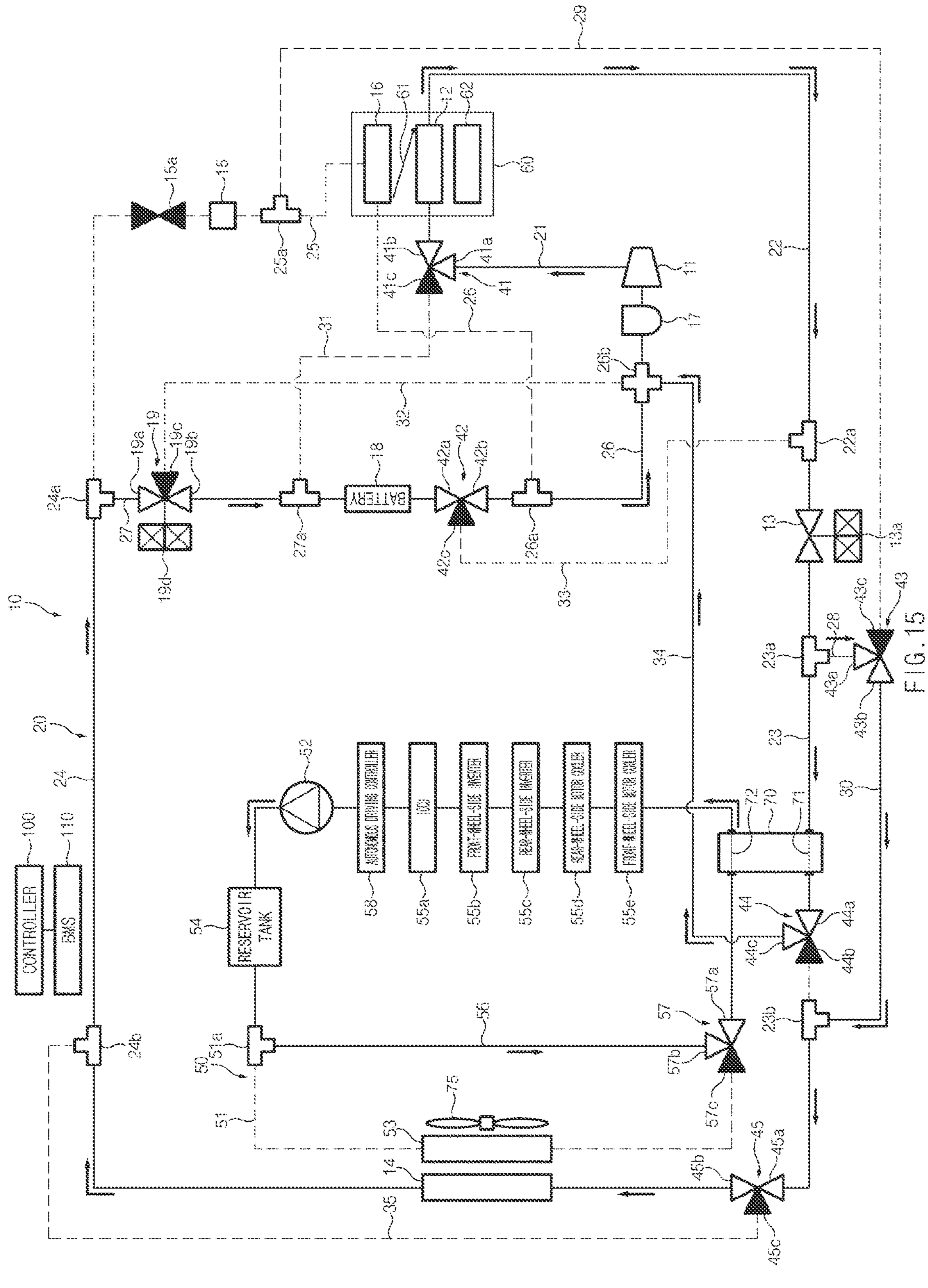
FIG. 15 illustrates the flow of a refrigerant and the flow of a power electronics coolant when an HVAC subsystem operates in a heating mode using waste heat of power electronic components, waste heat of an autonomous driving controller, an exterior heat exchanger, and waste heat of a battery in a vehicular thermal management system according to an exemplary embodiment of the present disclosure.

FIG. 15 illustrates the flow of the refrigerant and the flow of the power electronics coolant when the HVAC subsystem 10 operates in the heating mode using the waste heat of the power electronic components 55*a*, 55*b*, 55*c*, 55*d*, and 55*e*, the waste heat of the autonomous driving controller 58, the exterior heat exchanger 14, and the waste heat of the battery 18.

In a state in which the solenoid valve 15*a* of the cooling-side expansion valve 15 is closed, the inlet port 19*a* of the battery-side expansion valve 19 is opened, the outlet port 19*b* of the battery-side expansion valve 19 is opened to a predetermined degree, the bypass port 19*c* of the battery-side expansion valve 19 is closed, the first control valve 41 performs the first switching operation to allow the inlet port 41*a* to communicate with the first outlet port 41*b*, the second control valve 42 performs the first switching operation to allow the inlet port 42*a* to communicate with the first outlet port 42*b*, the third control valve 43 performs the second switching operation to allow the inlet port 43*a* to communicate with the first outlet port 43*b*, the fourth control valve 44 performs the second switching operation to allow the inlet port 44*a* to communicate with the second outlet port 44*c*, and the switching valve 45 performs the first switching operation to allow the inlet port 45*a* to communicate with the first outlet port 45*b*, the refrigerant may pass through the compressor 11, the interior condenser 12, and the heating-side expansion valve 13, and the refrigerant discharged from the heating-side expansion valve 13 may be distributed to the first passage 71 of the heat exchanger 70 and the exterior heat exchanger 14 at a predetermined ratio at the downstream point 23*a* of the heating-side expansion valve 13. The heating-side expansion valve 13 may be opened to a predetermined degree so that the refrigerant discharged from the interior condenser 12 may be expanded.

A portion of the refrigerant discharged from the heating-side expansion valve 13 may sequentially pass through the first passage 71 of the heat exchanger 70, the heating-side bypass line 34, and the accumulator 17. The portion of the refrigerant expanded by the heating-side expansion valve 13 may be evaporated by the heat exchanger 70. In the heat exchanger 70, the refrigerant passing through the first passage 71 may absorb heat from the power electronics coolant passing through the second passage 72 so that the refrigerant may be evaporated, and the power electronics coolant may be cooled.

A remaining portion of the refrigerant discharged from the heating-side expansion valve 13 may sequentially pass through the heat exchanger bypass line 30, the exterior heat exchanger 14, the battery-side expansion valve 19, the refrigerant passage of the battery 18, and the accumulator 17. The remaining portion of the refrigerant expanded by the heating-side expansion valve 13 may be evaporated by the exterior heat exchanger 14. That is, the remaining portion of the refrigerant may directly receive heat from the ambient air through the exterior heat exchanger 14.

The refrigerant discharged from the exterior heat exchanger 14 may be expanded at the outlet port 19*b* of the battery-side expansion valve 19, and the expanded refrigerant may be evaporated in the refrigerant passage of the battery 18. That is, the refrigerant may absorb the waste heat of the battery 18.

In a state in which the switching valve 57 performs the second switching operation to allow the first port 57*a* to communicate with the second port 57*b*, the temperature of the power electronics coolant may be increased by the waste heat of the power electronic components 55*a*, 55*b*, 55*c*, 55*d*, and 55*e* and the waste heat of the autonomous driving controller 58, and the power electronics coolant discharged from the outlet of the power electronic pump 52 may pass through the bypass line 56 so that the power electronics coolant may bypass the power electronic radiator 53, and then the power electronics coolant may pass through the second passage 72 of the heat exchanger 70. The refrigerant passing through the first passage 71 of the heat exchanger 70 may absorb heat from the power electronics coolant passing through the second passage 72 of the heat exchanger 70 so that the refrigerant may be evaporated, and the power electronics coolant may be cooled. That is, the refrigerant may indirectly absorb the waste heat of the power electronic components 55*a*, 55*b*, 55*c*, 55*d*, and 55*e* and the waste heat of the autonomous driving controller 58 in the heat exchanger 70. The power electronics coolant cooled by the heat exchanger 70 may cool the power electronic components 55*a*, 55*b*, 55*c*, 55*d*, and 55*e* and the autonomous driving controller 58.

Figure 16:
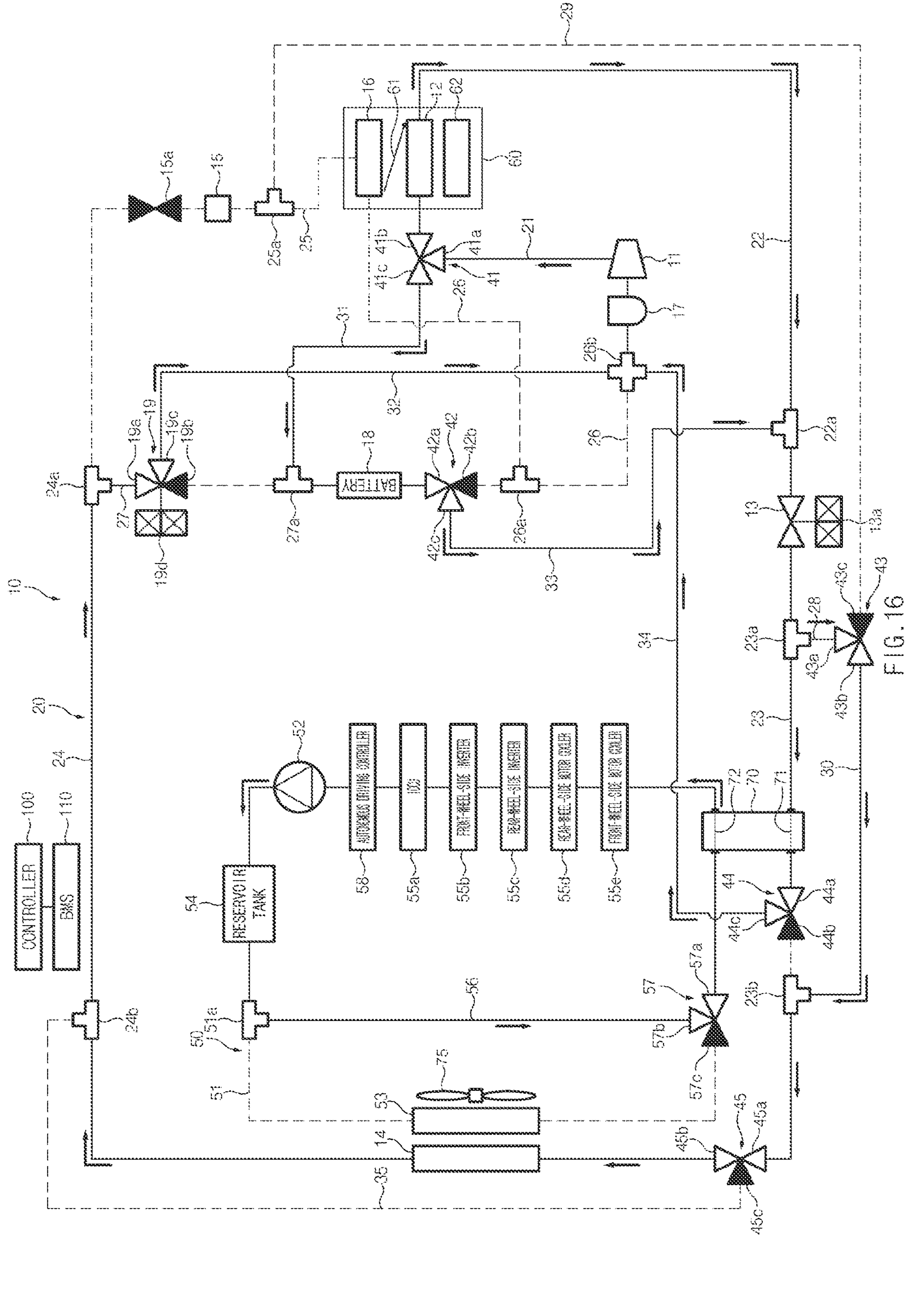
FIG. 16 illustrates the flow of a refrigerant and the flow of a power electronics coolant when a temperature of a battery rises and an HVAC subsystem operates in a heating mode using waste heat of power electronic components, waste heat of an autonomous driving controller, and an exterior heat exchanger in a vehicular thermal management system according to an exemplary embodiment of the present disclosure.

FIG. 16 illustrates the flow of the refrigerant and the flow of the power electronics coolant when the temperature of the battery 18 rises and the HVAC subsystem 10 operates in the heating mode using the waste heat of the power electronic components 55*a*, 55*b*, 55*c*, 55*d*, and 55*e*, the waste heat of the autonomous driving controller 58, and the exterior heat exchanger 14.

In a state in which the solenoid valve 15*a* of the cooling-side expansion valve 15 is closed, the inlet port 19*a* of the battery-side expansion valve 19 is opened, the outlet port 19*b* of the battery-side expansion valve 19 is closed, the bypass port 19*c* of the battery-side expansion valve 19 is opened, the first control valve 41 performs the second switching operation to allow the inlet port 41*a* to communicate with the first outlet port 41*b* and the second outlet port 41*c* at the same time, the second control valve 42 performs the second switching operation to allow the inlet port 42*a* to communicate with the second outlet port 42*c*, the third control valve 43 performs the second switching operation to allow the inlet port 43*a* to communicate with the first outlet port 43*b*, the fourth control valve 44 performs the second switching operation to allow the inlet port 44*a* to communicate with the second outlet port 44*c*, and the switching valve 45 performs the first switching operation to allow the inlet port 45*a* to communicate with the first outlet port 45*b*, the refrigerant discharged from the compressor 11 may be distributed to the interior condenser 12 and the refrigerant passage of the battery 18 through the first control valve 41.

A portion of the refrigerant discharged from the compressor 11 may be directed to the interior condenser 12 and the heating-side expansion valve 13 through the first outlet port 41*b* of the first control valve 41. The refrigerant discharged from the heating-side expansion valve 13 may be distributed to the first passage 71 of the heat exchanger 70 and the exterior heat exchanger 14 at a predetermined ratio at the downstream point 23*a* of the heating-side expansion valve 13. The heating-side expansion valve 13 may be opened to a predetermined degree so that the refrigerant discharged from the interior condenser 12 may be expanded.

A remaining portion of the refrigerant discharged from the compressor 11 may be directed to the refrigerant passage of the battery 18 through the second outlet port 41*c* of the first control valve 41 and the warm-up line 31, and the refrigerant discharged from the refrigerant passage of the battery 18 may be directed to the upstream point 22*a* of the heating-side expansion valve 13 through the second outlet port 42*c* of the second control valve 42 and the downstream bypass line 33, and accordingly the refrigerant discharged from the interior condenser 12 and the refrigerant discharged from the refrigerant passage of the battery 18 may be joined at the upstream point 22*a* of the heating-side expansion valve 13. The refrigerant discharged from the compressor 11 may be in a relatively high temperature and high pressure state, and the high temperature refrigerant may be directed to the inlet of the refrigerant passage of the battery 18 through the warm-up line 31 so that the high temperature refrigerant may directly increase the temperature of the battery 18.

A portion of the refrigerant discharged from the heating-side expansion valve 13 may sequentially pass through the first passage 71 of the heat exchanger 70, the heating-side bypass line 34, and the accumulator 17. The portion of the refrigerant expanded by the heating-side expansion valve 13 may be evaporated by the heat exchanger 70. In the heat exchanger 70, the refrigerant passing through the first passage 71 may absorb heat from the power electronics coolant passing through the second passage 72 so that the refrigerant may be evaporated, and the power electronics coolant may be cooled.

In a state in which the switching valve 57 performs the second switching operation to allow the first port 57*a* to communicate with the second port 57*b*, the temperature of the power electronics coolant may be increased by the waste heat of the power electronic components 55*a*, 55*b*, 55*c*, 55*d*, and 55*e* and the waste heat of the autonomous driving controller 58, and the power electronics coolant discharged from the outlet of the power electronic pump 52 may pass through the bypass line 56 so that the power electronics coolant may bypass the power electronic radiator 53, and then the power electronics coolant may pass through the second passage 72 of the heat exchanger 70. The refrigerant passing through the first passage 71 of the heat exchanger 70 may absorb heat from the power electronics coolant passing through the second passage 72 of the heat exchanger 70 so that the refrigerant may indirectly absorb the waste heat of the power electronic components 55*a*, 55*b*, 55*c*, 55*d*, and 55*e* and the waste heat of the autonomous driving controller 58.

A remaining portion of the refrigerant discharged from the heating-side expansion valve 13 may sequentially pass through the heat exchanger bypass line 30, the exterior heat exchanger 14, the battery-side expansion valve 19, the upstream bypass line 32, and the accumulator 17. A remaining portion of the refrigerant expanded by the heating-side expansion valve 13 may be evaporated by the exterior heat exchanger 14. That is, the remaining portion of the refrigerant may receive heat from the ambient air through the exterior heat exchanger 14.

Figure 17:
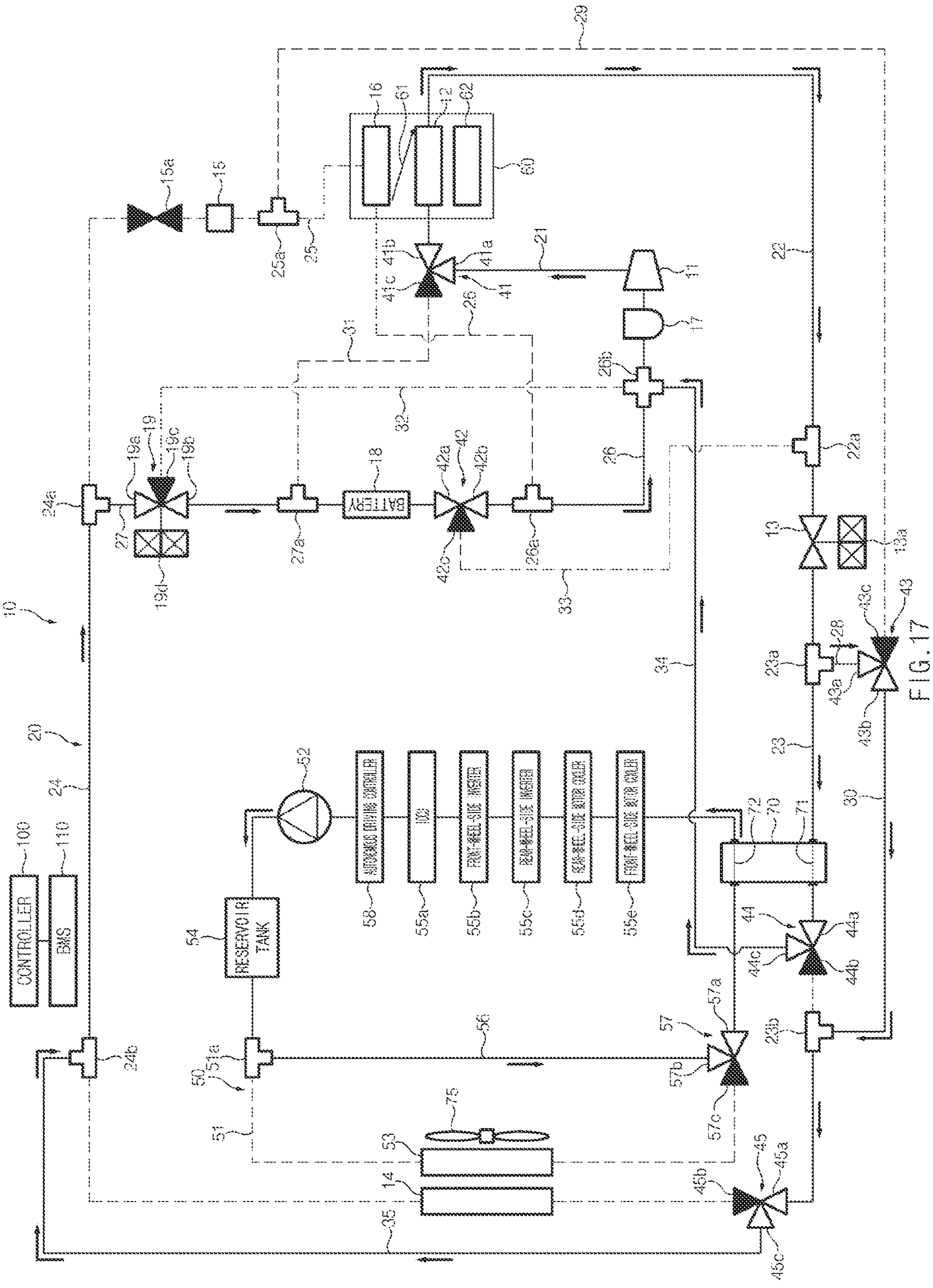
FIG. 17 illustrates the flow of a refrigerant and the flow of a power electronics coolant when the refrigerant bypasses an exterior heat exchanger to prevent icing on the exterior heat exchanger and an HVAC subsystem operates in a heating mode using waste heat of power electronic components, waste heat of an autonomous driving controller, and waste heat of a battery in a vehicular thermal management system according to an exemplary embodiment of the present disclosure.

FIG. 17 illustrates the flow of the refrigerant and the flow of the power electronics coolant when the refrigerant bypasses the exterior heat exchanger 14 to prevent icing on the exterior heat exchanger 14 and the HVAC subsystem 10 operates in the heating mode using the waste heat of the power electronic components 55*a*, 55*b*, 55*c*, 55*d*, and 55*e*, the waste heat of the autonomous driving controller 58, and the waste heat of the battery 18.

In a state in which the solenoid valve 15*a* of the cooling-side expansion valve 15 is closed, the inlet port 19*a* of the battery-side expansion valve 19 is opened, the outlet port 19*b* of the battery-side expansion valve 19 is opened to a predetermined degree, the bypass port 19*c* of the battery-side expansion valve 19 is closed, the first control valve 41 performs the first switching operation to allow the inlet port 41*a* to communicate with the first outlet port 41*b*, the second control valve 42 performs the first switching operation to allow the inlet port 42*a* to communicate with the first outlet port 42*b*, the third control valve 43 performs the second switching operation to allow the inlet port 43*a* to communicate with the first outlet port 43*b*, the fourth control valve 44 performs the second switching operation to allow the inlet port 44*a* to communicate with the second outlet port 44*c*, and the switching valve 45 performs the second switching operation to allow the inlet port 45*a* to communicate with the second outlet port 45*c*, the refrigerant may pass through the compressor 11, the interior condenser 12, and the heating-side expansion valve 13, and the refrigerant discharged from the heating-side expansion valve 13 may be distributed to the first passage 71 of the heat exchanger 70 and the exterior heat exchanger 14 at a predetermined ratio at the downstream point 23*a* of the heating-side expansion valve 13. The heating-side expansion valve 13 may be opened to a predetermined degree so that the refrigerant discharged from the interior condenser 12 may be expanded.

A portion of the refrigerant discharged from the heating-side expansion valve 13 may sequentially pass through the first passage 71 of the heat exchanger 70, the heating-side bypass line 34, and the accumulator 17. The portion of the refrigerant expanded by the heating-side expansion valve 13 may be evaporated by the heat exchanger 70. In the heat exchanger 70, the refrigerant passing through the first passage 71 may absorb heat from the power electronics coolant passing through the second passage 72 so that the refrigerant may be evaporated, and the power electronics coolant may be cooled. That is, the refrigerant may indirectly absorb the waste heat of the power electronic components 55*a*, 55*b*, 55*c*, 55*d*, and 55*e* and the waste heat of the autonomous driving controller 58 in the heat exchanger 70. The power electronics coolant cooled by the heat exchanger 70 may cool the power electronic components 55*a*, 55*b*, 55*c*, 55*d*, and 55*e* and the autonomous driving controller 58.

In a state in which the switching valve 57 performs the second switching operation to allow the first port 57*a* to communicate with the second port 57*b*, the temperature of the power electronics coolant may be increased by the waste heat of the power electronic components 55*a*, 55*b*, 55*c*, 55*d*, and 55*e* and the waste heat of the autonomous driving controller 58, and the power electronics coolant discharged from the outlet of the power electronic pump 52 may pass through the bypass line 56 so that the power electronics coolant may bypass the power electronic radiator 53, and then the power electronics coolant may pass through the second passage 72 of the heat exchanger 70.

A remaining portion of the refrigerant discharged from the heating-side expansion valve 13 may be directed to the battery-side expansion valve 19 through the heat exchanger bypass line 30, the second outlet port 45*c* of the switching valve 45, and the bypass line 35. Accordingly, the refrigerant may bypass the exterior heat exchanger 14 so that icing may be prevented from occurring on the exterior heat exchanger 14.

The refrigerant directed into the inlet port 19*a* of the battery-side expansion valve 19 may be expanded at the outlet port 19*b* of the battery-side expansion valve 19, and the expanded refrigerant may be evaporated in the refrigerant passage of the battery 18. That is, the refrigerant may absorb the waste heat of the battery 18.

Figure 18:
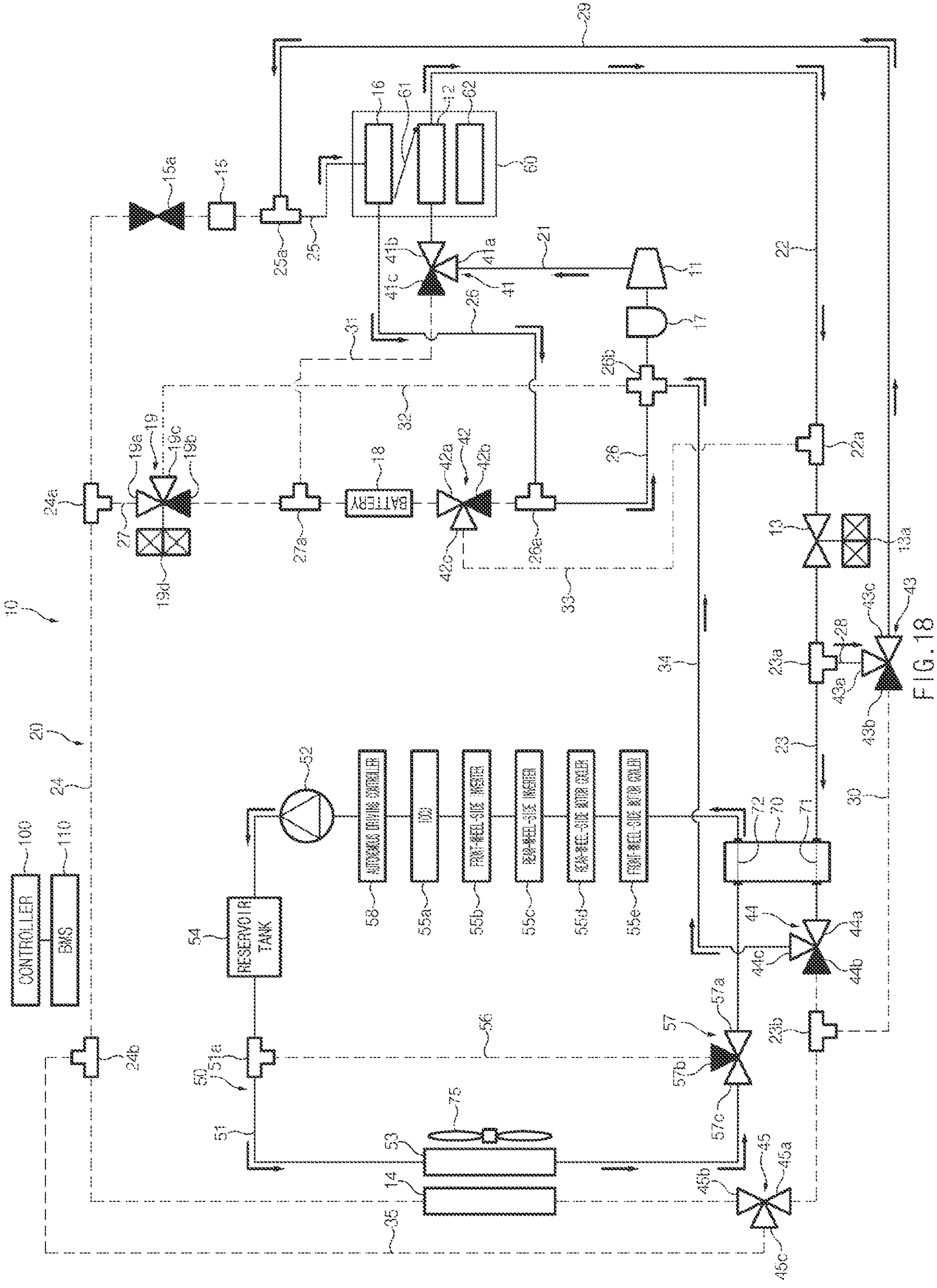
FIG. 18 illustrates the flow of a refrigerant and the flow of a power electronics coolant when an HVAC subsystem operates in a heating and dehumidification mode in a vehicular thermal management system according to an exemplary embodiment of the present disclosure.

FIG. 18 illustrates the flow of the refrigerant and the flow of the power electronics coolant when the HVAC subsystem 10 operates in a heating and dehumidification mode.

In a state in which the solenoid valve 15*a* of the cooling-side expansion valve 15 is closed, the first control valve 41 performs the first switching operation to allow the inlet port 41*a* to communicate with the first outlet port 41*b*, the third control valve 43 performs the third switching operation to allow the inlet port 43*a* to communicate with the second outlet port 43*c*, and the fourth control valve 44 performs the second switching operation to allow the inlet port 44*a* to communicate with the second outlet port 44*c*, the refrigerant may pass through the compressor 11, the interior condenser 12, and the heating-side expansion valve 13, and the refrigerant discharged from the heating-side expansion valve 13 may be distributed to the first passage 71 of the heat exchanger 70 and the evaporator 16 at a predetermined ratio at the downstream point 23*a* of the heating-side expansion valve 13. The heating-side expansion valve 13 may be opened to a predetermined degree so that the refrigerant discharged from the interior condenser 12 may be expanded.

A portion of the refrigerant discharged from the heating-side expansion valve 13 may sequentially pass through the first passage 71 of the heat exchanger 70, the heating-side bypass line 34, and the accumulator 17. The portion of the refrigerant expanded by the heating-side expansion valve 13 may be evaporated by the heat exchanger 70. In the heat exchanger 70, the refrigerant passing through the first passage 71 may absorb heat from the power electronics coolant passing through the second passage 72 so that the refrigerant may be evaporated, and the power electronics coolant may be cooled.

In a state in which the switching valve 57 performs the first switching operation to allow the first port 57*a* to communicate with the third port 57*c*, the power electronics coolant discharged from the outlet of the power electronic pump 52 may pass through the power electronic radiator 53 so that the power electronics coolant may release heat to the ambient air through the power electronic radiator 53 and be cooled. The power electronics coolant cooled by the ambient air may be cooled by the heat exchanger 70, and the power electronics coolant cooled by the heat exchanger 70 may cool the power electronic components 55*a*, 55*b*, 55*c*, 55*d*, and 55*e* and the autonomous driving controller 58.

A remaining portion of the refrigerant discharged from the heating-side expansion valve 13 may be directed to the evaporator 16 through the second outlet port 43*c* of the third control valve 43 and the dehumidification bypass line 29. The remaining portion of the refrigerant may be directed to the evaporator 16 so that the refrigerant may be evaporated in the evaporator 16, and the air passing by the exterior surface of the evaporator 16 may be cooled. Thus, the air flowing into the passenger compartment may be appropriately dehumidified.

Figure 19:
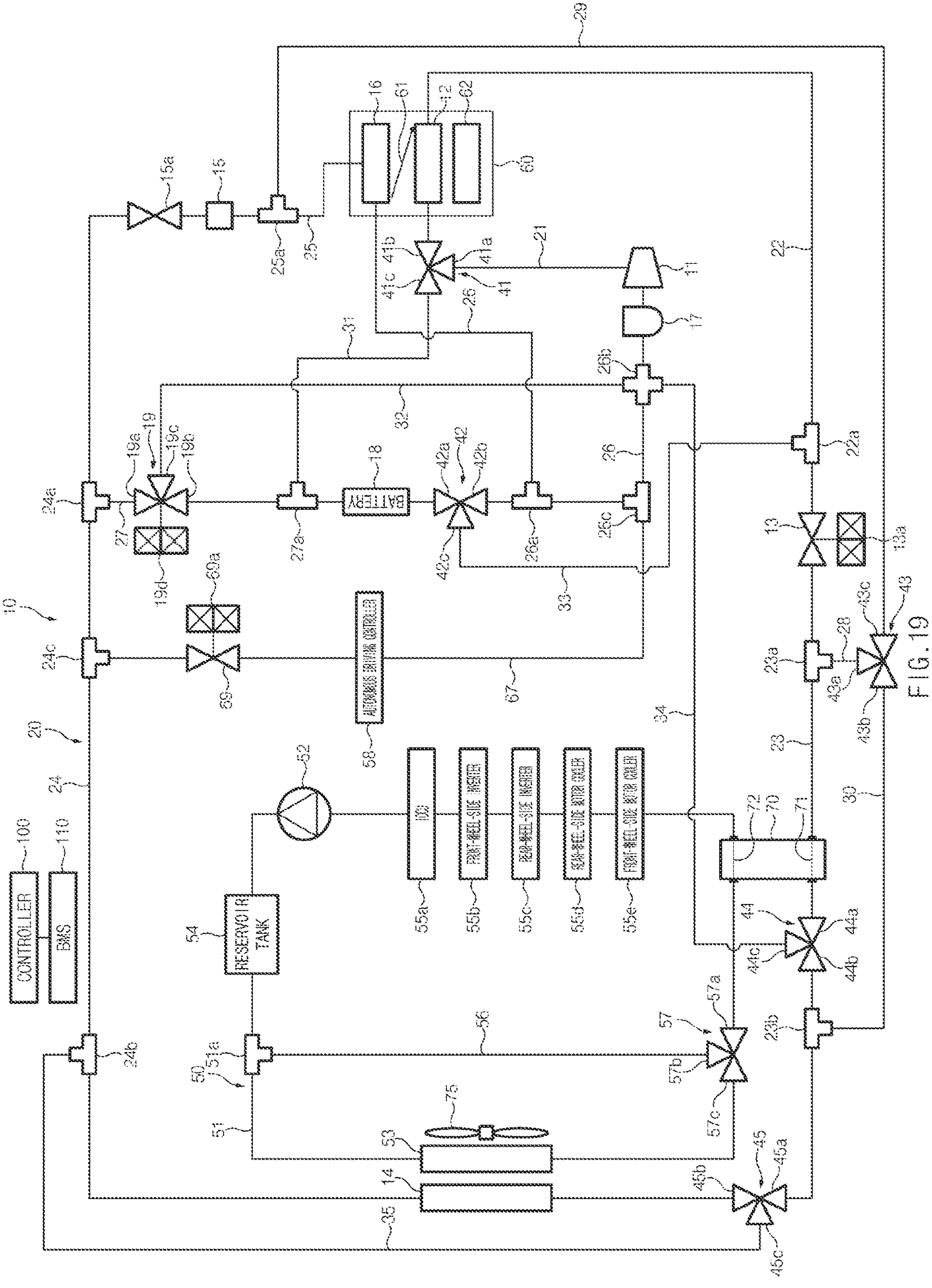
FIG. 19 illustrates a modification of the vehicular thermal management system illustrated in FIG. 1.

FIG. 19 illustrates a modification of the vehicular thermal management system illustrated in FIG. 1.

Referring to FIG. 19, the HVAC subsystem 10 may further include a second distribution line 67 configured to allow the refrigerant discharged from the exterior heat exchanger 14 to be directed from the upstream side of the cooling-side expansion valve 15 to the compressor 11. An inlet of the second distribution line 67 may be connected to the fourth line 24 of the refrigerant circulation path 20 at an upstream point 24*c* of the cooling-side expansion valve 15, and the inlet of the second distribution line 67 may be located on the upstream side of the inlet of the distribution line 27. An outlet of the second distribution line 67 may be connected to the sixth line 26 of the refrigerant circulation path 20 at an upstream point 26*c* of the accumulator 17 located on the upstream side of the compressor 11, and the outlet of the second distribution line 67 may be located on the upstream side of the outlet of the upstream bypass line 32 and the outlet of the heating-side bypass line 34. Accordingly, at least a portion of the refrigerant may be directed to the compressor 11 through the second distribution line 67.

The autonomous driving controller 58 and an expansion valve 69 may be disposed on the second distribution line 67, and the expansion valve 69 may be disposed on the upstream side of the autonomous driving controller 58. The autonomous driving controller 58 may have a refrigerant passage provided inside or outside thereof, and the refrigerant passage of the autonomous driving controller 58 may be fluidly connected to the second distribution line 67. The expansion valve 69 may be configured to adjust the flow of the refrigerant and/or the flow rate of the refrigerant into the refrigerant passage of the autonomous driving controller 58 and to expand the refrigerant received from the exterior heat exchanger 14. According to an exemplary embodiment, the expansion valve 69 may be an EXV having an actuator 69*a*. The actuator 69*a* may have a shaft which is movable to open or close an orifice defined in a valve body of the expansion valve 69, and the position of the shaft may be varied depending on the rotation direction, rotation degree, and the like of the actuator 69*a*, and accordingly the opening degree of the orifice of the expansion valve 69 may be varied. The controller 100 may control the operation of the actuator 69*a*. As the expansion valve 69 is opened to a predetermined degree, at least a portion of the refrigerant discharged from the exterior heat exchanger 14 may be expanded by the expansion valve 69, and the expanded refrigerant may pass through the refrigerant passage of the autonomous driving controller 58 so that the refrigerant may be evaporated in the refrigerant passage of the autonomous driving controller 58. Accordingly, the autonomous driving controller 58 may be directly cooled by the evaporation of the refrigerant.

The autonomous driving controller 58 may have a higher heat generating amount than the other power electronic components 55*a*, 55*b*, 55*c*, 55*d*, and 55*e*, and the refrigerant may directly cool the autonomous driving controller 58 through the second distribution line 67 and the expansion valve 69 so that the cooling of the autonomous driving controller 58 may be improved.

Figure 20:
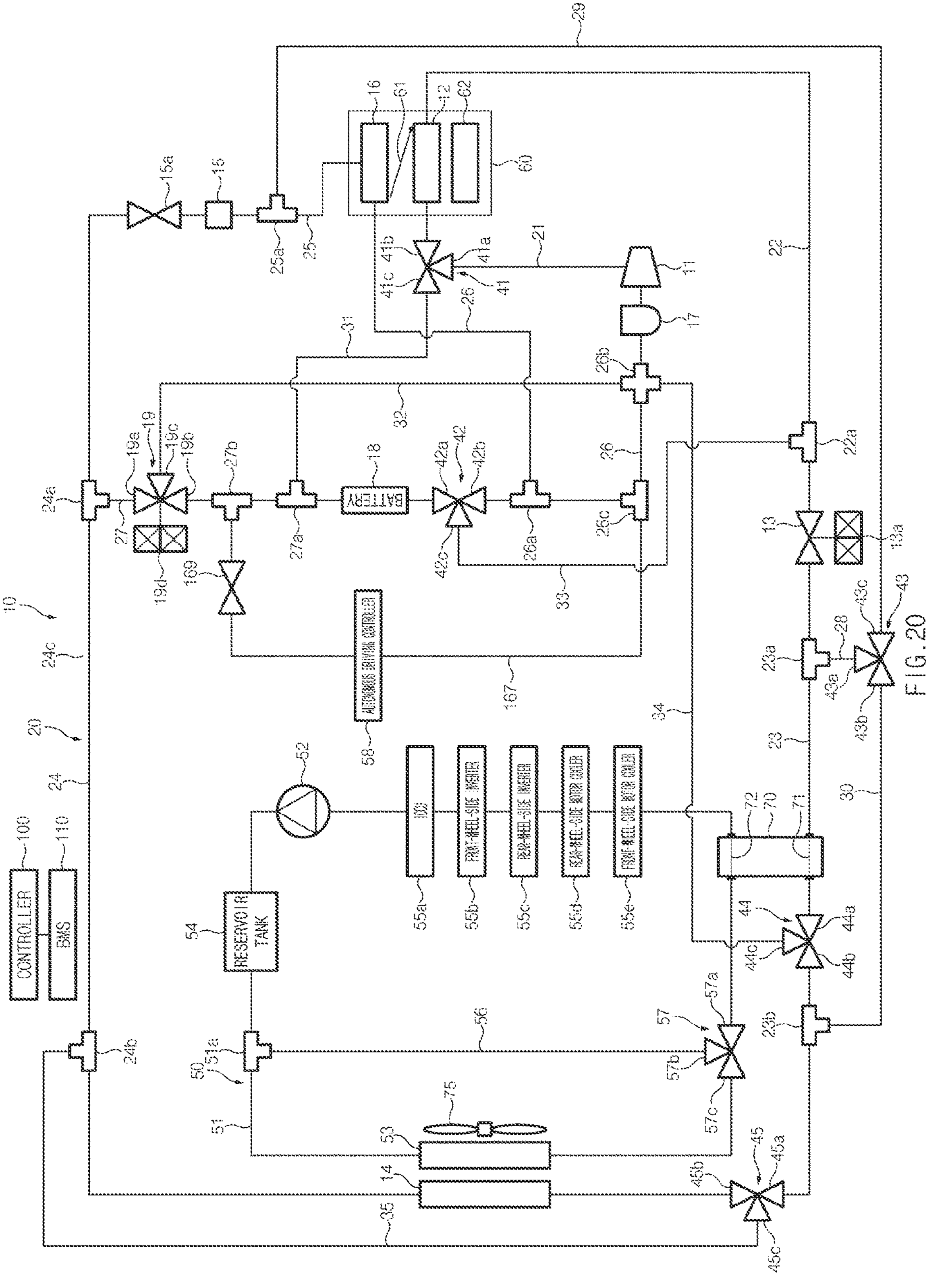
FIG. 20 illustrates a modification of the vehicular thermal management system illustrated in FIG. 1.

FIG. 20 illustrates a modification of the vehicular thermal management system illustrated in FIG. 1.

Referring to FIG. 20, the HVAC subsystem 10 may further include a second distribution line 167 configured to allow the refrigerant discharged from the outlet port 19*b* of the battery-side expansion valve 19 to be directed from an upstream point 27*b* of the battery 18 to the compressor 11. An inlet of the second distribution line 167 may be connected to the distribution line 27 at the upstream point 27*b* of the battery 18, and the inlet of the second distribution line 167 may be located on the upstream side of the upstream point 27*a* of the battery 18 to which the outlet of the warm-up line 31 is connected. An outlet of the second distribution line 167 may be connected to the sixth line 26 of the refrigerant circulation path 20 at the upstream point 26*c* of the accumulator 17 located on the upstream side of the compressor 11, and the outlet of the second distribution line 167 may be located on the upstream side of the outlet of the upstream bypass line 32 and the outlet of the heating-side bypass line 34. Accordingly, at least a portion of the refrigerant may be directed to the compressor 11 through the second distribution line 167.

The autonomous driving controller 58 and a shut-off valve 169 may be disposed on the second distribution line 167, and the shut-off valve 169 may be disposed on the upstream side of the autonomous driving controller 58. The autonomous driving controller 58 may have a refrigerant passage provided inside or outside thereof, and the refrigerant passage of the autonomous driving controller 58 may be fluidly connected to the second distribution line 167. According to an exemplary embodiment, the shut-off valve 169 may be a solenoid valve, and the controller 100 may control the operation of the shut-off valve 169.

In a state in which the inlet port 19*a* of the battery-side expansion valve 19 is opened, the outlet port 19*b* of the battery-side expansion valve 19 is opened to a predetermined degree, and the shut-off valve 169 of the second distribution line 167 is opened, at least a portion of the refrigerant discharged from the exterior heat exchanger 14 may be expanded at the outlet port 19*b* of the battery-side expansion valve 19, and the expanded refrigerant may pass through the refrigerant passage of the autonomous driving controller 58 so that the refrigerant may be evaporated in the refrigerant passage of the autonomous driving controller 58. Accordingly, the autonomous driving controller 58 may be directly cooled by the evaporation of the refrigerant.

The autonomous driving controller 58 may have a higher heat generating amount than the other power electronic components 55*a*, 55*b*, 55*c*, 55*d*, and 55*e*, and the refrigerant may directly cool the autonomous driving controller 58 through the second distribution line 167 and the shut-off valve 169 so that the cooling of the autonomous driving controller 58 may be improved.

Figure 21:
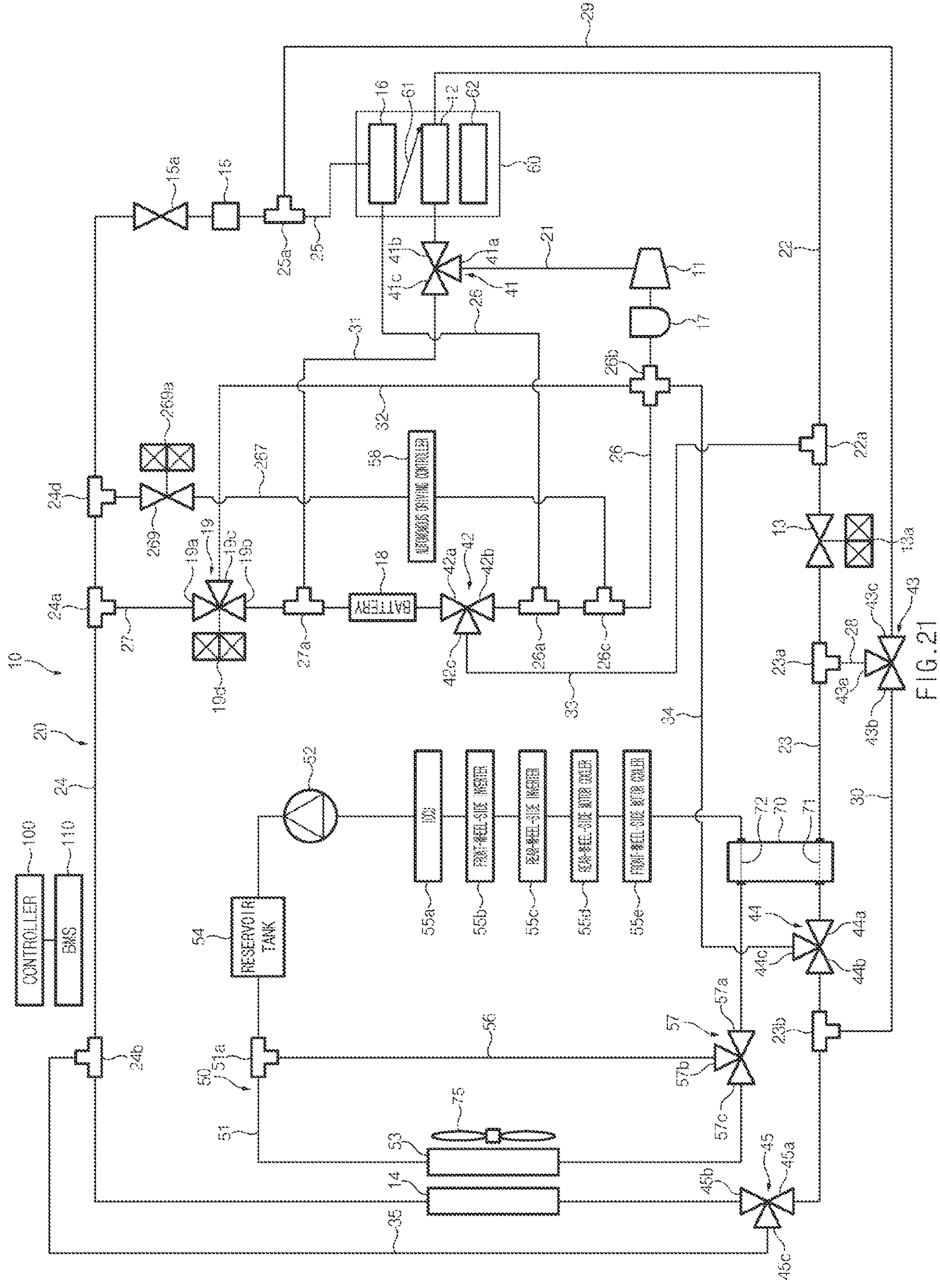
FIG. 21 illustrates a modification of the vehicular thermal management system illustrated in FIG. 1.

FIG. 21 illustrates a modification of the vehicular thermal management system illustrated in FIG. 1.

Referring to FIG. 21, the HVAC subsystem 10 may further include a second distribution line 267 configured to allow the refrigerant discharged from the exterior heat exchanger 14 to be directed from the upstream side of the cooling-side expansion valve 15 to the compressor 11. An inlet of the second distribution line 267 may be connected to the fourth line 24 of the refrigerant circulation path 20 at an upstream point 24*d* of the cooling-side expansion valve 15, and the inlet of the second distribution line 267 may be located on the downstream side of the inlet of the distribution line 27. An outlet of the second distribution line 267 may be connected to the sixth line 26 of the refrigerant circulation path 20 at the upstream point 26*c* of the accumulator 17 located on the upstream side of the compressor 11, and the outlet of the second distribution line 267 may be located on the upstream side of the outlet of the upstream bypass line 32 and the outlet of the heating-side bypass line 34. Accordingly, at least a portion of the refrigerant may be directed to the compressor 11 through the second distribution line 267.

The autonomous driving controller 58 and an expansion valve 269 may be disposed on the second distribution line 267, and the expansion valve 269 may be disposed on the upstream side of the autonomous driving controller 58. The autonomous driving controller 58 may have a refrigerant passage provided inside or outside thereof, and the refrigerant passage of the autonomous driving controller 58 may be fluidly connected to the second distribution line 267. The expansion valve 269 may be configured to adjust the flow of the refrigerant and/or the flow rate of the refrigerant into the refrigerant passage of the autonomous driving controller 58 and to expand the refrigerant received from the exterior heat exchanger 14. According to an exemplary embodiment, the expansion valve 269 may be an EXV having an actuator 269*a*. The actuator 269*a* may have a shaft which is movable to open or close an orifice defined in a valve body of the expansion valve 269, and the position of the shaft may be varied depending on the rotation direction, rotation degree, and the like of the actuator 269*a*, and accordingly the opening degree of the orifice of the expansion valve 269 may be varied. The controller 100 may control the operation of the actuator 269*a*. As the expansion valve 269 is opened to a predetermined degree, at least a portion of the refrigerant discharged from the exterior heat exchanger 14 may be expanded by the expansion valve 269, and the expanded refrigerant may pass through the refrigerant passage of the autonomous driving controller 58 so that the refrigerant may be evaporated in the refrigerant passage of the autonomous driving controller 58. Accordingly, the autonomous driving controller 58 may be directly cooled by the evaporation of the refrigerant.

The autonomous driving controller 58 may have a higher heat generating amount than the other power electronic components 55*a*, 55*b*, 55*c*, 55*d*, and 55*e*, and the refrigerant may directly cool the autonomous driving controller 58 through the second distribution line 267 and the expansion valve 269 so that the cooling of the autonomous driving controller 58 may be improved.

Figure 22:
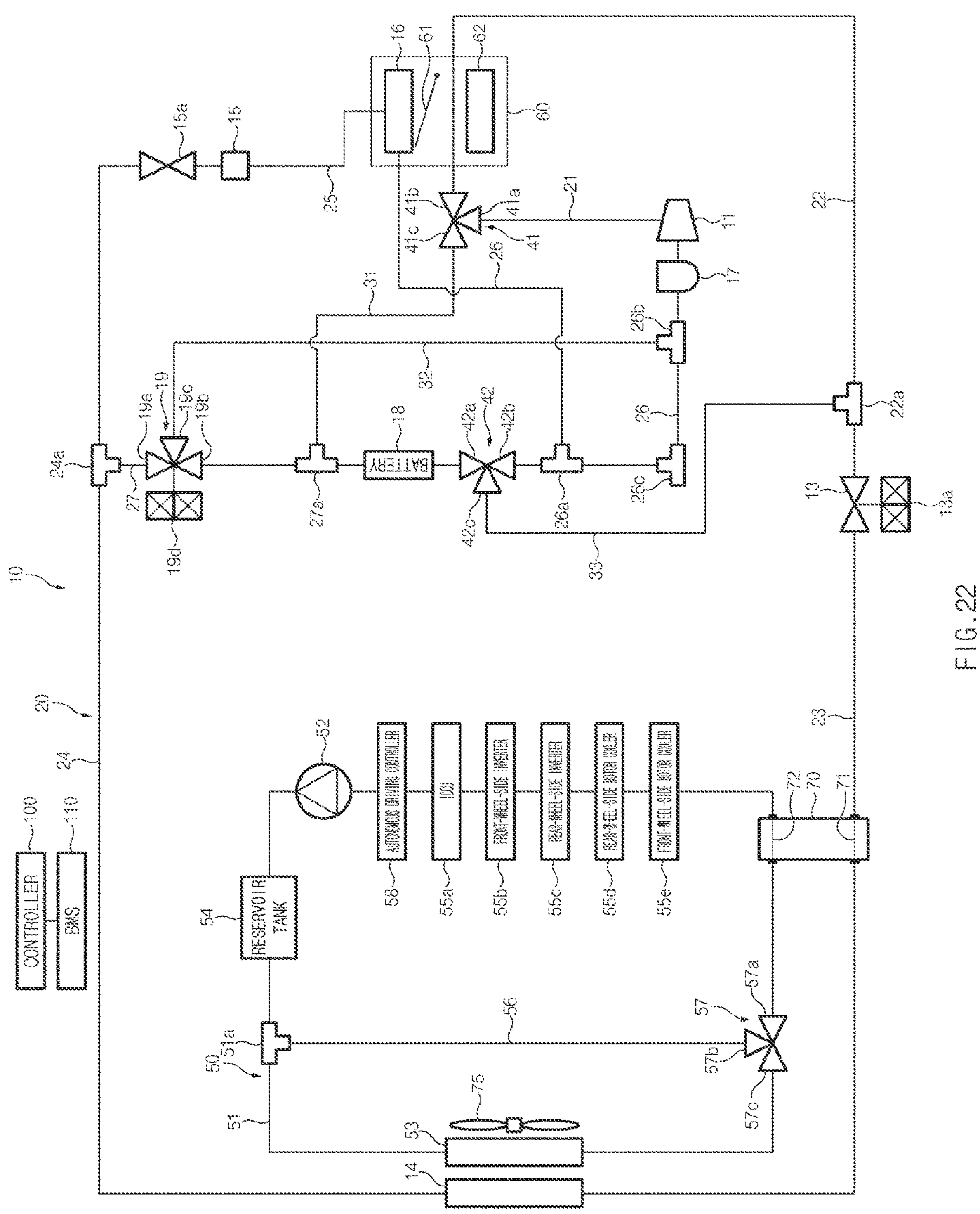
FIG. 22 illustrates a configuration of a vehicular thermal management system according to another exemplary embodiment of the present disclosure.

FIG. 22 illustrates the configuration of a vehicular thermal management system according to another exemplary embodiment of the present disclosure.

Referring to FIG. 22, the HVAC subsystem 10 may include the compressor 11, the heating-side expansion valve 13, the exterior heat exchanger 14, the cooling-side expansion valve 15, and the evaporator 16 fluidly connected through the refrigerant circulation path 20. That is, according to the exemplary embodiment illustrated in FIG. 22, the interior condenser 12 may be removed, and the refrigerant discharged from the compressor 11 may be directed into the heating-side expansion valve 13. As the interior condenser 12 is removed, the first outlet port 41*b* of the first control valve 41 may be configured to communicate with the heating-side expansion valve 13, and accordingly the first control valve 41 may be configured to control the flow of the refrigerant in a manner that allows the refrigerant discharged from the compressor 11 to be directed selectively toward the refrigerant passage of the battery 18 and/or the heating-side expansion valve 13. In addition, according to the exemplary embodiment illustrated in FIG. 22, the branch line 28, the dehumidification bypass line 29, the heat exchanger bypass line 30, the heating-side bypass line 34, the bypass line 35, the third control valve 43, the fourth control valve 44, and the switching valve 45 may be removed. According to the exemplary embodiment illustrated in FIG. 22, as the plurality of elements are removed, the manufacturing cost of the HVAC subsystem 10 may be reduced. The other elements of the HVAC subsystem 10 according to the exemplary embodiment illustrated in FIG. 22 may be the same as or similar to those according to the exemplary embodiment illustrated in FIG. 1.

Figure 23:
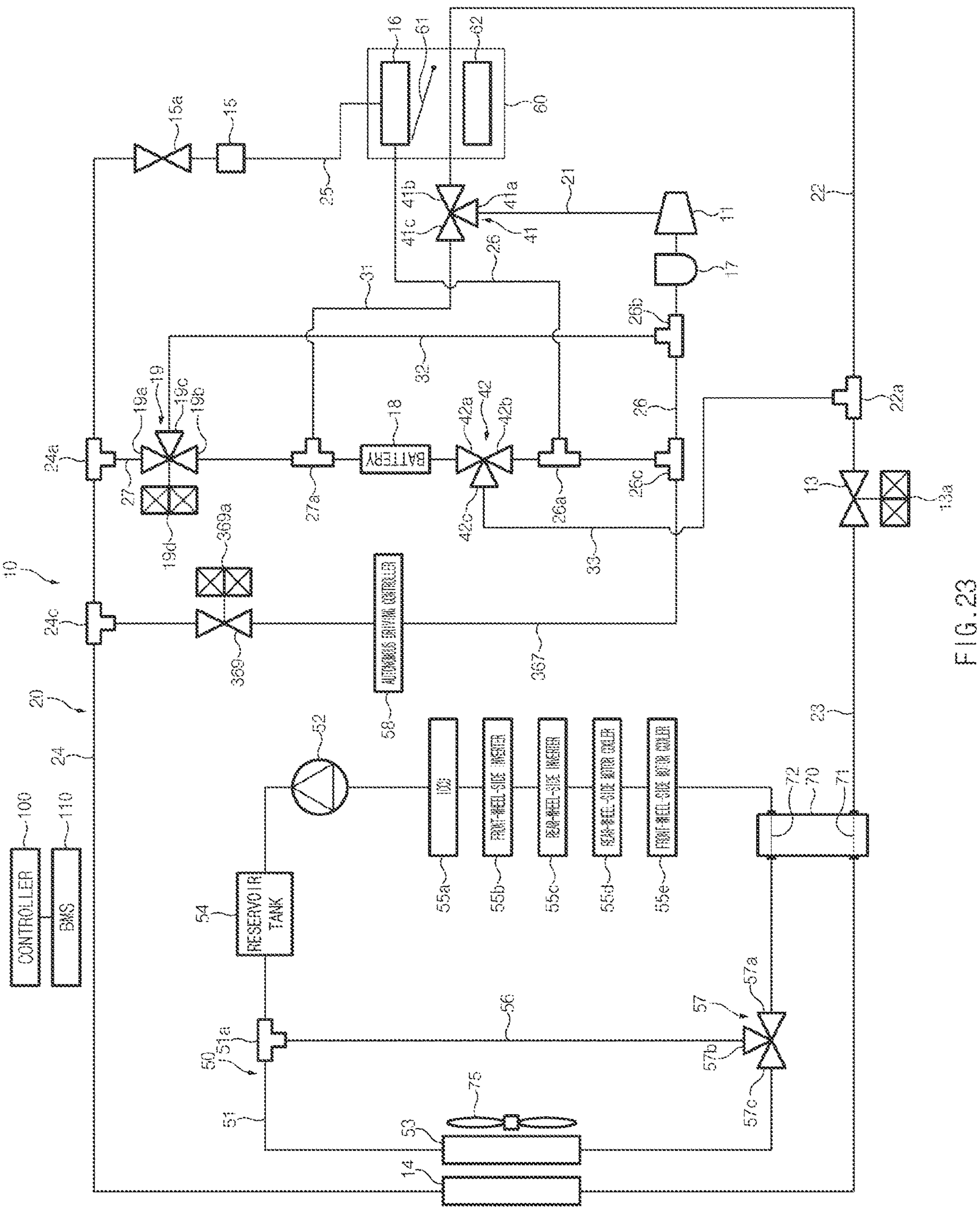
FIG. 23 illustrates a modification of the vehicular thermal management system illustrated in FIG. 22.

FIG. 23 illustrates a modification of the vehicular thermal management system illustrated in FIG. 22.

Referring to FIG. 23, the HVAC subsystem 10 may further include a second distribution line 367 configured to allow the refrigerant discharged from the exterior heat exchanger 14 to be directed from the upstream side of the cooling-side expansion valve 15 to the compressor 11. An inlet of the second distribution line 367 may be connected to the fourth line 24 of the refrigerant circulation path 20 at the upstream point 24*c* of the cooling-side expansion valve 15, and the inlet of the second distribution line 367 may be located on the upstream side of the inlet of the distribution line 27. An outlet of the second distribution line 367 may be connected to the sixth line 26 of the refrigerant circulation path 20 at the upstream point 26*c* of the accumulator 17 located on the upstream side of the compressor 11, and the outlet of the second distribution line 367 may be located on the upstream side of the outlet of the upstream bypass line 32. Accordingly, at least a portion of the refrigerant may be directed to the compressor 11 through the second distribution line 367.

The autonomous driving controller 58 and an expansion valve 369 may be disposed on the second distribution line 367, and the expansion valve 369 may be disposed on the upstream side of the autonomous driving controller 58. The autonomous driving controller 58 may have a refrigerant passage provided inside or outside thereof, and the refrigerant passage of the autonomous driving controller 58 may be fluidly connected to the second distribution line 367. The expansion valve 369 may be configured to adjust the flow of the refrigerant and/or the flow rate of the refrigerant into the refrigerant passage of the autonomous driving controller 58 and to expand the refrigerant received from the exterior heat exchanger 14. According to an exemplary embodiment, the expansion valve 369 may be an EXV having an actuator 369*a*. The actuator 369*a* may have a shaft which is movable to open or close an orifice defined in a valve body of the expansion valve 369, and the position of the shaft may be varied depending on the rotation direction, rotation degree, and the like of the actuator 369*a*, and accordingly the opening degree of the orifice of the expansion valve 369 may be varied. The controller 100 may control the operation of the actuator 369*a*. As the expansion valve 369 is opened to a predetermined degree, at least a portion of the refrigerant discharged from the exterior heat exchanger 14 may be expanded by the expansion valve 369, and the expanded refrigerant may pass through the refrigerant passage of the autonomous driving controller 58 so that the refrigerant may be evaporated in the refrigerant passage of the autonomous driving controller 58. Accordingly, the autonomous driving controller 58 may be directly cooled by the evaporation of the refrigerant.

The autonomous driving controller 58 may have a higher heat generating amount than the other power electronic components 55*a*, 55*b*, 55*c*, 55*d*, and 55*e*, and the refrigerant may directly cool the autonomous driving controller 58 through the second distribution line 367 and the expansion valve 369 so that the cooling of the autonomous driving controller 58 may be improved.

Figure 24:
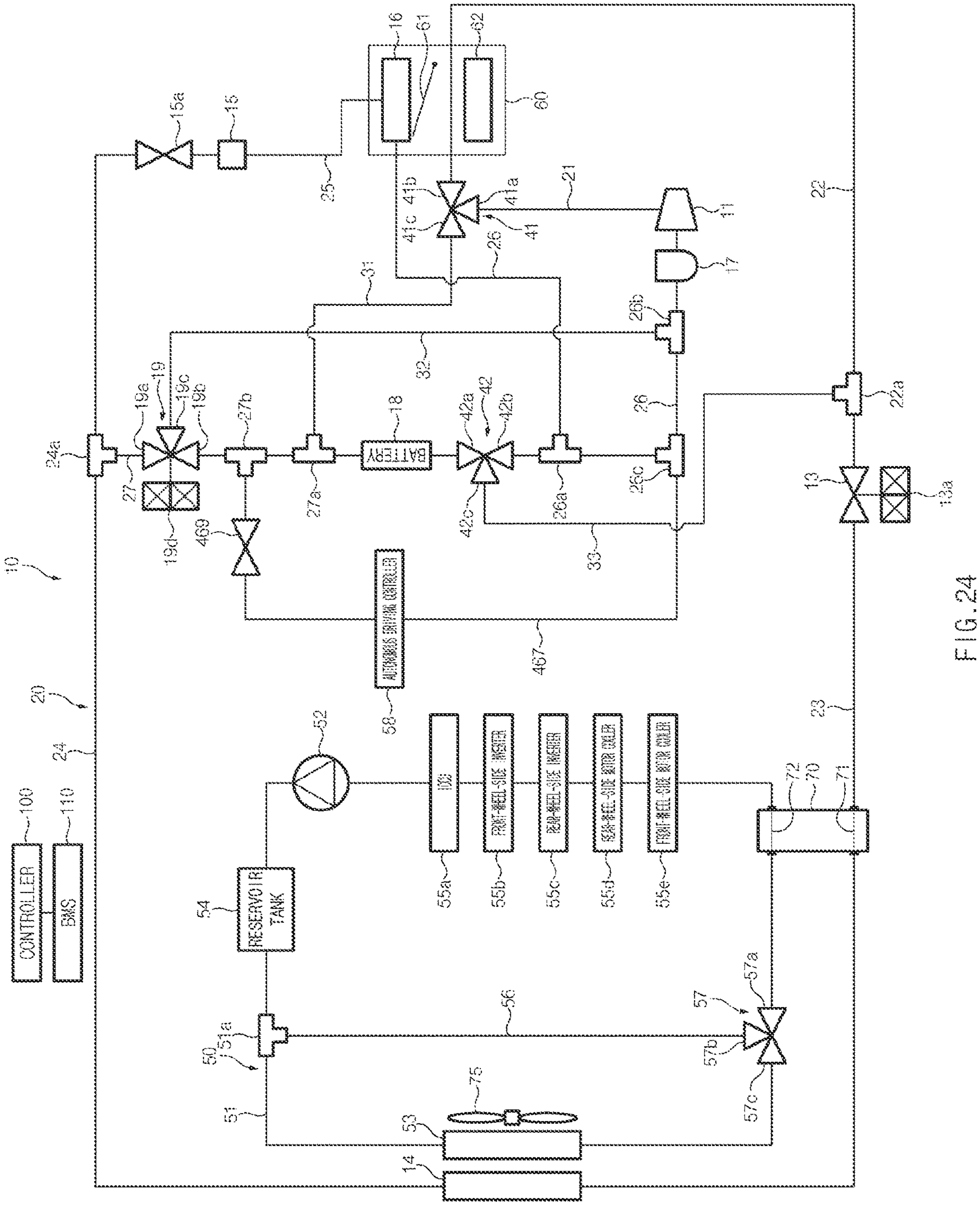
FIG. 24 illustrates a modification of the vehicular thermal management system illustrated in FIG. 22.

FIG. 24 illustrates a modification of the vehicular thermal management system illustrated in FIG. 22.

Referring to FIG. 24, the HVAC subsystem 10 may further include a second distribution line 467 configured to allow the refrigerant discharged from the outlet port 19*b* of the battery-side expansion valve 19 to be directed from the upstream point 27*b* of the battery 18 to the compressor 11. An inlet of the second distribution line 467 may be connected to the distribution line 27 at the upstream point 27*b* of the battery 18, and the inlet of the second distribution line 467 may be located on the upstream side of the outlet of the warm-up line 31. An outlet of the second distribution line 467 may be connected to the sixth line 26 of the refrigerant circulation path 20 at the upstream point 26*c* of the accumulator 17 located on the upstream side of the compressor 11, and the outlet of the second distribution line 467 may be located on the upstream side of the outlet of the upstream bypass line 32. Accordingly, at least a portion of the refrigerant may be directed to the compressor 11 through the second distribution line 467.

The autonomous driving controller 58 and a shut-off valve 469 may be disposed on the second distribution line 467, and the shut-off valve 469 may be disposed on the upstream side of the autonomous driving controller 58. The autonomous driving controller 58 may have a refrigerant passage provided inside or outside thereof, and the refrigerant passage of the autonomous driving controller 58 may be fluidly connected to the second distribution line 467. According to an exemplary embodiment, the shut-off valve 469 may be a solenoid valve, and the controller 100 may control the operation of the shut-off valve 469.

The autonomous driving controller 58 may have a higher heat generating amount than the other power electronic components 55*a*, 55*b*, 55*c*, 55*d*, and 55*e*, and the refrigerant may directly cool the autonomous driving controller 58 through the second distribution line 467 and the shut-off valve 469 so that the cooling of the autonomous driving controller 58 may be improved.

Figure 25:
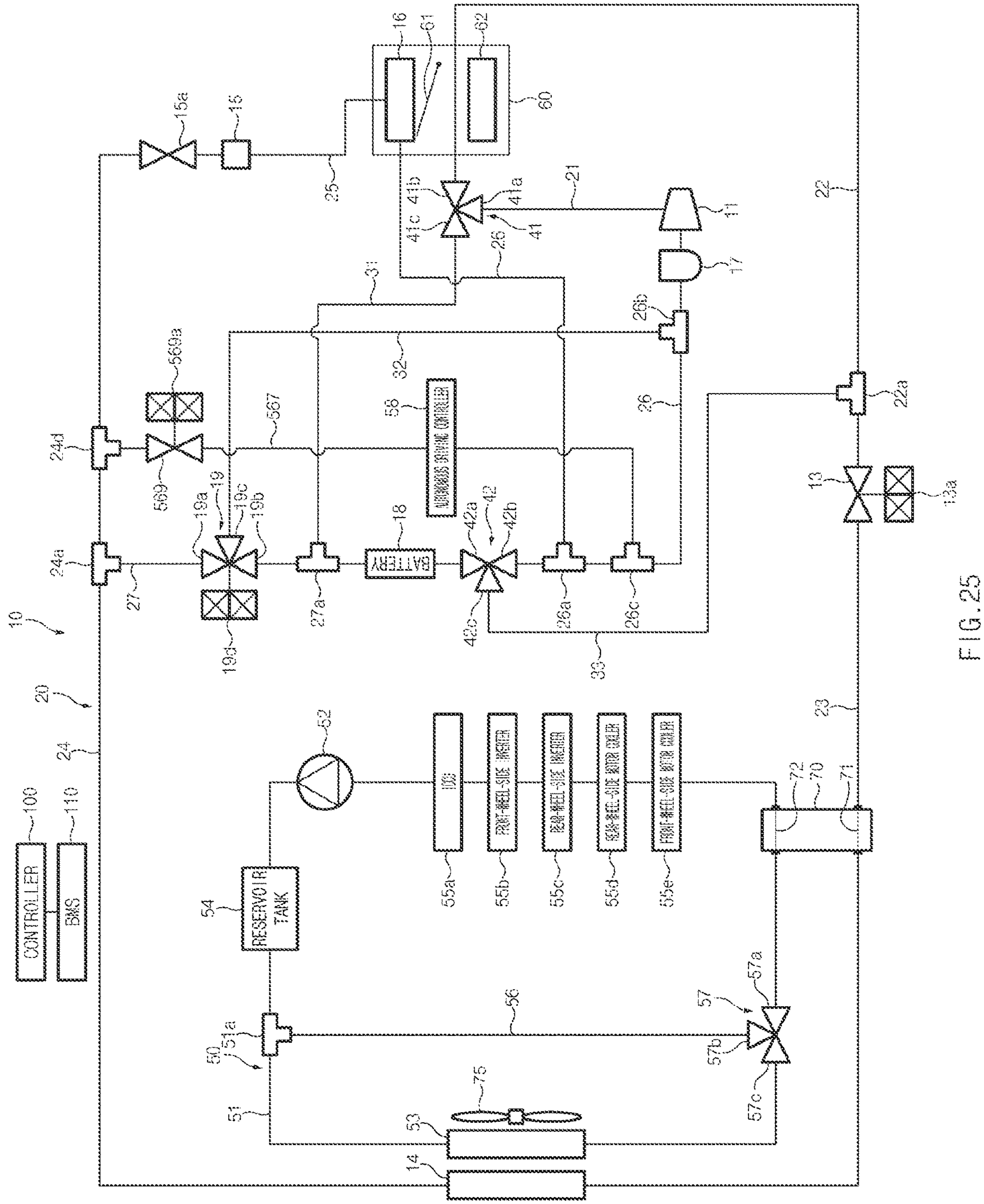
FIG. 25 illustrates a modification of the vehicular thermal management system illustrated in FIG. 22.

FIG. 25 illustrates a modification of the vehicular thermal management system illustrated in FIG. 22.

Referring to FIG. 25, the HVAC subsystem 10 may further include a second distribution line 567 configured to allow the refrigerant discharged from the exterior heat exchanger 14 to be directed from the upstream side of the cooling-side expansion valve 15 to the compressor 11. An inlet of the second distribution line 567 may be connected to the fourth line 24 of the refrigerant circulation path 20 at the upstream point 24*d* of the cooling-side expansion valve 15, and the inlet of the second distribution line 567 may be located on the downstream side of the inlet of the distribution line 27. An outlet of the second distribution line 567 may be connected to the sixth line 26 of the refrigerant circulation path 20 at the upstream point 26*c* of the accumulator 17 located on the upstream side of the compressor 11, and the outlet of the second distribution line 567 may be located on the upstream side of the outlet of the upstream bypass line 32. Accordingly, at least a portion of the refrigerant may be directed to the compressor 11 through the second distribution line 567.

The autonomous driving controller 58 and an expansion valve 569 may be disposed on the second distribution line 567, and the expansion valve 569 may be disposed on the upstream side of the autonomous driving controller 58. The autonomous driving controller 58 may have a refrigerant passage provided inside or outside thereof, and the refrigerant passage of the autonomous driving controller 58 may be fluidly connected to the second distribution line 567. The expansion valve 569 may be configured to adjust the flow of the refrigerant and/or the flow rate of the refrigerant into the refrigerant passage of the autonomous driving controller 58 and to expand the refrigerant received from the exterior heat exchanger 14. According to an exemplary embodiment, the expansion valve 569 may be an EXV having an actuator 569*a*. The actuator 569*a* may have a shaft which is movable to open or close an orifice defined in a valve body of the expansion valve 569, and the position of the shaft may be varied depending on the rotation direction, rotation degree, and the like of the actuator 569*a*, and accordingly the opening degree of the orifice of the expansion valve 569 may be varied. The controller 100 may control the operation of the actuator 569*a*. As the expansion valve 569 is opened to a predetermined degree, at least a portion of the refrigerant discharged from the exterior heat exchanger 14 may be expanded by the expansion valve 569, and the expanded refrigerant may pass through the refrigerant passage of the autonomous driving controller 58 so that the refrigerant may be evaporated in the refrigerant passage of the autonomous driving controller 58. Accordingly, the autonomous driving controller 58 may be directly cooled by the evaporation of the refrigerant.

The autonomous driving controller 58 may have a higher heat generating amount than the other power electronic components 55*a*, 55*b*, 55*c*, 55*d*, and 55*e*, and the refrigerant may directly cool the autonomous driving controller 58 through the second distribution line 567 and the expansion valve 569 so that the cooling of the autonomous driving controller 58 may be improved.

As set forth above, the vehicular thermal management system according to exemplary embodiments of the present disclosure may include the HVAC subsystem designed to allow the refrigerant circulating therein to cool the battery or increase the temperature of the battery to thereby maintain the temperature of the battery at an optimal operating temperature and to remove a conventional battery cooling subsystem (a battery coolant circulation path, a battery pump, a valve, etc.) for cooling and heating of the battery, so the weight and manufacturing cost thereof may be reduced. In particular, as the refrigerant is used to cool the battery, the battery cooling performance may be improved.

According to exemplary embodiments of the present disclosure, the high temperature refrigerant discharged from the compressor may be used to increase the temperature of the battery, so a separate heater for the heating of the battery may be removed.

According to exemplary embodiments of the present disclosure, the refrigerant may exchange heat with the power electronics coolant through the heat exchanger and the refrigerant may exchange heat with the ambient air through the exterior heat exchanger so that the refrigerant may maintain the temperature of the battery constantly and the performance (the heating of the passenger compartment) of the HVAC subsystem may be improved.

Hereinabove, although embodiments of the present disclosure have been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicular thermal management system, the system comprising:
- a heating, ventilation, and air conditioning (HVAC) subsystem comprising:
  - a compressor;
  - a heating-side expansion valve disposed on a downstream side of the compressor;
  - an exterior heat exchanger disposed on a downstream side of the heating-side expansion valve;
  - a cooling-side expansion valve disposed on a downstream side of the exterior heat exchanger;
  - an evaporator disposed on a downstream side of the cooling-side expansion valve;
  - a distribution line configured to allow at least a portion of a refrigerant discharged from the exterior heat exchanger to be directed from an upstream side of the cooling-side expansion valve to the compressor;
  - a battery comprising a refrigerant passage;
  - a warm-up line configured to allow the refrigerant to be directed from the downstream side of the compressor to the battery;
  - an interior condenser disposed between the compressor and the heating-side expansion valve; and
  - a first control valve configured to allow the refrigerant discharged from the compressor to be directed toward the interior condenser or the battery; and
- a power electronics cooling subsystem thermally connected to the HVAC subsystem,
- wherein the first control valve includes an inlet port communicating with an outlet of the compressor, a first outlet port communicating with the interior condenser, and a second outlet port communicating with an inlet of the warm-up line,
- wherein the refrigerant passage of the battery is fluidly connected to the distribution line,
- wherein the refrigerant passage of the battery is thermally separated from the power electronics cooling subsystem, and
- wherein an outlet of the warm-up line communicates with an inlet of the battery.

2. The system according to claim 1, wherein the HVAC subsystem further comprises a battery-side expansion valve located on an upstream side of the battery in the distribution line.

3. The system according to claim 2, wherein the battery-side expansion valve comprises an inlet port communicating with the exterior heat exchanger and an outlet port communicating with the battery.

4. The system according to claim 3, wherein the HVAC subsystem further comprises an upstream bypass line configured to allow the refrigerant to be directed from the upstream side of the battery to a downstream side of the battery.

5. The system according to claim 4, wherein the battery-side expansion valve further comprises a bypass port communicating with the upstream bypass line.

6. The system according to claim 1, wherein the HVAC subsystem further comprises a downstream bypass line configured to allow the refrigerant discharged from the battery to be directed to the heating-side expansion valve.

7. The system according to claim 1, wherein the HVAC subsystem further comprises a second control valve configured to allow the refrigerant discharged from the battery to be directed toward the compressor or the heating-side expansion valve.

8. The system according to claim 1, wherein the HVAC subsystem further comprises a bypass line configured to allow the refrigerant discharged from the heating-side expansion valve to bypass the exterior heat exchanger.

9. A vehicular thermal management system, the system comprising:
- a heating, ventilation, and air conditioning (HVAC) subsystem comprising:
  - a compressor;
  - a heating-side expansion valve disposed on a downstream side of the compressor;
  - an exterior heat exchanger disposed on a downstream side of the heating-side expansion valve;
  - a cooling-side expansion valve disposed on a downstream side of the exterior heat exchanger;
  - an evaporator disposed on a downstream side of the cooling-side expansion valve;
  - a distribution line configured to allow at least a portion of a refrigerant discharged from the exterior heat exchanger to be directed from an upstream side of the cooling-side expansion valve to the compressor;
  - a battery comprising a refrigerant passage;
  - a warm-up line configured to allow the refrigerant to be directed from the downstream side of the compressor to the battery;
  - an interior condenser disposed between the compressor and the heating-side expansion valve;
  - a first control valve configured to allow the refrigerant discharged from the compressor to be directed toward the interior condenser or the battery; and
  - a refrigerant circulation path through which the refrigerant is circulatable;
- a power electronics cooling subsystem thermally connected to the HVAC subsystem, the power electronics cooling subsystem comprising a power electronics coolant circulation path through which a power electronics coolant circulates; and
- a heat exchanger thermally connecting the HVAC subsystem and the power electronics cooling subsystem, the heat exchanger comprising a first passage fluidly connected to the refrigerant circulation path and a second passage fluidly connected to the power electronics coolant circulation path,
- wherein the first control valve includes an inlet port communicating with an outlet of the compressor, a first outlet port communicating with the interior condenser, and a second outlet port communicating with an inlet of the warm-up line,
- wherein the refrigerant passage of the battery is fluidly connected to the distribution line,
- wherein the refrigerant passage of the battery is thermally separated from the power electronics cooling subsystem, and
- wherein an outlet of the warm-up line communicates with an inlet of the battery.

10. The system according to claim 9, wherein the first passage of the heat exchanger is fluidly connected to the refrigerant circulation path between the heating-side expansion valve and the exterior heat exchanger.

11. The system according to claim 9, wherein the HVAC subsystem further comprises a heat exchanger bypass line configured to allow the refrigerant discharged from the heating-side expansion valve to be directed from an upstream side of the first passage of the heat exchanger to a downstream side of the first passage of the heat exchanger.

12. The system according to claim 9, wherein the HVAC subsystem further comprises a dehumidification bypass line configured to allow the refrigerant discharged from the heating-side expansion valve to be directed from an upstream side of the first passage of the heat exchanger to the evaporator.

13. The system according to claim 9, wherein the HVAC subsystem further comprises a second control valve configured to allow the refrigerant discharged from the heating-side expansion valve to be directed toward the evaporator, the first passage of the heat exchanger, or a downstream side of the first passage of the heat exchanger.

14. The system according to claim 9, wherein the HVAC subsystem further comprises a heating-side bypass line configured to allow the refrigerant discharged from the first passage of the heat exchanger to be directed to the compressor.

15. The system according to claim 9, wherein the HVAC subsystem further comprises a third control valve configured to allow the refrigerant discharged from the first passage of the heat exchanger to be directed toward the exterior heat exchanger or the compressor.

16. A vehicular thermal management system, the system comprising:

a heating, ventilation, and air conditioning (HVAC) subsystem comprising:

a compressor;

a heating-side expansion valve disposed on a downstream side of the compressor;

an exterior heat exchanger disposed on a downstream side of the heating-side expansion valve;

a cooling-side expansion valve disposed on a downstream side of the exterior heat exchanger;

an evaporator disposed on a downstream side of the cooling-side expansion valve;

a first distribution line configured to allow at least a portion of a refrigerant discharged from the exterior heat exchanger to be directed from an upstream side of the cooling-side expansion valve to the compressor;

a battery disposed comprising a refrigerant passage;

a second distribution line configured to allow the refrigerant discharged from the exterior heat exchanger to be directed from the upstream side of the cooling-side expansion valve to the compressor;

a warm-up line configured to allow the refrigerant to be directed from the downstream side of the compressor to the battery;

an interior condenser disposed between the compressor and the heating-side expansion valve;

a control valve configured to allow the refrigerant discharged from the compressor to be directed toward the interior condenser or the battery; and a refrigerant circulation path through which the refrigerant is circulatable; and a power electronics cooling subsystem thermally connected to the HVAC subsystem, wherein the control valve includes an inlet port communicating with an outlet of the compressor, a first outlet port communicating with the interior condenser, and a second outlet port communicating with an inlet of the warm-up line, wherein the refrigerant passage of the battery is fluidly connected to the first distribution line, wherein the refrigerant passage of the battery is thermally separated from the power electronics cooling subsystem, and wherein an outlet of the warm-up line communicates with an inlet of the battery.

17. The system according to claim 16, wherein the HVAC subsystem further comprises an autonomous driving controller disposed on the second distribution line.

18. The system according to claim 7, wherein the HVAC subsystem further comprises:

an expansion valve located on an upstream side of the battery in the distribution line, the expansion valve comprising:

an inlet port communicating with the exterior heat exchanger;

an outlet port communicating with the battery, and a bypass port; and an upstream bypass line configured to allow the refrigerant to be directed from the upstream side of the battery to a downstream side of the battery, wherein the bypass port communicates with the upstream bypass line.

19. The system according to claim 18, wherein the HVAC subsystem further comprises:

a downstream bypass line connected to the second control valve and configured to allow the refrigerant discharged from the battery to be directed to the heating-side expansion valve;

a third line extending from the heating-side expansion valve to a heat exchanger;

a branch line branching off from the third line between the heating-side expansion valve and the heat exchanger and connecting to a third control valve; and a heat exchanger bypass line branching off from the third control valve and configured to allow the refrigerant discharged from the heating-side expansion valve to bypass the heat exchanger.

20. The system according to claim 19, wherein the HVAC subsystem further comprises:

a fourth control valve disposed at a point where a heating-side bypass line and the third line are connected, the fourth control valve configured to allow the refrigerant discharged from the heat exchanger to be directed toward the exterior heat exchanger or the compressor; and a switching valve at a point where a bypass line and the third line are connected, the switching valve configured to allow the refrigerant discharged from the heating-side expansion valve to selectively bypass the exterior heat exchanger through the bypass line or pass through the exterior heat exchanger.

* * * * *